United States Patent
Wirth et al.

(10) Patent No.: US 7,343,099 B2
(45) Date of Patent: Mar. 11, 2008

(54) FREE SPACE OPTICAL (FSO) LASER COMMUNICATION SYSTEM EMPLOYING FADE MITIGATION MEASURES BASED ON LASER BEAM SPECKLE TRACKING AND LOCKING PRINCIPLES

(75) Inventors: Allan Wirth, Bedford, MA (US); Andrew Jankevics, Westford, MA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 476 days.

(21) Appl. No.: 10/777,476

(22) Filed: Feb. 12, 2004

(65) Prior Publication Data
US 2005/0180753 A1    Aug. 18, 2005

(51) Int. Cl.
*H04B 10/00*    (2006.01)
(52) U.S. Cl. .................. 398/131; 398/129; 398/123
(58) Field of Classification Search ......... 398/118–131
See application file for complete search history.

(56) References Cited

U.S. PATENT DOCUMENTS

| | | | |
|---|---|---|---|
| 4,123,651 A * | 10/1978 | Mongeon ................. | 250/203.2 |
| 4,491,982 A | 1/1985 | Candy et al. | |
| 4,928,317 A | 5/1990 | Franchini | |
| 5,119,225 A | 6/1992 | Grant et al. | |
| 5,218,467 A | 6/1993 | Ross et al. | |
| 5,661,582 A | 8/1997 | Kintis et al. | |
| 5,689,335 A * | 11/1997 | Strauss ....................... | 356/484 |
| 5,786,923 A | 7/1998 | Doucet et al. | |
| 5,801,866 A | 9/1998 | Chan et al. | |
| 6,043,918 A | 3/2000 | Bozzay et al. | |
| 6,323,980 B1 | 11/2001 | Bloom | |
| 6,348,986 B1 | 2/2002 | Doucet et al. | |

(Continued)

FOREIGN PATENT DOCUMENTS

WO    WO 02/059674 A1    8/2002

OTHER PUBLICATIONS

Scientific publication entitled "Chaotic Free-Space Laser Communication over a Turbulent Channel" by N.F. Rulkov, M.A. Voronstsov, and L. Illing, Physical Review Letters, vol. 89, No. 27, Dec. 30, 2002, 4 pages.

(Continued)

*Primary Examiner*—Jason Chan
*Assistant Examiner*—Nathan Curs
(74) *Attorney, Agent, or Firm*—Tarolli, Sundheim, Covell & Tummino LLP

(57) ABSTRACT

A free-space adaptive optical laser communication system having signal transmission and reception channels at all terminals in the communication system, wherein wavefront sensing and wavefront correction mechanisms are employed along signal transmission and reception channels of all terminals in the communication system (i.e. adaptive optics) to improve the condition of the laser beam at the receiver (i.e. reduce the size of the spot a the detector plane). Speckle-to-receiver-aperture tracking mechanisms are employed in the transmission channel of the communication system and laser beam speckle tracking mechanism in the reception channels thereof, so as to achieve a first level of optical signal intensity stabilization at signal detector of each receiving channel. Speckle-to-fiber/detector locking mechanisms are also employed in signal receiving channels of all terminals in the communication system so as to achieve a second level of optical signal intensity stabilization at signal detector of each receiving channel.

28 Claims, 44 Drawing Sheets

U.S. PATENT DOCUMENTS

| | | |
|---|---|---|
| 6,373,607 B1 | 4/2002 | Rivers et al. |
| 6,452,145 B1 | 9/2002 | Graves et al. |
| 6,464,364 B2 | 10/2002 | Graves et al. |
| 6,559,993 B2 | 5/2003 | Doucet et al. |
| 6,568,647 B2 | 5/2003 | Graves et al. |
| 6,570,692 B2 | 5/2003 | Doucet et al. |
| 2002/0109884 A1 | 8/2002 | Presley et al. |
| 2003/0067657 A1* | 4/2003 | Dimmler et al. ............ 359/159 |
| 2004/0141752 A1 | 7/2004 | Shelton et al. |
| 2004/0208597 A1 | 10/2004 | Wittenberger et al. |
| 2005/0069325 A1* | 3/2005 | Cicchiello et al. .......... 398/122 |

OTHER PUBLICATIONS

Scientific publication entitled "Three-Dimensional Modeling of Optical Turbulence" by Frank H. Ruggiero and Daniel A. DeBenedictis, Users Group Conference, 2000, pp. 1-9.

PCT Search Report for PCT/US05/04389, completed Oct. 12, 2006.

* cited by examiner

Platform Parameters

Phase Map Through Turbulance

Time Sequence of Beam Distribution at Satellite
(bar represents 10m at 1000km)

Simulated $C_n^2$ profile

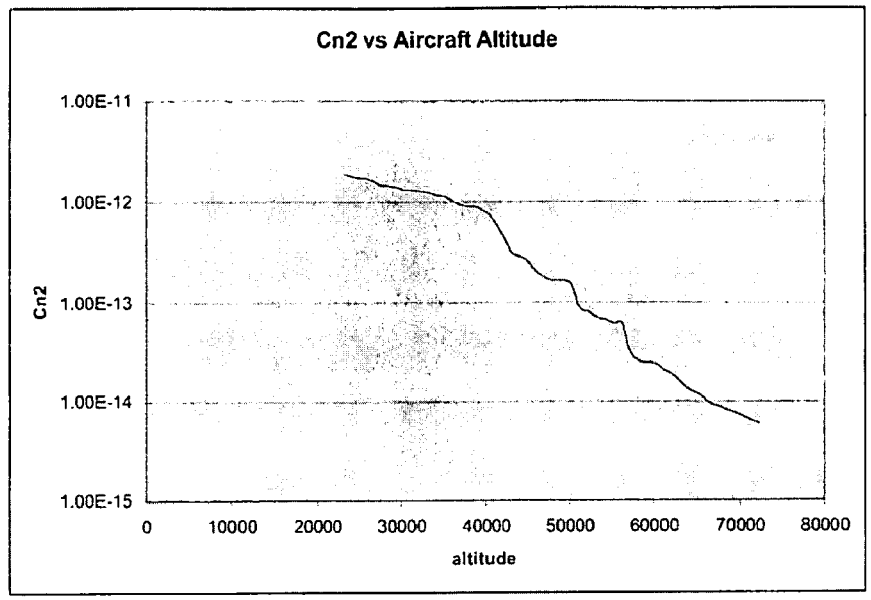
Integrated $C_n^2$ versus aircraft altitude in feet
FIG. 1E
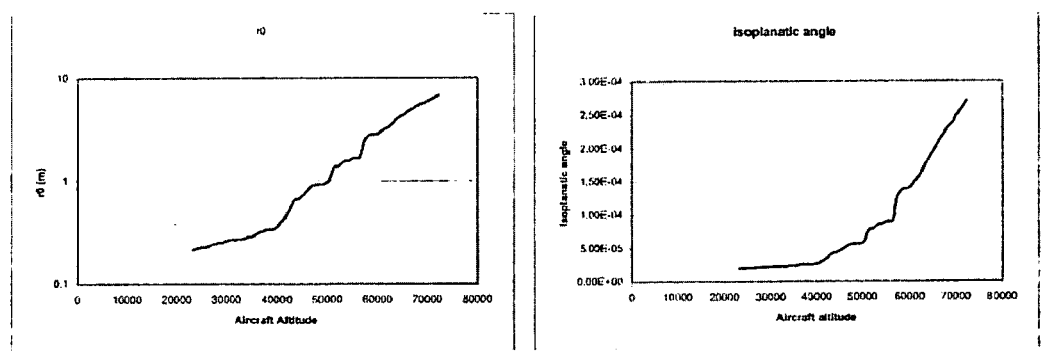
Atmospheric coherence parameters versus aircraft altitude
FIG. 1F1          FIG. 1F2

Simulated turbulence induced phase error

Diffraction limited beam profile (left) and typical beam profiles at satellite

Time Series of Received Power

Temporal Variation in Lowest 15 Zernike terms

Intensity distribution at receiver aperture

Spot during a deep fade event

Typical calculated spot at detector plane

Blur spots formed by aperture with 0.2, 0.5, and 1.0 wave phase steps

Modulation of a speckle pattern by a phase step

FIG. 1R1        FIG. 1R2

Log intensity vs. iteration number.
Left, 2X2 phase modulator; right, 4X4 phase modulator.

PDF for the data in Fig. 9K2

Case 1

Proportional Control

Transmitter

Proportional Plus Integral Control

Proportional Plus Integral Control Plus Derivative

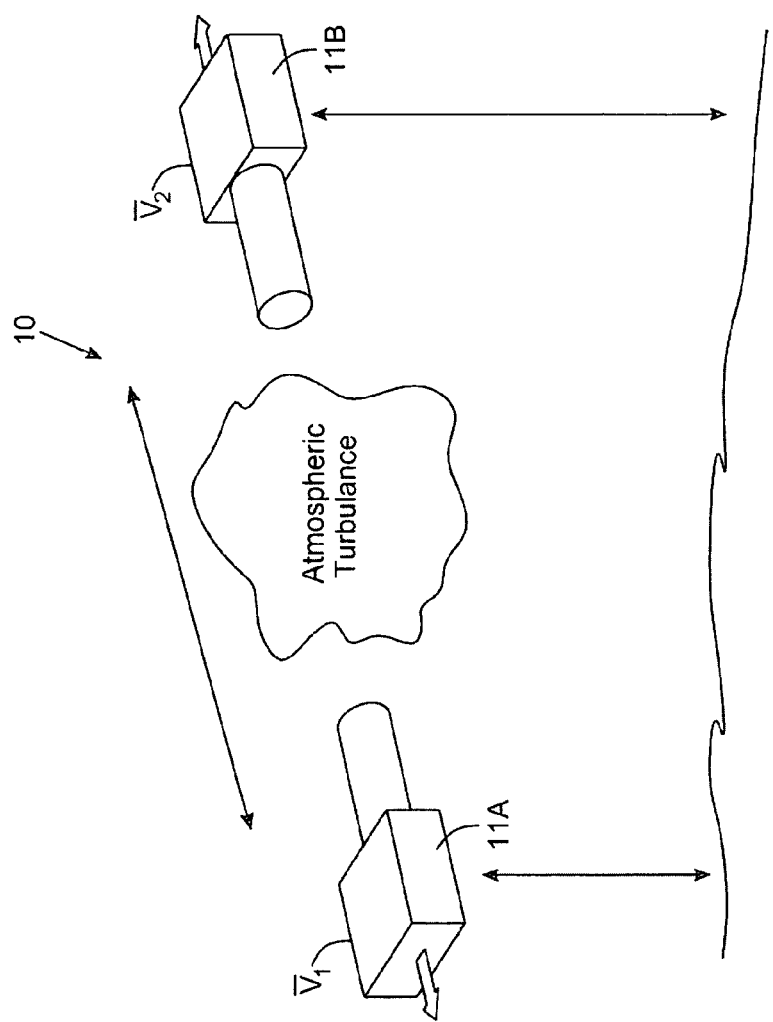

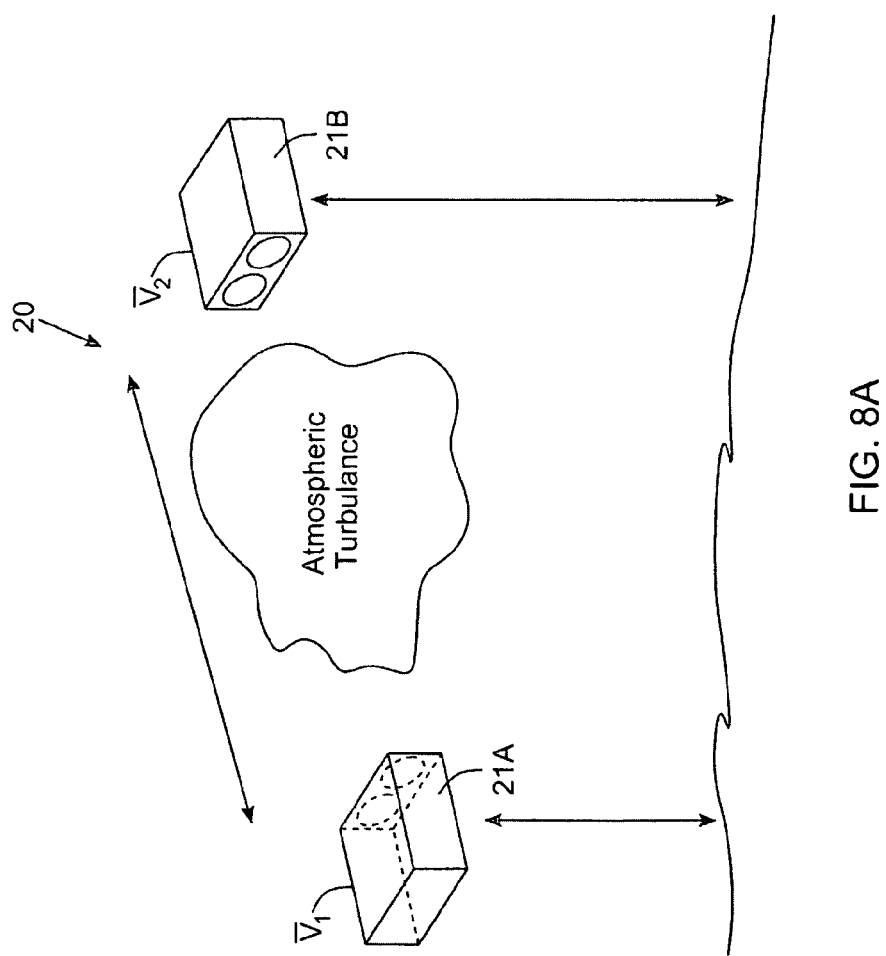

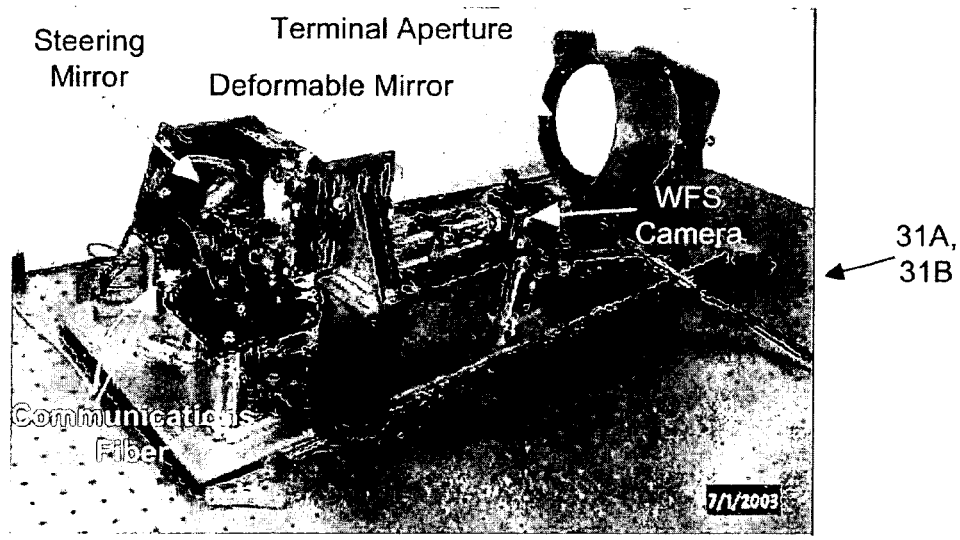

Compact laser communications terminal with 15cm aperture. This terminal has both a fast steering mirror and deformable mirror for atmospheric compensation. This terminal is set up as either a transmitter or receiver, with a separate fiber port for a tracking and AO beacon laser source (hidden by the DM mount).

These are both laser comm. terminals with traditional adaptive optics. A terminal with fade prevention would look similar. Note that these use reflecting telescopes (the one on the top has an 8 inch Schmidt Cassegrain telescope on the other side of the optical breadboard. In the schematic drawings a refracting telescope is shown for simplicity. Either can be used in practice.

FIG. 9F

FREE SPACE OPTICAL (FSO) LASER COMMUNICATION SYSTEM EMPLOYING FADE MITIGATION MEASURES BASED ON LASER BEAM SPECKLE TRACKING AND LOCKING PRINCIPLES

BACKGROUND OF THE INVENTION

1. Field of Invention

The present invention relates to an improved bi-directional laser communications link between two optical transceiver platforms (e.g. an airborne platform and a satellite) having a way of and a means for dynamically stabilizing variations or fluctuations in the intensity of detected optical carrier signals (i.e. suppressing fade events) that are caused by atmospheric effects such as turbulence, which tends to degrade link performance. Such fade compensation is particularly important for free-space optical laser communication systems requiring the transmission over of minimum laser beam power levels over fiber-to-fiber free space optical communication links.

2. Brief Description of the State of Knowledge in the Art

There is great interest in super-broad band free-space optical (FSO) laser communication systems as they are capable of securely communicating information at high data rates in point-to-point and multi-point-to-multi-point communication networks.

In military applications, such laser communication systems and networks offer a level of superiority and security over radio-frequency (RF) based communication system which have relatively limited band-widths, and thus data transfer rates, as well as being susceptible to RF-based jamming techniques intended to interfere and disrupt the performance of such systems. In commercial applications, such laser communication systems can be rapidly installed in point-to-point and multi-point-to-multi-point configurations (using buildings and towers as support structures for such laser communication platforms) at a significantly reduced expense in comparison with micro-wave-based satellite communication systems. Examples of FSO laser communications systems are disclosed in U.S. Pat. Nos. 6,657,783; 6,643,467; 6,348,986; 6,347,001; 6,314,163; 6,285,481; 6,286,944; 6,181,450; 6,151,340; 6,122,084; 5,844,705; 5,786,923; 5,786,923; 5,754,323; 5,710,652; 5,606,444; and WIPO Publication No. WO 03/003618, each said prior art reference being incorporated herein by reference.

However, FSO laser communication systems are not without challenges and problems.

In particular, the free-space optical communication links in FSO laser communications suffer from atmospheric conditions such as turbulence and the like which cause aberrations in the spatial phase of the wavefront of the modulated carrier laser beams as such carrier laser beams are transmitted between terminals in such communication systems. Depending on the distances between the laser communication terminals, such spatial phase aberrations can evolve into spatial intensity aberrations in the laser beam received at the entrance pupil of the receiver module of such terminals, degrading the bit error rate (BER) of such communication systems.

Studies have been conducted by Adaptive Optics Associates, Inc. of Cambridge, Mass. to quantify these wavefront errors over the range of possible link geometries. The uplink and downlink have been considered separately because the atmosphere affects the propagation differently depending on its direction. The density of the atmosphere declines rapidly with altitude and thus most of the wavefront errors are generated close to the aircraft. Integration of the analytical model of the atmosphere proposed by Fried (JOSA, 56,1380, 1966) shows that, for the altitudes of interest in this study, the effective distance of the turbulence from the aircraft is about 3 km.

For the light propagating up to the aircraft the wavefront errors picked up close to the aircraft evolve along the long path to the satellite so that the beam that reaches the satellite has both phase and intensity errors. This behavior is described by the eikonal equation (Born and Wolff, *Principles of Optics p.* 112), which shows that the change in intensity between two planes perpendicular to the propagation direction is proportional to the product of the curvature of the wavefront and the propagation distance. This effect is the source of scintillation in the beam.

For light coming down to the aircraft, the situation is very different. The wavefront has only 3 km to evolve before reaching the receiver and thus is almost purely a phase error without any scintillation. Therefore, the airborne to spaceborne direction is the most problematic direction in this link. This fundamental difference leads to very different requirements for the satellite and aircraft transceiver compensation systems.

Modeling of Atmospheric Turbulence

To assess the impact of atmospheric turbulence on the communications link, a model of the atmosphere has been developed. This model is based upon one of the standard models (e.g. Clear 1 model developed for the ABL program) supplemented with field data from the ABL-EX experiment, data from astronomical observatories (Masciadri, et al. Astron. Astrophys. Suppl. Ser. 137,185-202, 1999.), and the AFRL 3D modeling project (http://www.hpcmo.hpc.mil/Htdocs/UGC/UGC00/present/frank_ruggiero_pr.pdf). Of particular importance in this study is the modeling of the turbulent layer associated with the tropopause, determination of the range of altitude for the tropopause, and modeling of the effects of a jet stream. This is because, unlike an observatory that can be sited at a location known to have very low turbulence, the communications link must operate even if the aircraft is below the tropopause and a strong jet stream is traversed at some zenith angles.

Using the atmospheric model, turbulence profiles along various link paths have been determined. The important parameters are the altitude of the aircraft, the velocity of the aircraft, and the altitude and orbital path of the satellite. The aircraft altitude determines the starting point of the link path. The aircraft velocity sets the rate at which the beam translates through the atmosphere. The satellite altitude and path determine the apparent slew rate of the beam. FIG. 1 describes these platform parameters. Once a set of link paths is defined from these parameters, the atmospheric model has been used to create a series of phase screens at different altitudes. These are inputs to the AOA Wave Optic Propagation Code that is used to calculate the effects on the laser beam. Such modeling has been performed for both the uplink and downlink directions. One additional input to the Wave Optic Propagation Code is the aero-optical effect of the flow field around the window of the transceiver on the aircraft. This is modeled as a time varying phase screen. The results of this simulation will be a time sequence of phase and intensity maps for the entrance apertures of the two receivers.

FIG. 1B shows a typical phase map calculated for a horizontal communications link with strong turbulence. FIG. 1C shows a time sequence of detected laser beam spot intensity distributions calculated using a simple model atmosphere for propagation to a satellite at 1000 km altitude from an aircraft at 35,000 feet. The bar in each frame represents 10 m at the satellite. The second through fourth frames in this time sequence show a dark (rather than bright) speckle of several meters extent. Such an event would lead to a deep fade of the link signal for any receiver aperture of less than a few meters diameter.

The atmospheric model described above is used to examine other aspects of the laser communication link compensation problem. For example, because of the long path to the satellite, the light travel time to the satellite becomes significant. The result is that the transmitted beam must be pointed ahead of the apparent location of the satellite, just as a hunter must point his gun ahead of a flying duck to successfully hit it. This point-ahead angle is typically tens of microradians. Difficulties arise when this point-ahead angle becomes larger than the isoplanatic angle of the atmospheric turbulence. This is the angle over which the aberration is correlated. If the point-ahead angle is larger than the isoplanatic angle, the wavefront error measured from a source co-located with the satellite does not correctly represent the aberrations that will be experienced along the path of the transmitted beam. Also, as wavefront tilt is the strongest atmospheric aberration, this aniosplanatic effect can lead to serious pointing errors in the transmitted laser beam if the employed laser beam tracking algorithm uses only the satellite apparent position to estimate the error. A great body of research exists on this effect, both in the astronomical literature and from HEL DEW projects. If tilt anisoplanatism appears to be a significant problem for a given application, then more advanced tracking algorithms need to be drawn from this prior research and tested in the simulation.

Using the above-described techniques, some initial modeling has been performed to verify that atmospheric turbulence is a significant issue for aircraft to space optical communications links. A model atmosphere was constructed based on the analytical model of Fried (JOSA, 56,1380, 1966). The Fried model was modified to include the observed "bump" in turbulence in the region of the tropopause and the strongly layered structure of turbulence. FIG. 1D shows a typical $C_n^2$ profile generated by this model. This model was used to estimate the integrated turbulence along a vertical path from aircraft at various altitudes. The results for one realization of turbulence are shown in FIG. 1E. From these integrated turbulence estimates pertinent parameters for the design of a compensation system were derived. These included the atmospheric coherence length (Fried's $r_o$ parameter) and the coherence angle, known as the isoplanatic angle. These calculations were made using a wavelength of 1550 nm.

FIGS. 1F1 and 1F2 show some typical results derived from modeling this phenomenon. In particular, FIG. 1F1 shows that for altitudes below the tropopause (about 45,000' in this case) the coherence length is comparable to, or smaller than potential transceiver aperture sizes. This means that significant atmospheric aberrations will occur at these altitudes. FIG. 1F2 shows that at those same altitudes, the isoplanatic angle is in the range of tens of microradians. Since this is comparable to the point-ahead angle required for a link to a LEO satellite, the issue of tilt anisoplanatism must be treated carefully in any particular application.

Wave-Optic Propagation Simulations

To further assess the impact of this level of turbulence on a free space optical communication link, some simple wave-optic propagation simulations were performed. Using the integrated $C_n^2$ value, a single phase screen was generated for an aircraft altitude of 35,000 feet. FIG. 1G shows a pseudo-color representation of such a phase screen. The full extent of the screen is 1 m×1 m. Subsections of this phase screen were extracted along a path to simulate the motion of the aircraft past the turbulence. In this simple model, the turbulence itself is frozen in time. The extracted phase screen was then applied to a uniformly illuminated circular pupil of 150 mm diameter and the resulting wavefront propagated to a range of 100 km.

While the use of a single phase screen does not model the real three-dimensional distribution of the turbulence, because the atmospheric density falls off fairly rapidly with height, it is adequate for obtaining a rough idea of the effects of turbulence on the beam pattern at the satellite. FIG. 1H shows two examples of the beam profile at the satellite compared with the diffraction limited profile (left image). Each image covers about an area 100 m by 100 m. In the case of the center beam profile, little power is lost due to the aberration. However, the laser beam profile on the right shows that significant fade events can occur as the receiver aperture could easily lie within one of the dark (speckle) regions of the laser beam spot image.

A sequence of 576 beam profiles was generated during wave optic propagation simulation. For a platform velocity of 200 m/s this sequence represents about 0.1 s of flight time. The temporal variation of the received power was calculated for this sequence and is shown in FIG. 1I. There is one fade event of about 10 db in this data set. Thus, in any link compensation system, it will be necessary to determine how well it suppresses these occasional fade events in addition to the expected improvement in link power due to the improved beam pattern.

The effect on laser beam pointing has also been examined. For each profile, the location of the centroid of the light was calculated. The rms variation in pointing direction was found to be 12.6 µrad with a peak deviation of 28.7 µrad. This rms variation in pointing is slightly larger than the diffraction limited beam radius and thus must be corrected to maintain an adequate communication link signal.

To determine the parameters for a compensation system, the spatial frequency content of the phase aberrations must be examined. Each of the extracted phase screens is decomposed into Zernike polynomials and the temporal intensity fluctuations of the Zernike coefficients determined. FIG. 1J displays the rms variation in each of the lowest 15 Zernike terms. Notably, the bulk of the aberration is contained in the first three terms, the two tilt terms and defocus. That is typical of all atmospheric aberrations. Correction of just these three terms, in transmission and reception channels of the system, would produce a laser beam that, in a statistical sense, would have a power density close to the diffraction limit. For typical imaging or directed energy applications, this is the figure of merit used to assess the degree of compensation to be achieved. Also, as turbulence is a random process, there will be occasions when higher order aberrations are strong enough to further disrupt the laser beam profile.

Traditional Adaptive Optics (AO) Atmospheric Compensation

One technique that has been used to mitigate the fading problem in free space optical (FSO) laser communication links, is traditional adaptive optics (AO) atmospheric compensation. In principle, an AO compensation system on the transmitter can improve the condition of the beam at the receiver and help to reduce the fluctuation in received power.

An adaptive optics compensation system on the receiver should also reduce the size of the spot at the detector plane.

Unfortunately, under conditions like those of the Wave-Optic Propagation Simulations described above, the performance of phase only AO compensation systems is very limited. The reason lies in the difference in the strength and distribution of the turbulence along a horizontal path compared to the vertical path of typical atmospheric AO compensation systems (e.g. astronomical adaptive optics). With turbulence roughly uniformly distributed along the path, phase errors close to the transmitter evolve into strong intensity variations at the far end of the path. Similarly, the light from the beacon on the receiver that is used as the source for the transmitter AO compensation system arrives at the transmitter with strong intensity variations. Portions of the received beam with very low intensity lead to erroneous phase measurements and corrupt the calculated wavefront. Even if the wavefront were measured perfectly and the correct phase compensation were applied to the outgoing laser beam, there would still be intensity variations across the laser beam at the receiver. This is because the transmitted laser beam is typically of uniform intensity while the laser beam that would produce uniform intensity at the receiver has intensity variations that mimic those of the laser beam from the beacon. This can be understood quite simply. Consider a portion of the laser beam from the beacon that is of low intensity. The light in that part of the laser beam has been diverged by the atmosphere to other parts of the beam. When the uniform transmitted beam passes through that same path, the light is converged by the atmosphere to produce a region of high intensity. What is needed to properly compensate the transmitter is full conjugation of the complex electric field of the laser beam from the beacon. While techniques exist for doing this, none has been demonstrated in the field.

At the receiver end, the compensation problem is not as daunting. There are the same problems due to regions of low intensity in the receiver pupil mentioned with regard to the transmit side of an AO compensation system. However, if the phase is correctly measured and compensated, then the laser beam spot at the detector should approach a diffraction limited size. This compensation system cannot do anything to reduce the size of variations in the power coming into the receiver. If, due to those variations, no light enters the receiver's entrance pupil, then no amount of phase compensation will increase the received signal power.

On top of these basic physical limitations of AO compensation systems for horizontal paths, there are also large and costly engineering problems due to the high temporal frequency characteristics of atmospheric turbulence. Measurements over a 16 km horizontal path show significant power in the full aperture tilt at temporal frequencies above 1 kHz. Higher order aberrations probably include even higher temporal frequencies. This requires an AO compensation system with a correction bandwidth of at least 1 kHz. Such response characteristics are beyond the performance of any existing AO systems.

In summary, optical communications technology has rapidly advanced and is at the point where communication systems via fiber at 40 Gbs are commercially available. There are applications that prevent the use of a fiber connection, such as those involving moving platforms.

However, the transition of the light from fiber to free space presents problems. The achievement of very high data rates requires the use of single mode fiber to prevent mode dispersion from corrupting the data stream. Conversion of the light signals to electrical signals at very high rates places constraints on the physical size of the electro-optical sensor. The capacity of a detector is proportional to its area and, because of its inherent RC time constant, larger detectors are necessarily slower. For these reasons, to couple free space propagating light into a fiber or onto a detector requires that the light be concentrated into a very small region.

In the case of a single mode fiber, the mode diameter is similar to the diffraction limited spot size defined by the numerical aperture (NA) of the fiber. For efficient coupling, the NA of the coupling lens must match the NA of the fiber. This means that the focal spot needs to be close to diffraction limited to properly couple the light from free space to the fiber.

Unfortunately, propagation of light through the atmosphere introduces aberrations in the optical wavefront that prevent reaching the diffraction limit. To some extent, these aberrations can be corrected with adaptive optics. However, under conditions of strong turbulence (such as encountered in a free space link close to the ground), the disturbance of the optical beam include both phase and intensity components. Traditional phase only adaptive optics cannot compensate for these intensity disturbances. The result is that FSO links under these conditions experience deep signal fade events that lead to unacceptable interruptions in the communications link.

Therefore, there is a great need in the art for an improved method and apparatus for mitigating or compensating for the effects of laser carrier signal fluctuations (i.e. fading) detected at the receiver of FSO laser communication systems, while avoiding the shortcomings and drawbacks of prior art methodologies and apparatus.

OBJECT AND SUMMARY OF THE PRESENT INVENTION

Accordingly, it is a primary object of the present invention to provide an improved method of and apparatus for mitigating or compensating for the effects of laser carrier signal fluctuations (i.e. fading) observed at the receiver of FSO laser communication systems, while avoiding the shortcomings and drawbacks of prior art methodologies and apparatus.

Another object of the present invention is to provide a free-space optical laser communication system supporting optically-separated signal transmission and reception channels, and employing laser beam speckle tracking mechanisms and speckle-to-fiber/detector locking mechanisms along the signal reception channels thereof for automatically stabilizing variations in the detected intensity of received laser beam carrier signals caused by atmospheric turbulence along said signal channels.

Another object of the present invention is to provide a free-space optical laser communication system having optically-separated signal transmission and reception channels at all terminal points in the communication system, wherein laser beam speckle tracking (i.e. following) mechanisms are employed in reception channels of the system to achieve a first level of optical signal intensity stabilization at signal detector of signal reception channel; and wherein speckle-to-fiber/detector locking mechanisms are employed along the signal reception channels of system to achieve a second level of optical signal intensity stabilization at the signal detector in the signal reception channel.

Another object of the present invention is to provide a method of and apparatus for automatically stabilizing variations in the intensity of received laser beam carrier signals caused by atmospheric turbulence along the signal reception channels of a free-space optical laser communication system supporting optically-separated signal transmission and reception channels.

Another object of the present invention is to provide a free-space optical laser communication system supporting optically-combined signal transmission and reception channels, and employing laser beam speckle tracking mechanisms and speckle-to-fiber/detector locking mechanisms along the signal reception channels thereof for automatically stabilizing variations in the intensity of received laser beam carrier signals caused by atmospheric turbulence along said signal channels.

Another object of the present invention is to provide a free-space optical laser communication system having optically-combined signal transmission and reception channels at all terminals in the communication system, wherein laser beam speckle tracking mechanism is employed in the signal reception channels of all terminals in the communication system to achieve a first level of optical signal intensity stabilization at signal detector in each signal receiving channel, and wherein speckle-to-fiber/detector locking mechanism are employed in the signal reception channels of all terminals in the communication system to achieve a second level of optical signal intensity stabilization at signal detector in each signal reception channel.

Another object of the present invention is to provide a method of and apparatus for automatically stabilizing variations in the intensity of received laser beam carrier signals caused by atmospheric turbulence along the signal reception channels of a free-space optical laser communication system supporting optically-combined signal transmission and reception channels.

Another object of the present invention is to provide a free-space adaptive optical laser communication system supporting optically-separated signal transmission and reception channels and employing laser beam speckle tracking mechanisms and speckle-to-fiber/detector locking mechanisms along the signal reception channels thereof for automatically stabilizing variations in the intensity of received laser beam carrier signals caused by atmospheric turbulence along said signal channels.

Another object of the present invention is to provide a free-space adaptive optical laser communication system having optically-separated signal transmission and reception channels at all terminals in the communication system, wherein wavefront sensing (WFS) and wavefront correction (WFC) mechanisms are employed in the signal transmission and reception channels of system (i.e. traditional adaptive optics) to improve the condition of the laser beam at the signal detector in the signal reception channel (i.e. reduce the size of the spot at the detector plane); wherein laser beam speckle tracking mechanisms are employed in the transmission channels of system so as to achieve a first level of optical signal intensity stabilization at signal detector in the signal reception channel; and wherein speckle-to-fiber/detector locking mechanisms are in signal reception channels of system to achieve a second level of optical signal intensity stabilization at signal detector in each signal reception channel.

Another object of the present invention is to provide a method of and apparatus for automatically stabilizing variations in the intensity of received laser beam carrier signals caused by atmospheric turbulence along the signal reception channels of a free-space adaptive optical laser communication system supporting optically-separated signal transmission and reception channels.

Another object of the present invention is to provide a free-space adaptive optical laser communication system supporting optically-combined signal transmission and reception channels and employing laser beam speckle tracking mechanism and speckle-to-fiber/detector locking mechanisms along the signal reception channels thereof for automatically stabilizing variations in the intensity of received laser beam carrier signals caused by atmospheric turbulence along said signal channels.

Another object of the present invention is to provide a free-space adaptive optical laser communication system having optically-combined signal transmisssion and reception channels at all terminals in the communication system, wherein wavefront sensing and wavefront correction mechanisms are employed in signal transmission and reception channels of all terminals in the communication system (i.e. adaptive optics) to improve the condition of the laser beam at the receiver (i.e. reduce the size of the spot a the detector plane); wherein laser beam speckle tracking mechanisms are employed in signal reception channels of all terminals in the communication system to achieve a first level of optical signal intensity stabilization at signal detector of each receiving channel; and wherein speckle-to-fiber/detector locking mechanisms are employed in signal receiving channels of all terminals in the communication system to achieve a second level of optical signal intensity stabilization at signal detector of each receiving channel.

Another object of the present invention is to provide a free-space adaptive optical laser communication system supporting optically-combined signal transmission and reception channels and employing a speckle-to-receiver-aperture locking mechanism along the signal transmission channels of the system and laser beam speckle tracking mechanisms and speckle-to-fiber/detector locking mechanisms along the signal reception channels thereof for automatically stabilizing variations in the intensity of received laser beam carrier signals caused by atmospheric turbulence along said signal channels.

Another object of the present invention is to provide a free-space adaptive optical laser communication system having optically-combined signal transmission and reception channels at all terminals in the communication system; wherein wavefront sensing and wavefront correction mechanisms are signal transmission and reception channels of all terminals in the communication system (i.e. adaptive optics) to improve the condition of the laser beam at the receiver (i.e. reduce the size of the spot a the detector plane); wherein speckle-to-receiver-aperture tracking mechanisms are employed in the transmission channel of the communication system and laser beam speckle tracking mechanism in the reception channels thereof, so as to achieve a first level of optical signal intensity stabilization at signal detector of each reception channel; wherein speckle-to-fiber/detector locking mechanisms are employed in signal reception channels of all terminals in the communication system so as to achieve a second level of optical signal intensity stabilization at signal detector of each receiving channel.

Another object of the present invention is to provide a free-space optical laser communication system, wherein the receiver sends the communication link power signal that it is using to perform the Speckle-to-Fiber/Detector Locking Method back to the transmitter via the optical or other communications link, and the transmitter uses this signal as the figure of merit in a control algorithm that drives a spatial phase or intensity modulator operating in a control loop, so that a bright speckle in the transmitted laser beam is pointed and locked onto the receiver aperture, while the receiver loop locks a bright speckle in the received laser beam, onto the receiving fiber (or detector).

These and other objects of the present invention will become more apparently understood hereinafter and in the Claims to Invention appended hereto.

BRIEF DESCRIPTION OF THE DRAWINGS OF PRESENT INVENTION

For a more complete understanding of how to practice the Objects of the Present Invention, the following Detailed Description of the Illustrative Embodiments can be read in conjunction with the accompanying Drawings, briefly described below, wherein:

FIG. 1A is a schematic representation of an aircraft in communication with a space communication satellite by way of a free-space optical (FSO) laser communication system link, wherein various communication platform parameters are defined for use in modeling the atmospheric channel and the performance of the FSO laser communication system, including the altitude of the aircraft, the velocity of the aircraft, and the altitude and orbital path of the satellite, wherein the aircraft altitude determines the starting point of the communication link path, the aircraft velocity sets the rate at which the laser beam translates through the atmosphere, and the satellite altitude and path determine the apparent slew rate of the transmitted laser beam;

Figure 1A:
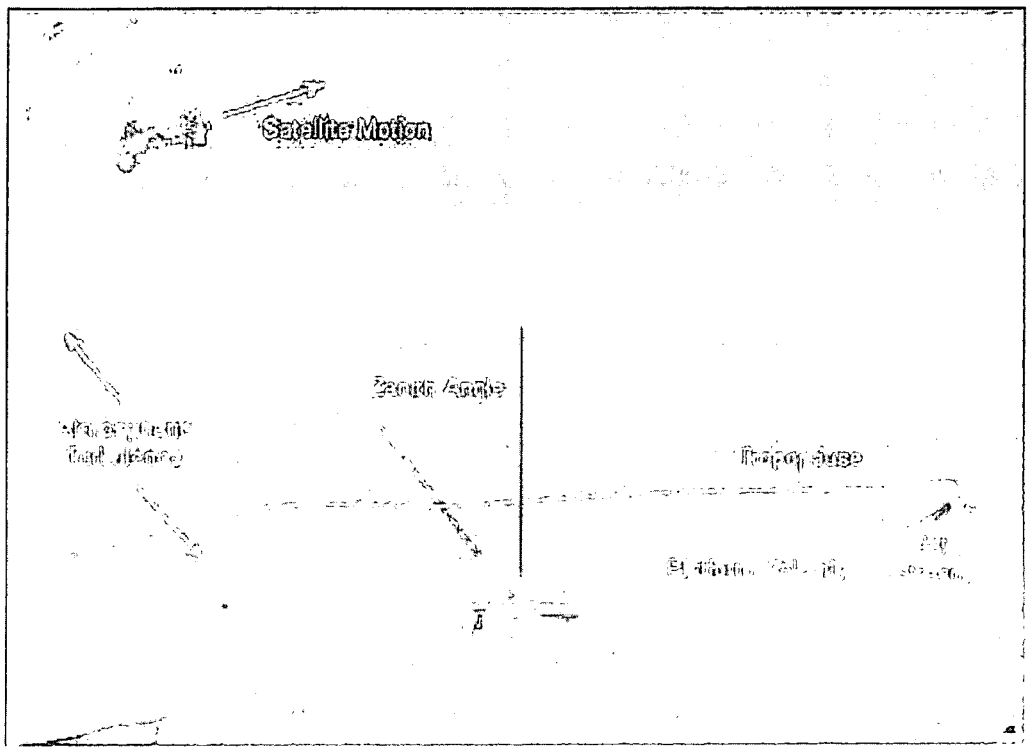
FIG. 1B is a schematic representation of a typical phase map used to calculate aberrations in a horizontal laser communications link propagating through strong atmospheric turbulence.
FIG. 1C is a time sequence of laser beam intensity distributions detected at the receiver of a laser communications satellite, calculated using a simple atmosphere model of propagation of a laser beam to the satellite at 1000 km altitude from an aircraft at 35,000 feet, wherein the bar in each frame in the time sequence represents 10 m at the satellite.
FIG. 1D is a typical Refractive Index Structure constant $C_n^2$ profile generated by a simple atmosphere model, which is used to estimate the integrated turbulence of free space along a vertical path from the aircraft at various altitudes.
FIG. 1E is a plot of versus aircraft altitude, based on the results of one realization of turbulence estimates.
Figure 1B:
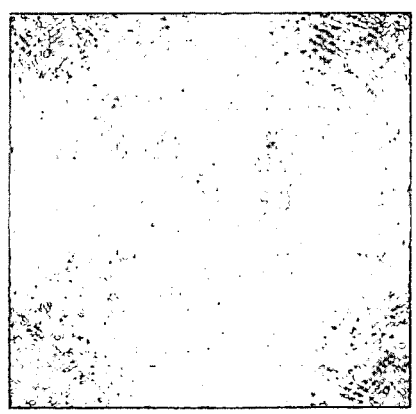
Figure 1C:
Figure 1D:
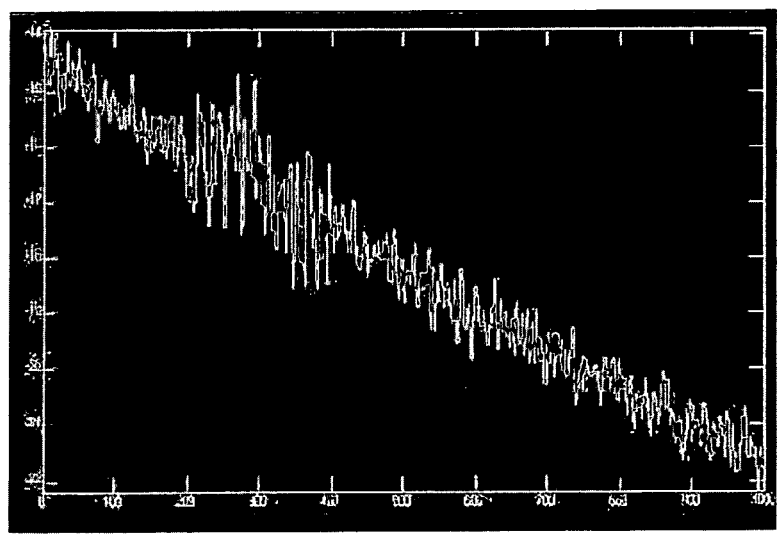
Figure 1G:
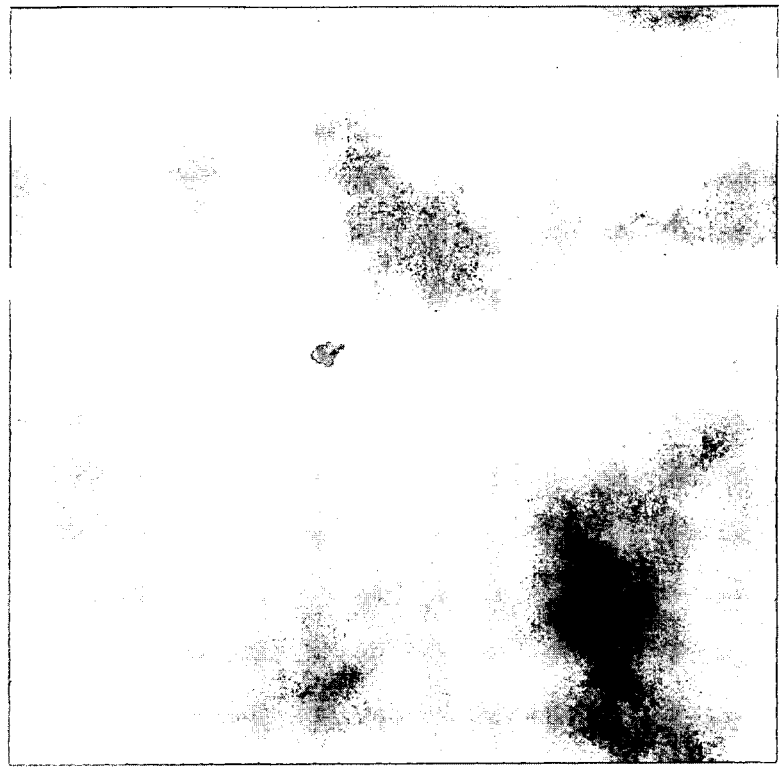
Figure 1H:
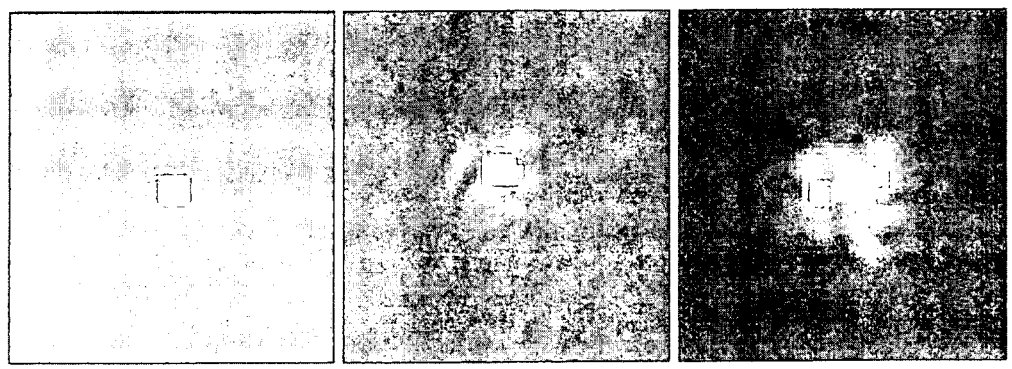
Figure 1I:
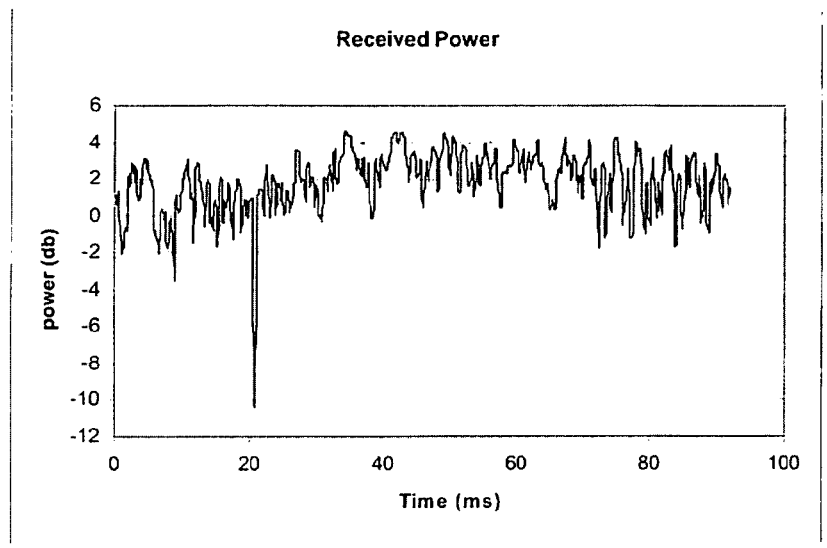
Figure 1J:
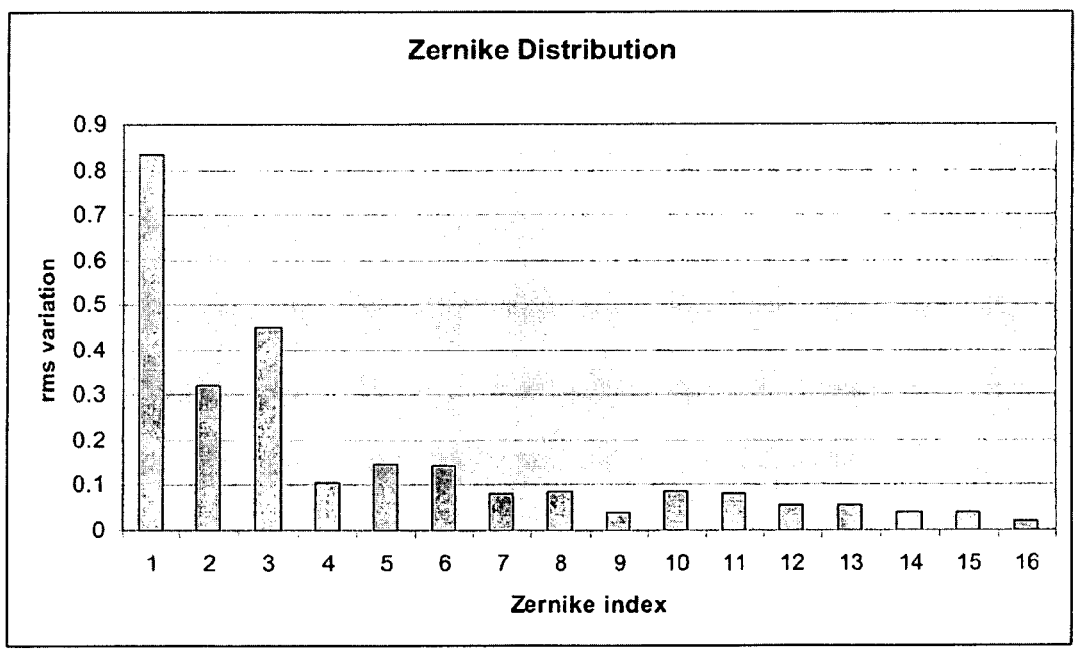
Figure 1K:
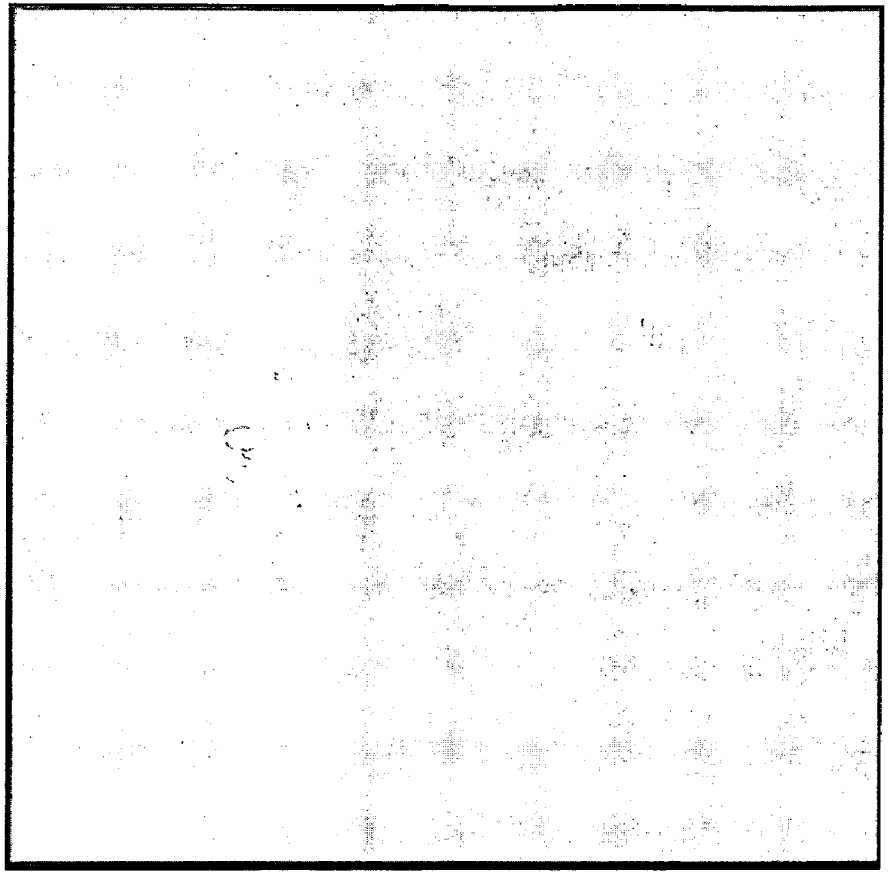
Figure 1M:
Figure 1L:
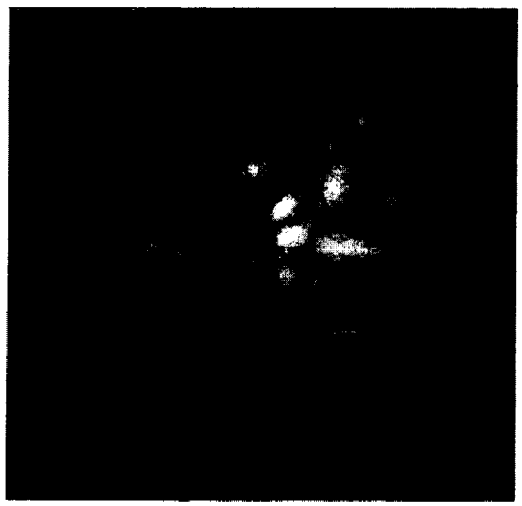
Figure 1N:
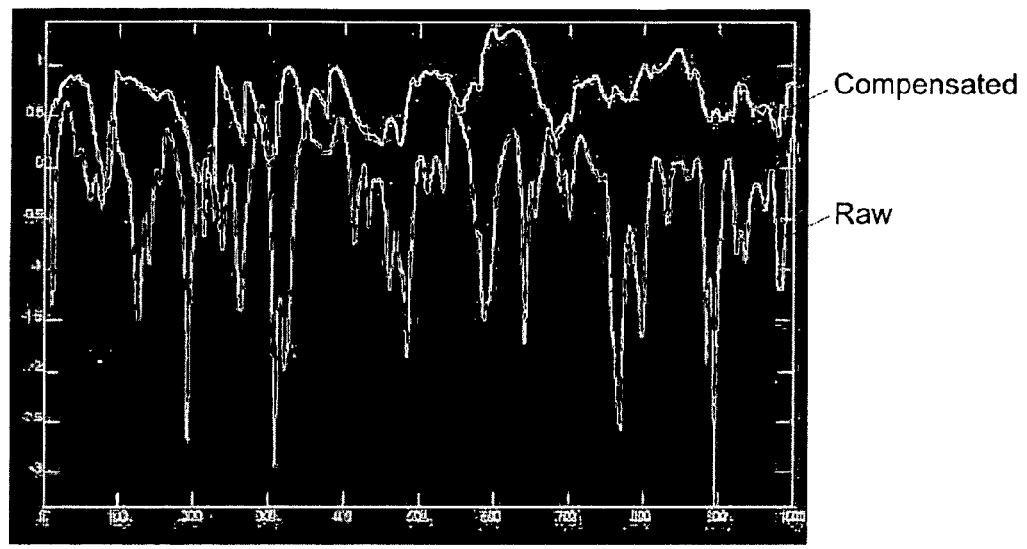
Figure 1O:
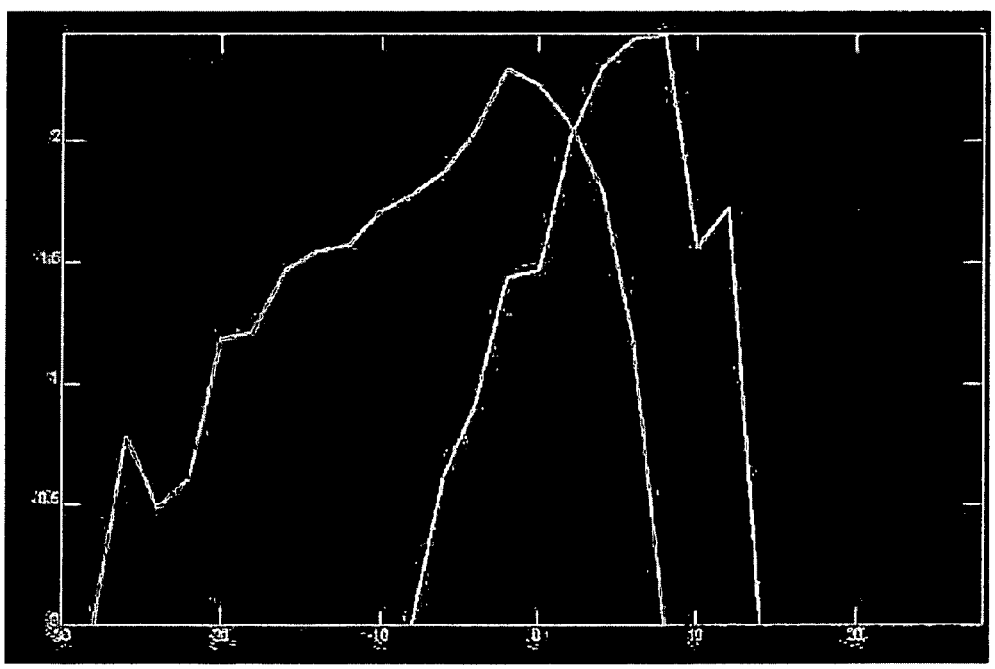
Figure 1P:
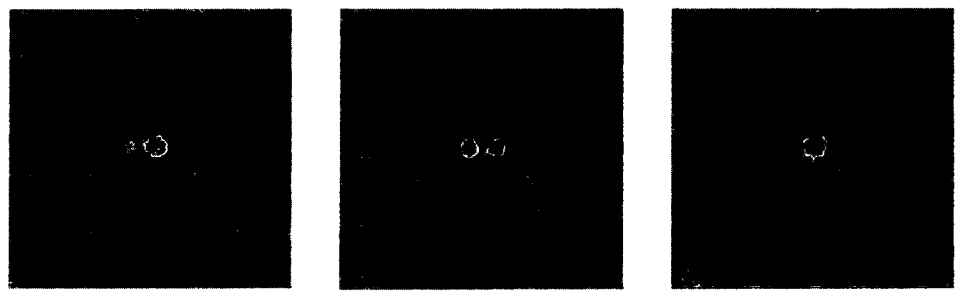
Figure 1Q:
Figure 1S:
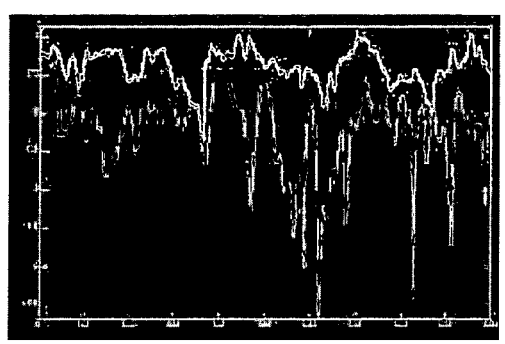
Figure 1S:
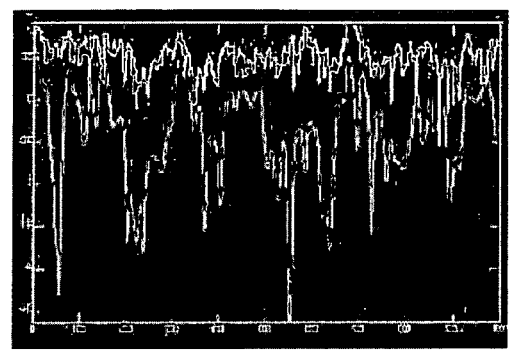
Figure 1S:
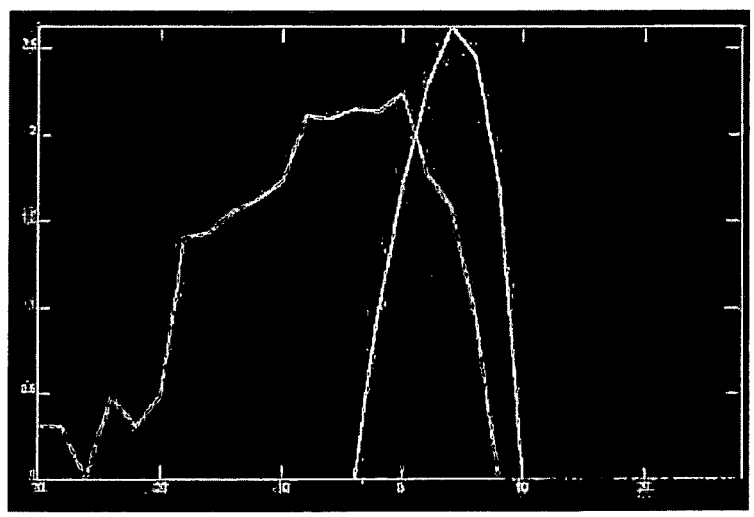
Figure 2A:
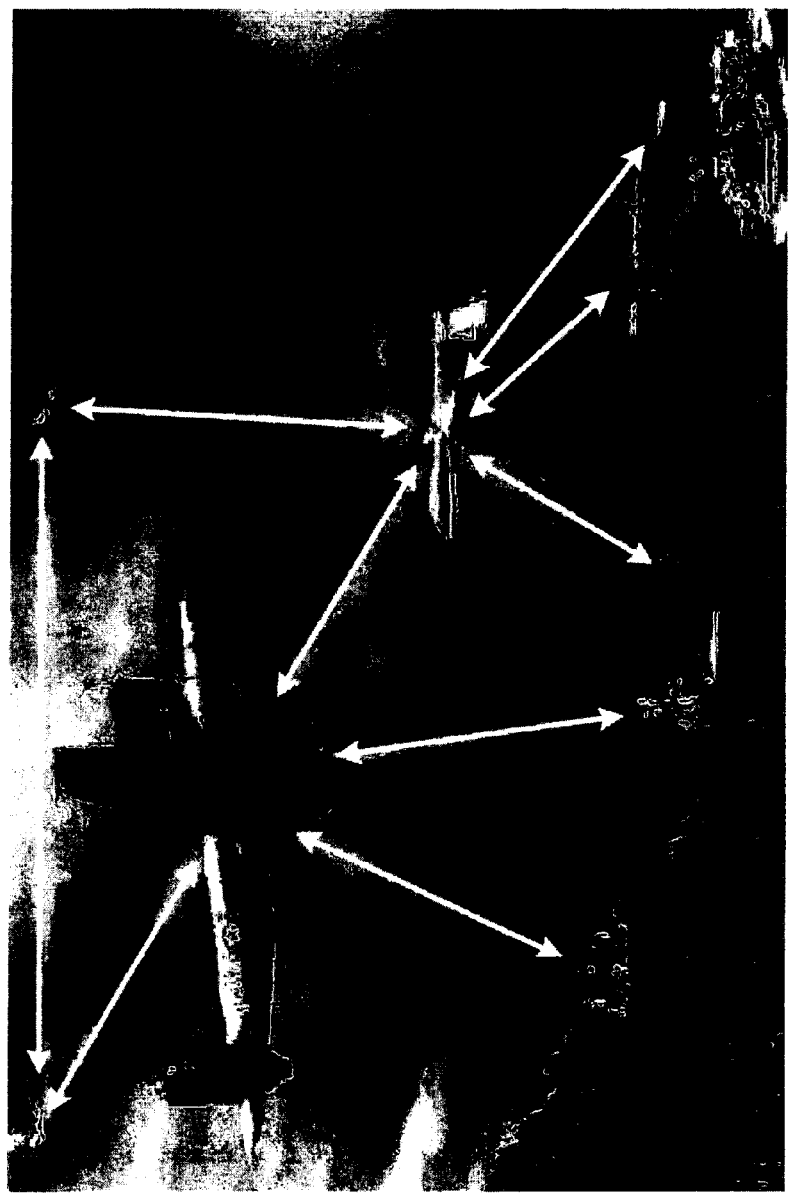
Figure 2B:
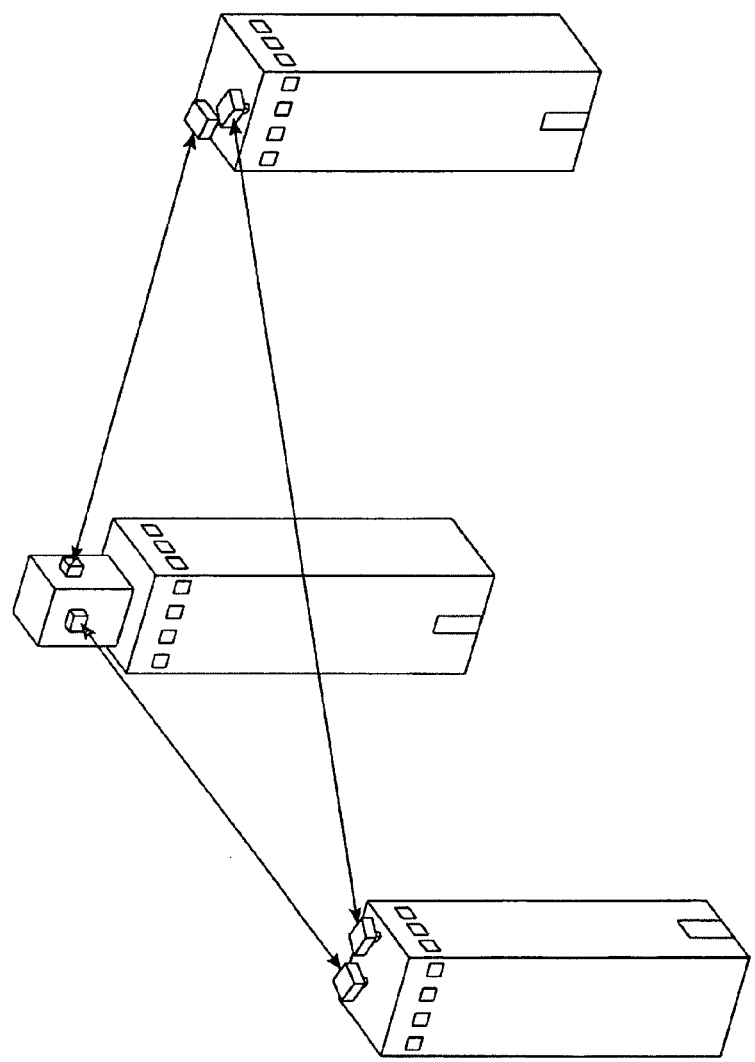
Figure 3A:
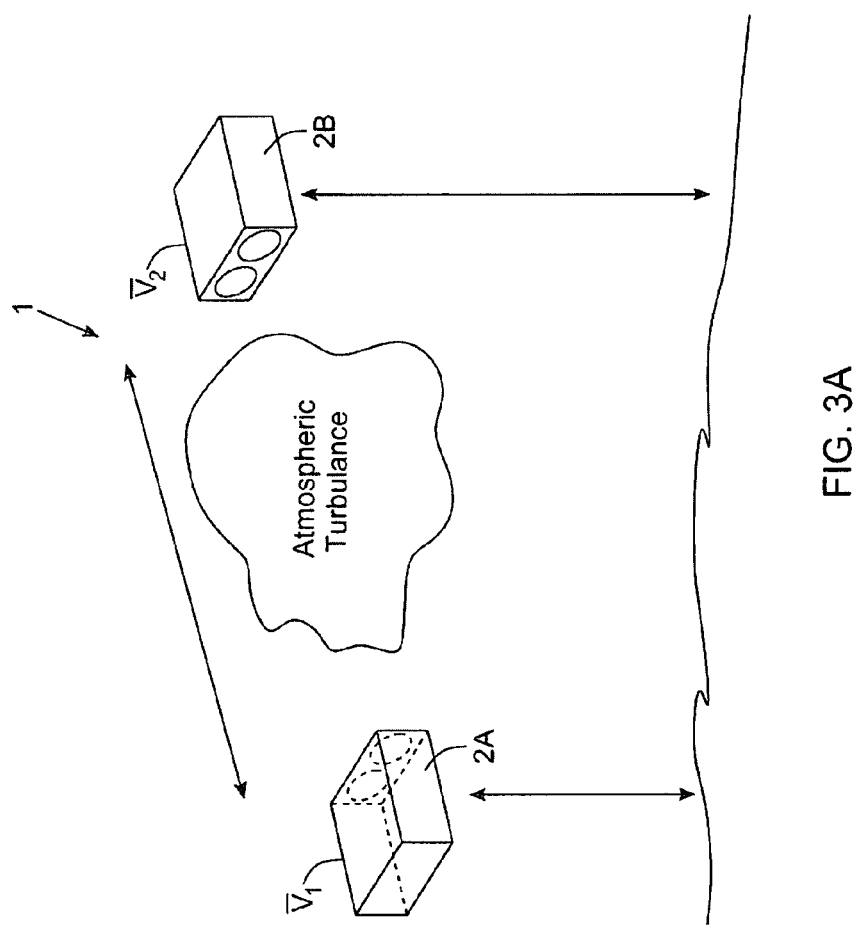
Figure 3B:
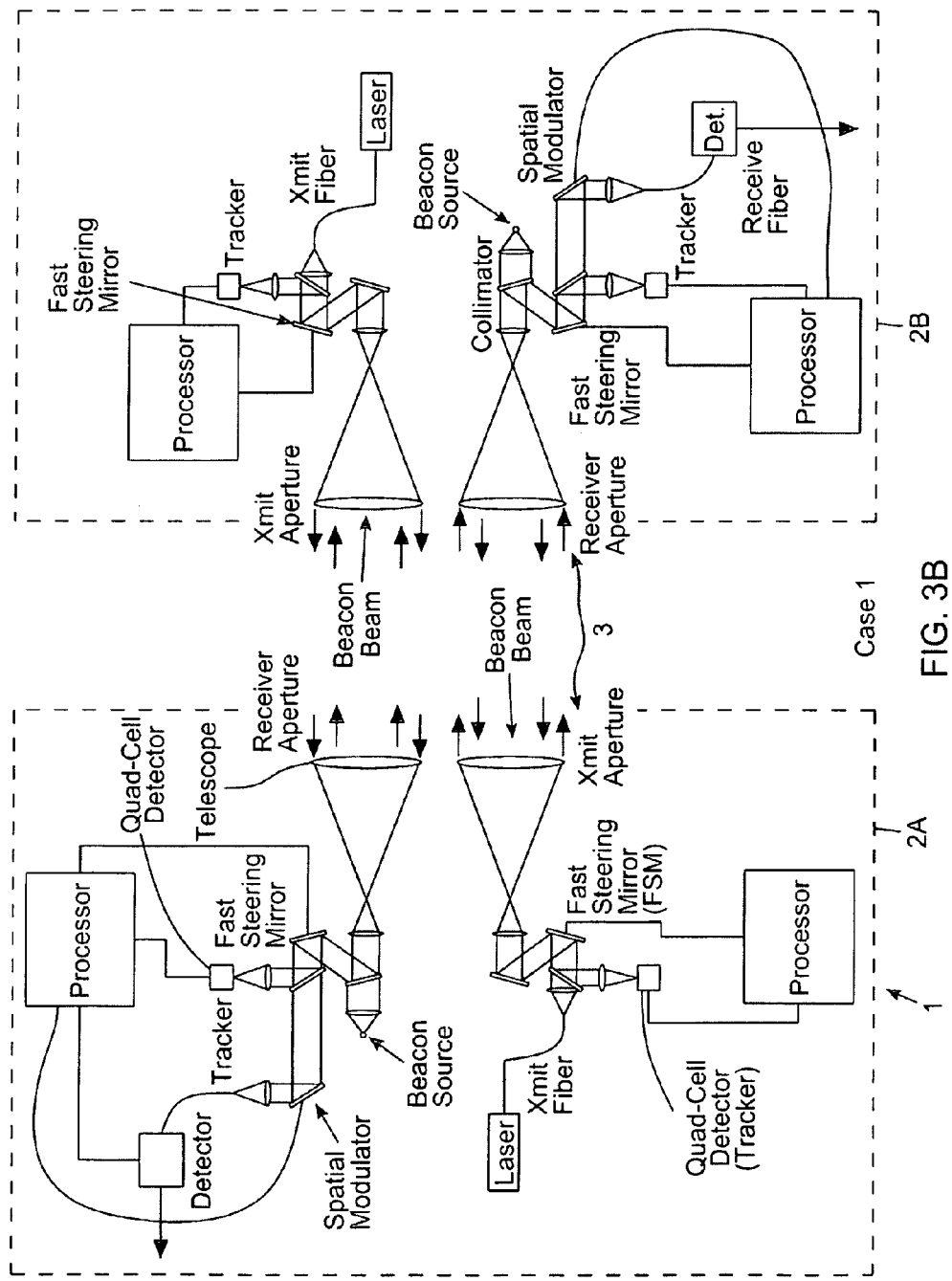
Figure 3C:
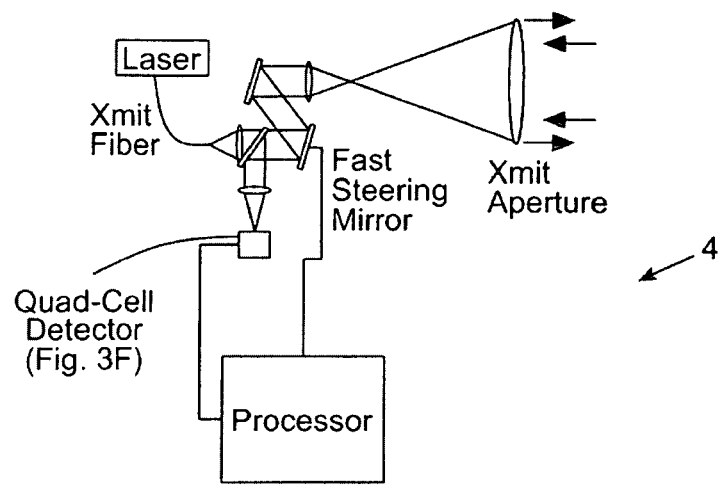
Figure 3D:
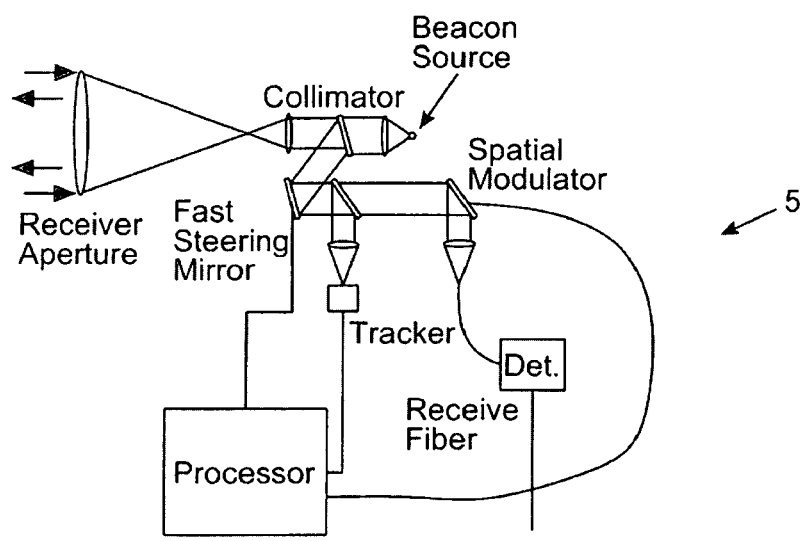
Figure 3E:
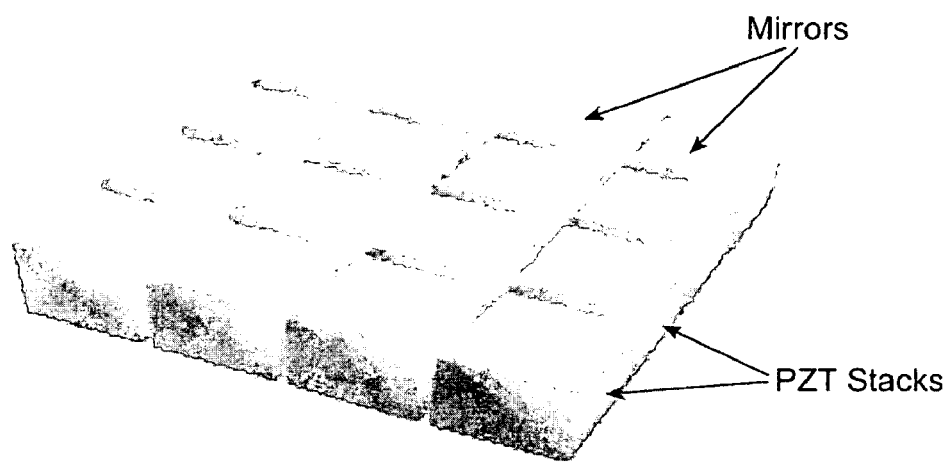
Figure 3F:
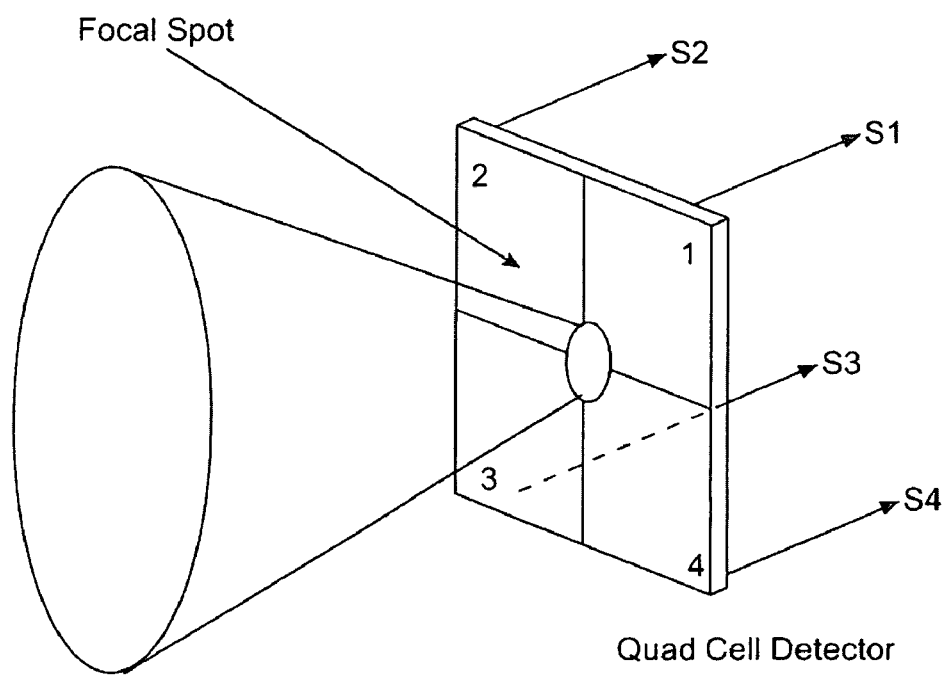
Figure 4A:
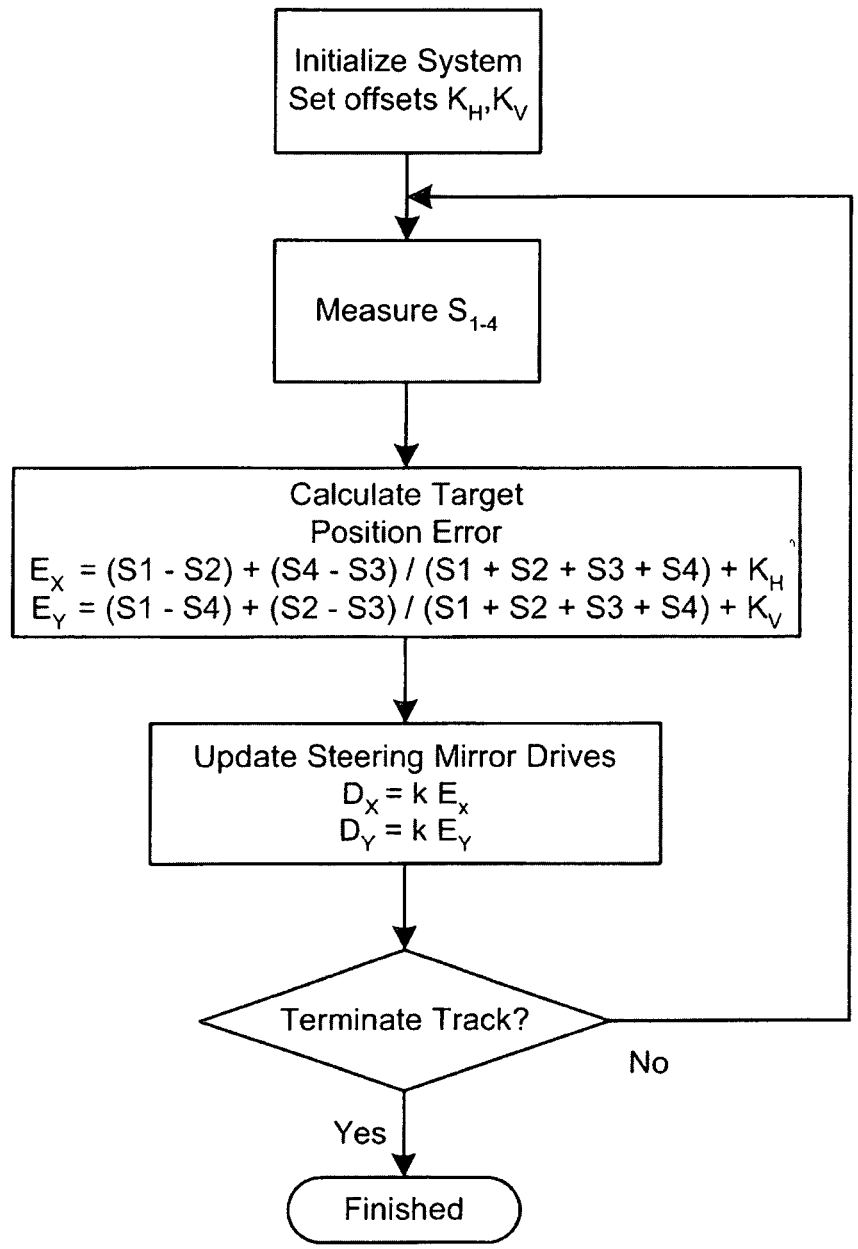
Figure 4B:
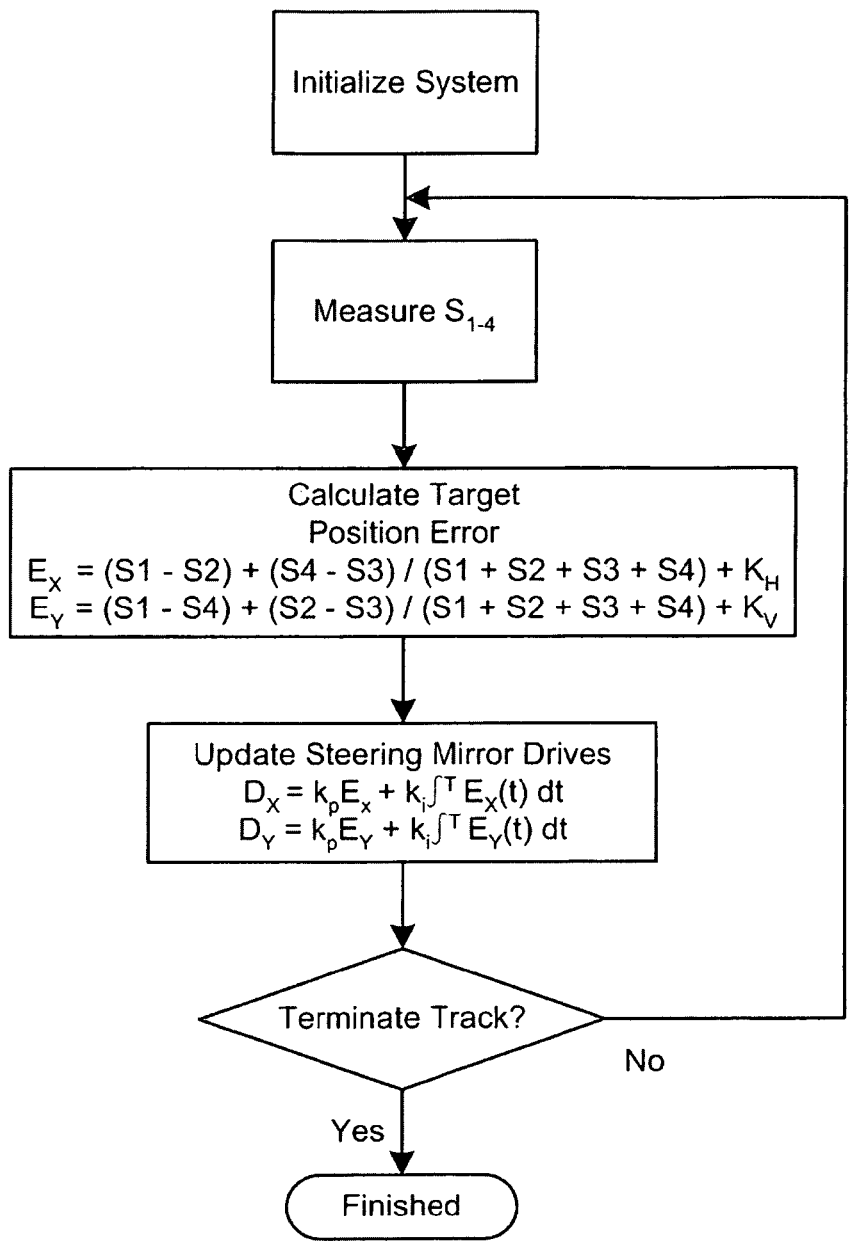
Figure 4C:
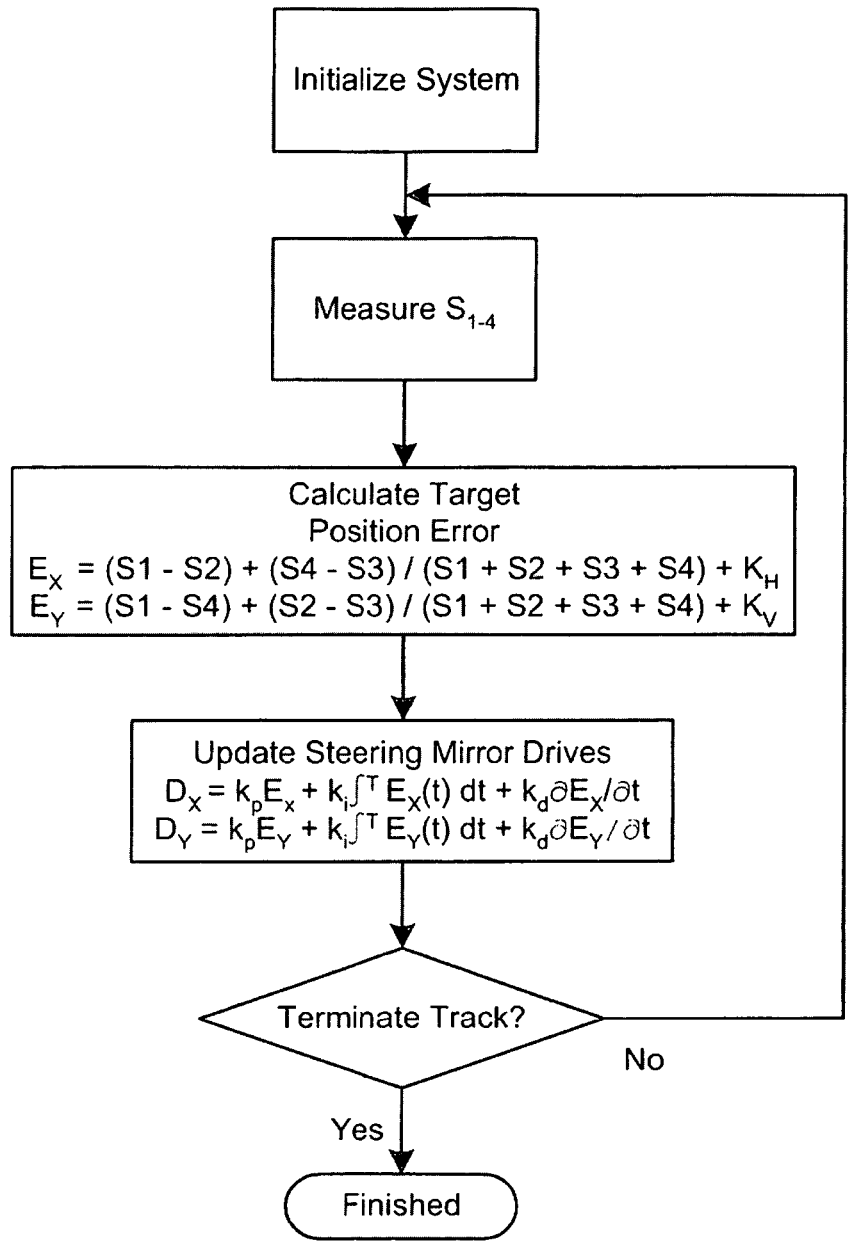
Figure 4D:
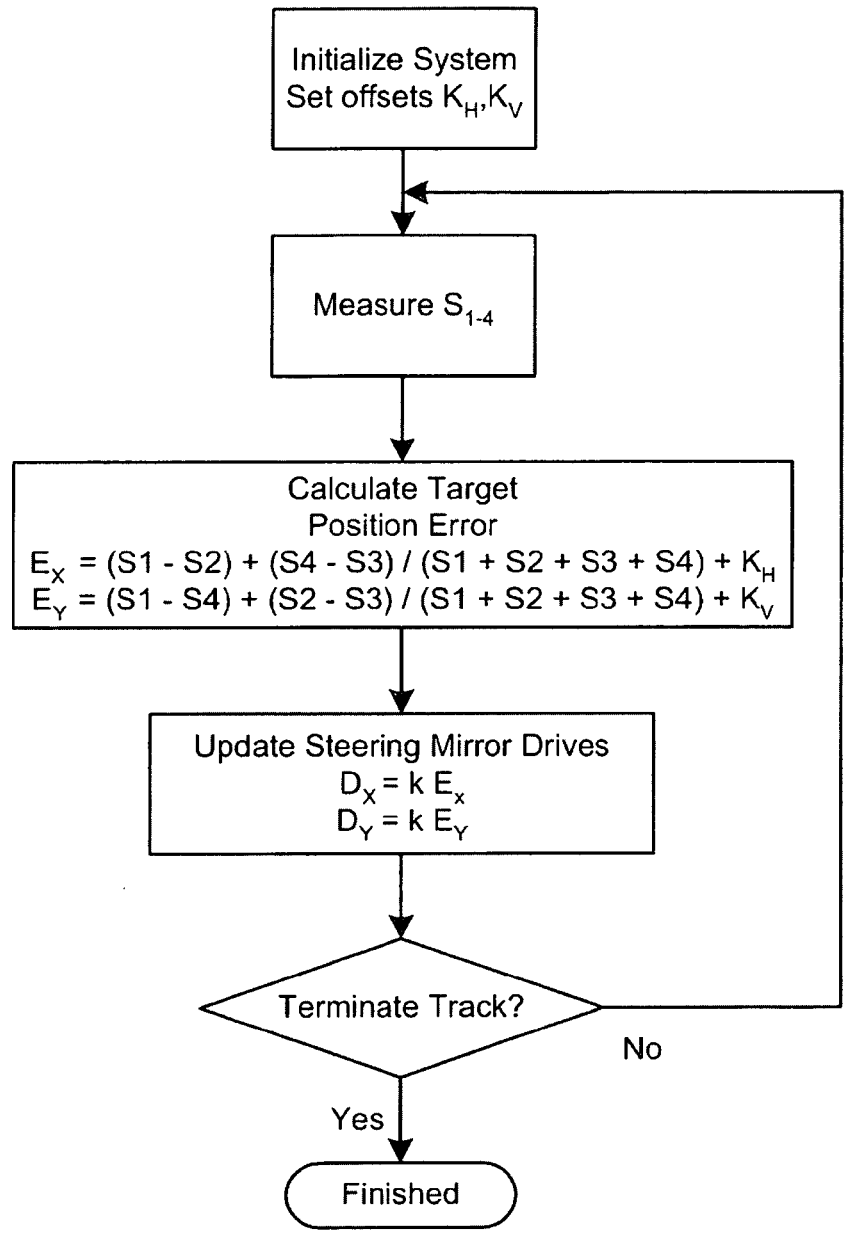
Figure 4E:
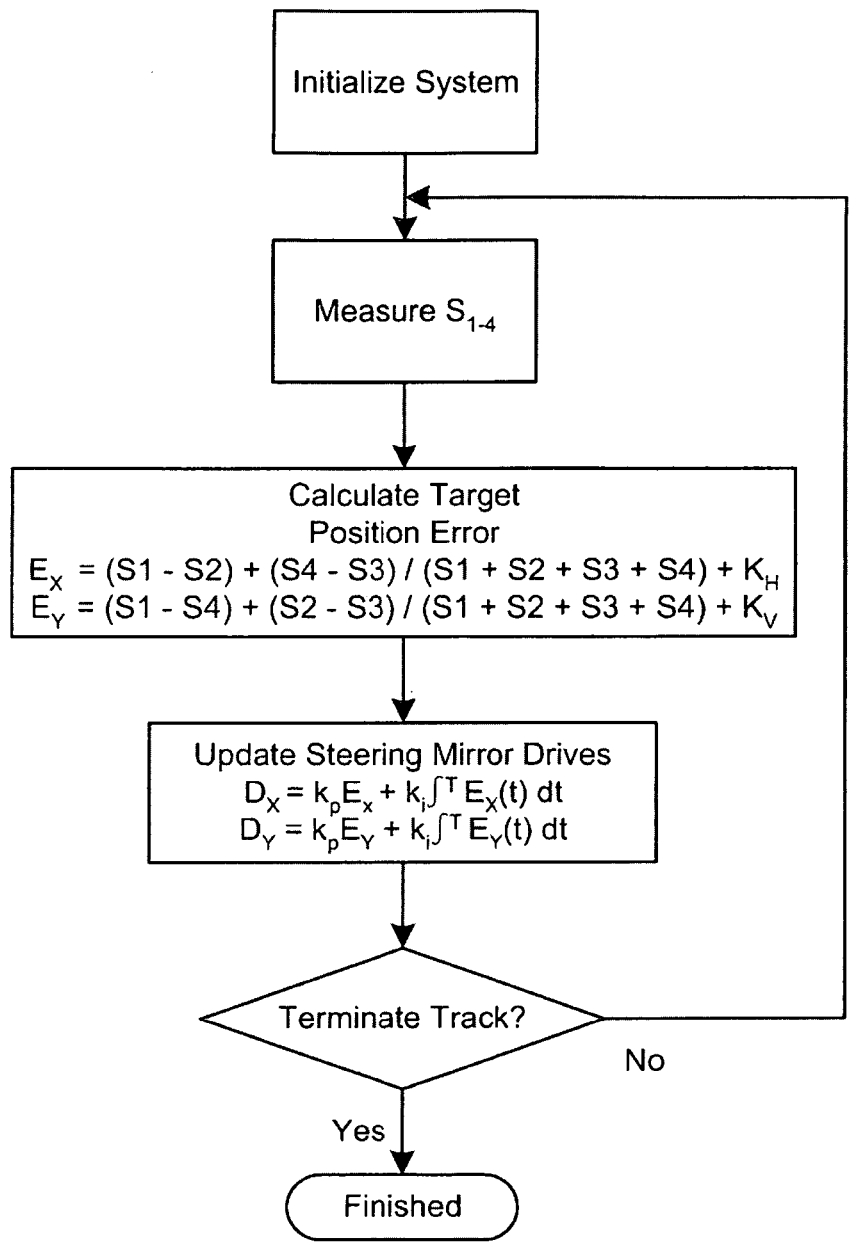
Figure 4F:
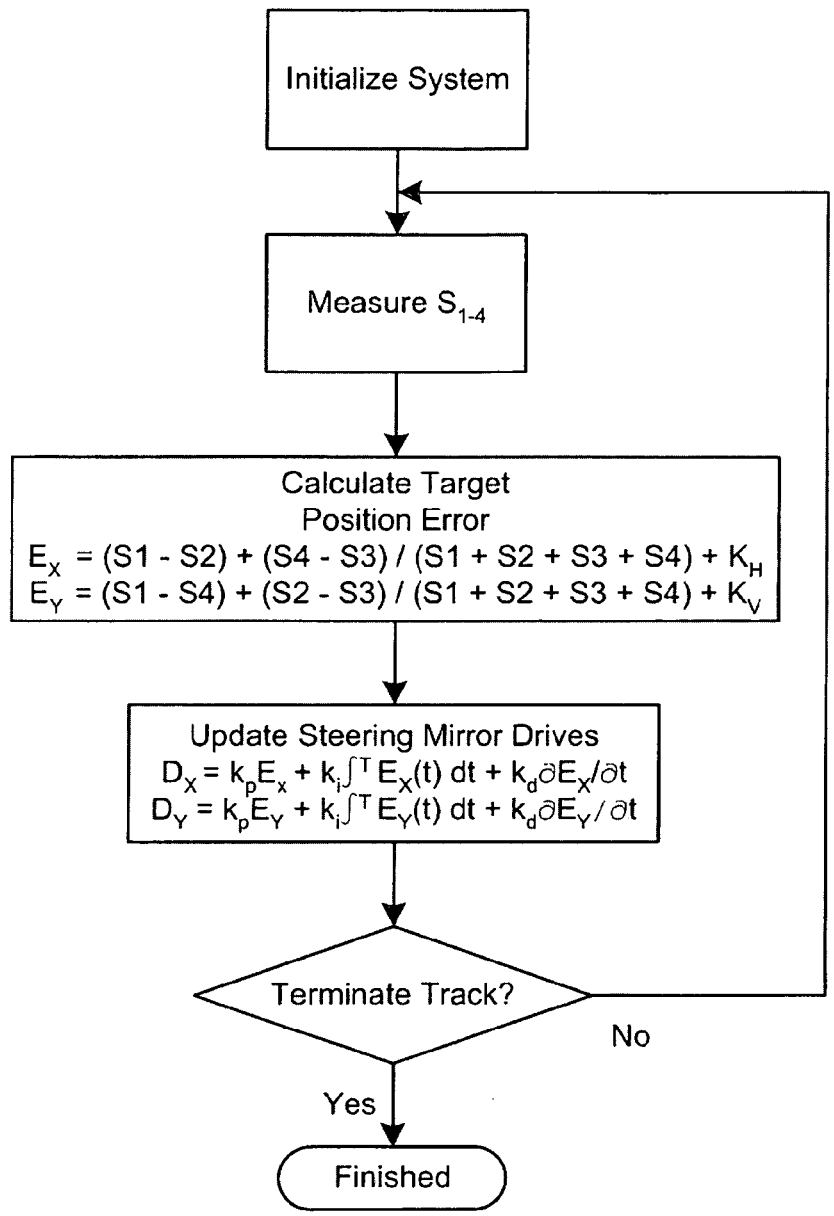
Figure 5A:
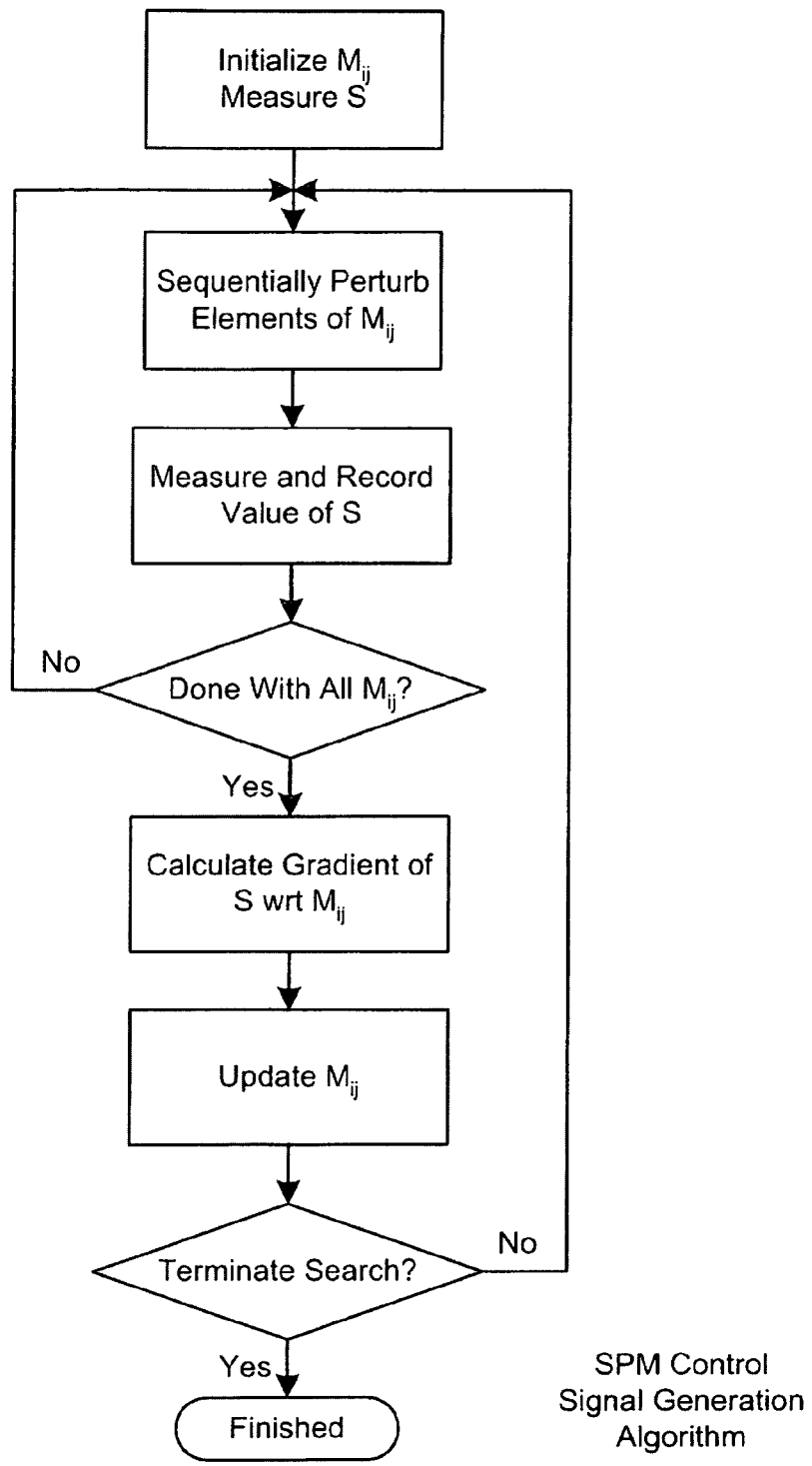
Figure 5B:
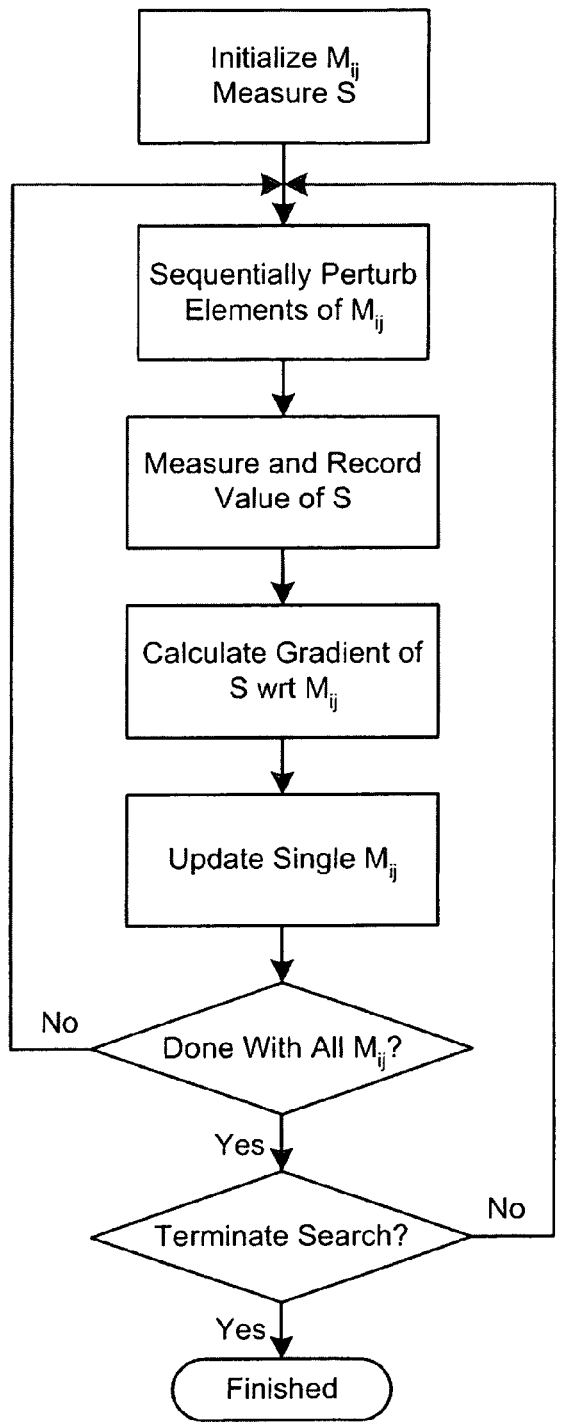
Figure 5C:
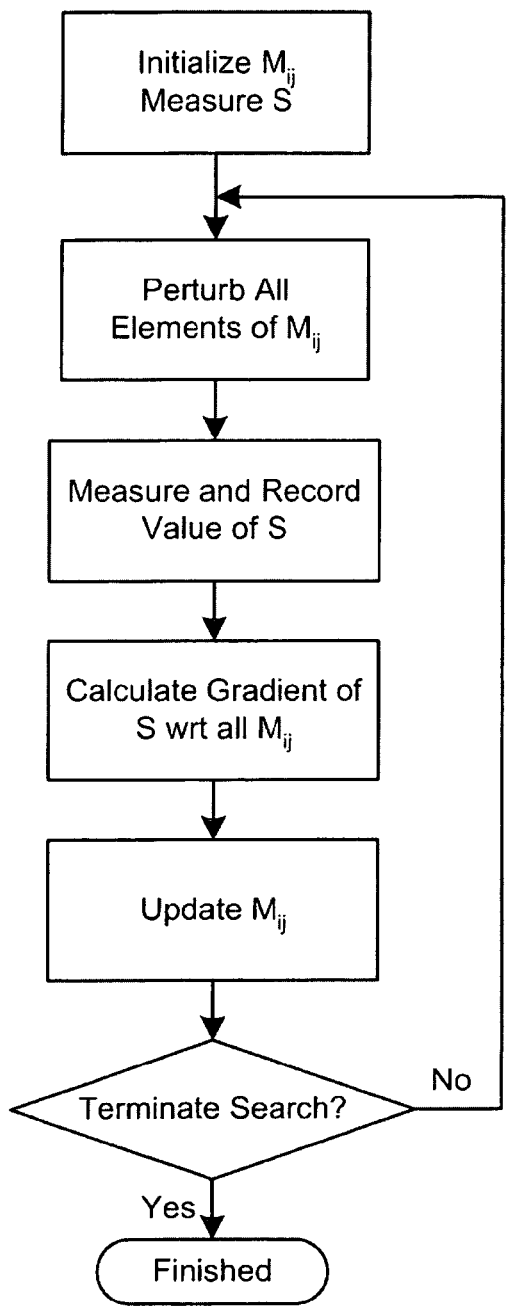
Figure 5D:
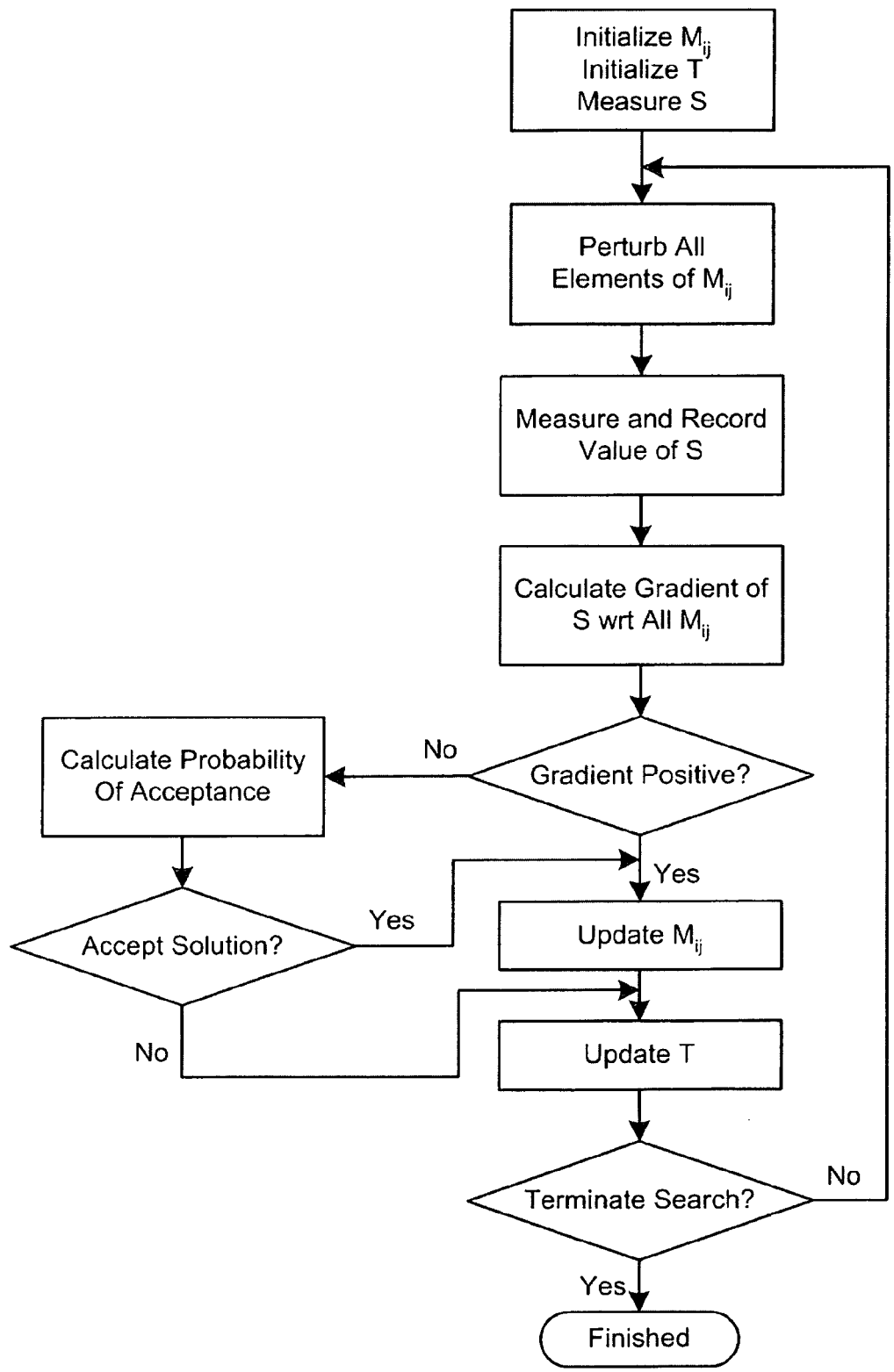
Figure 6A:
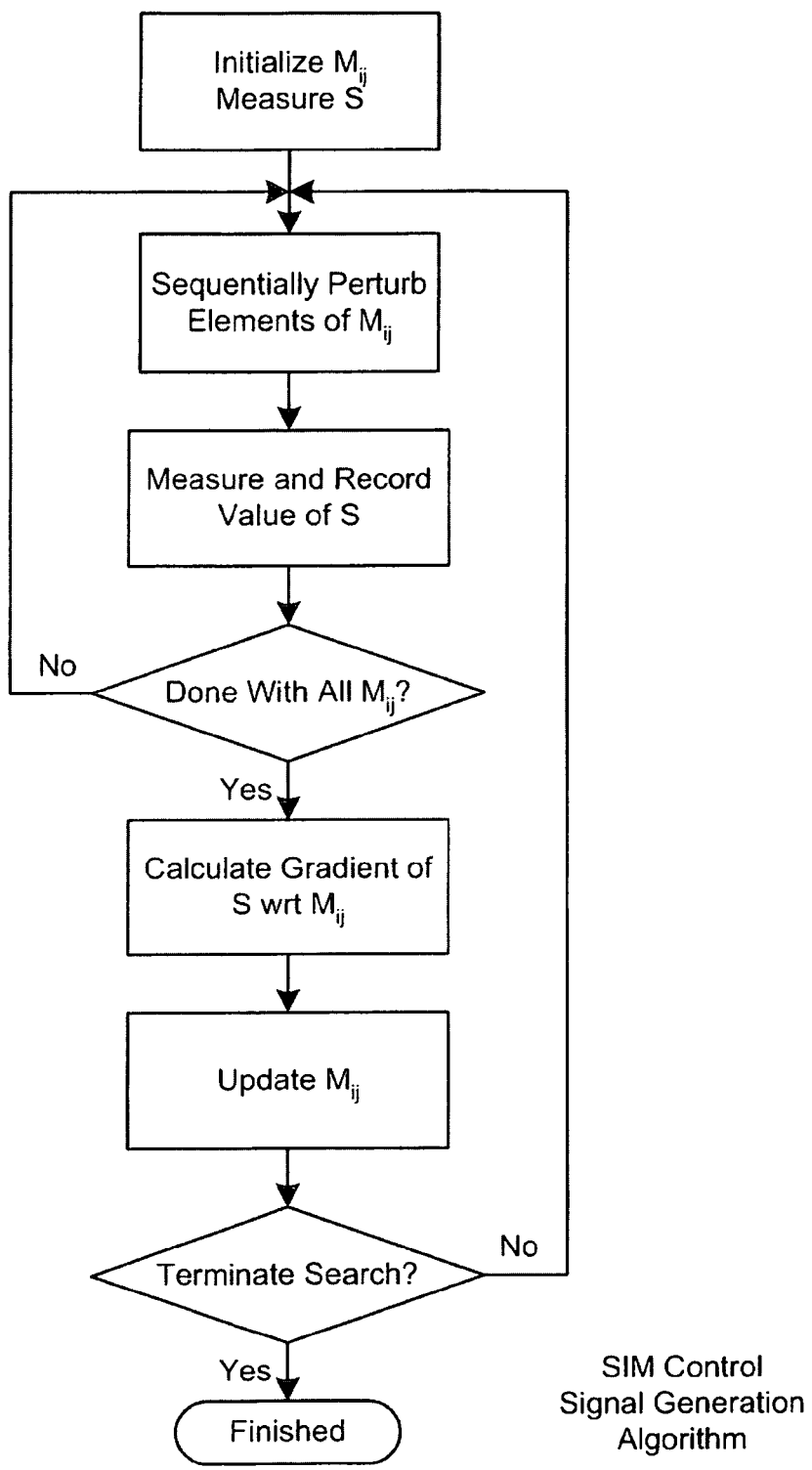
Figure 6B:
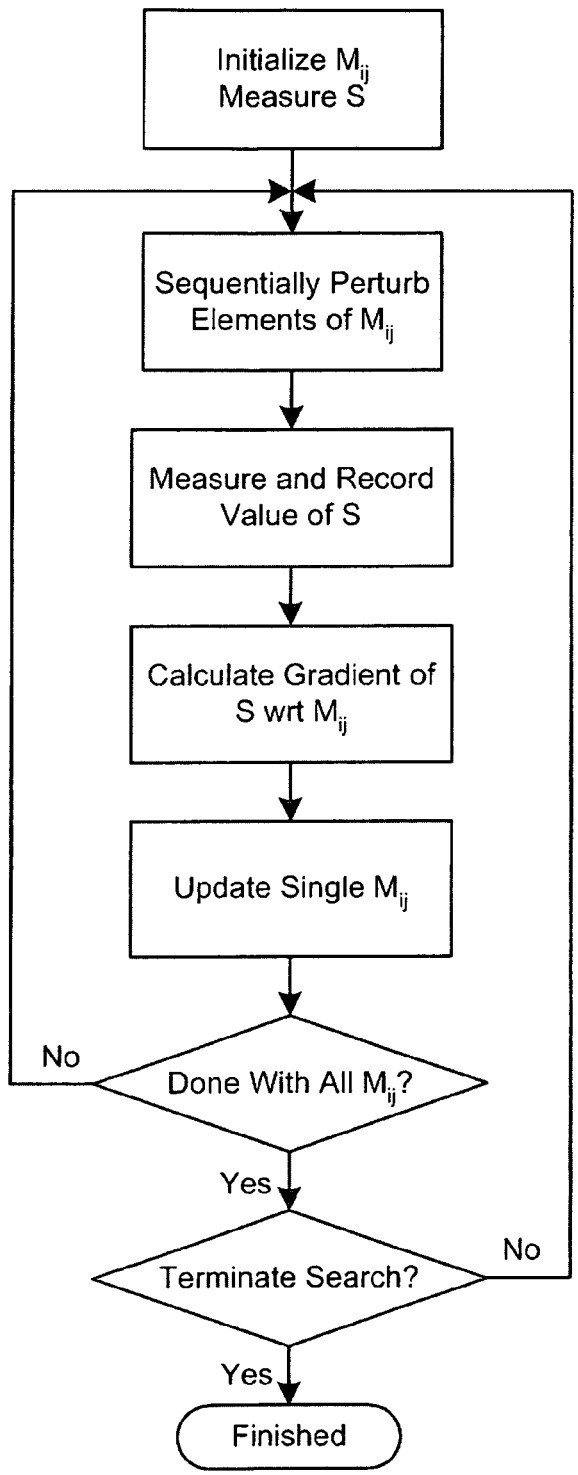
Figure 6C:
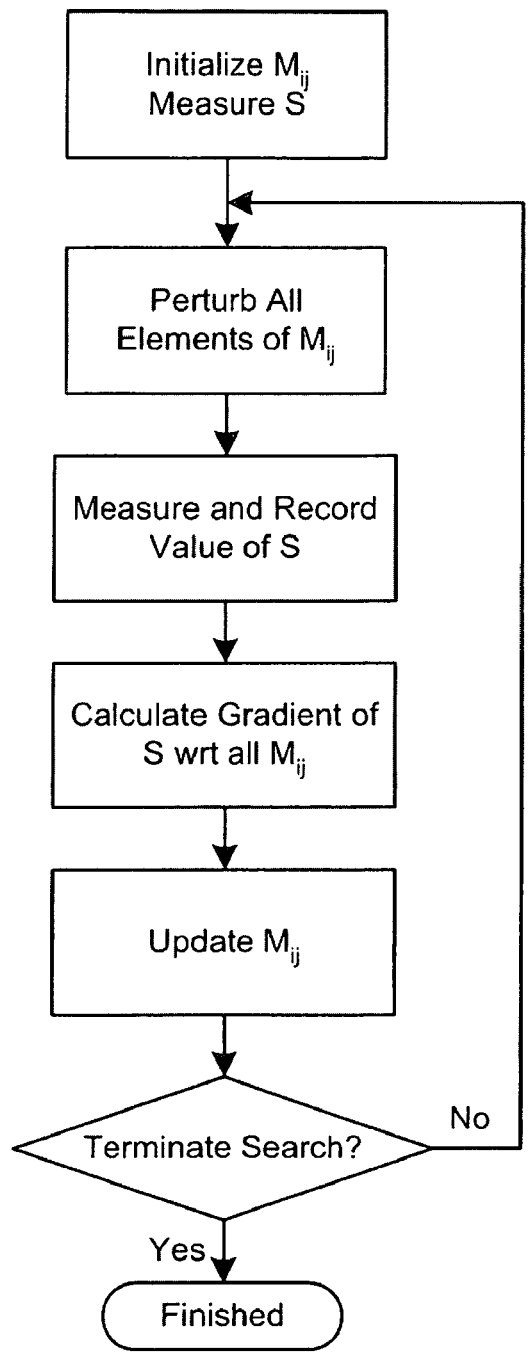
Figure 6D:
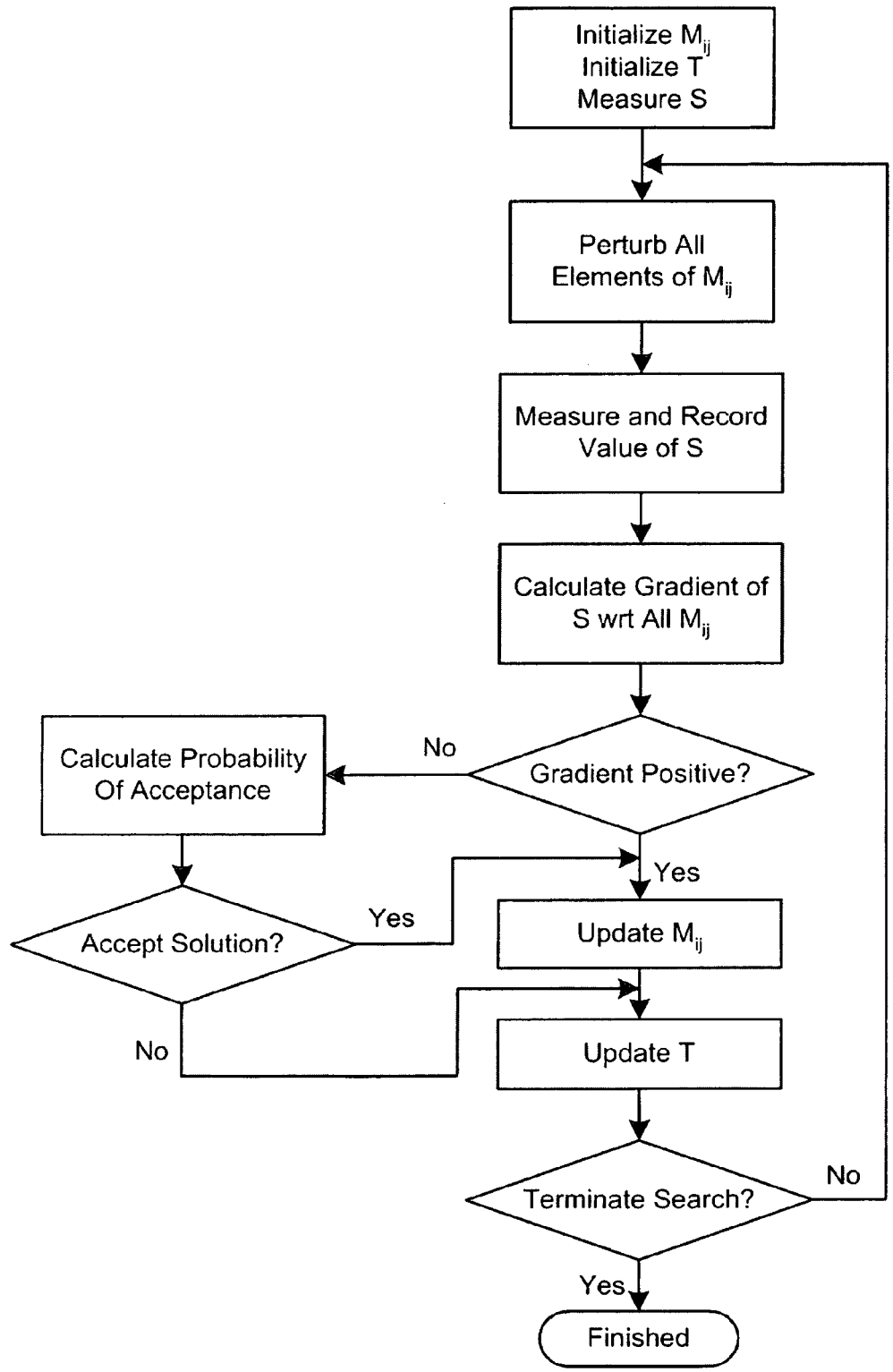
Figure 7B:
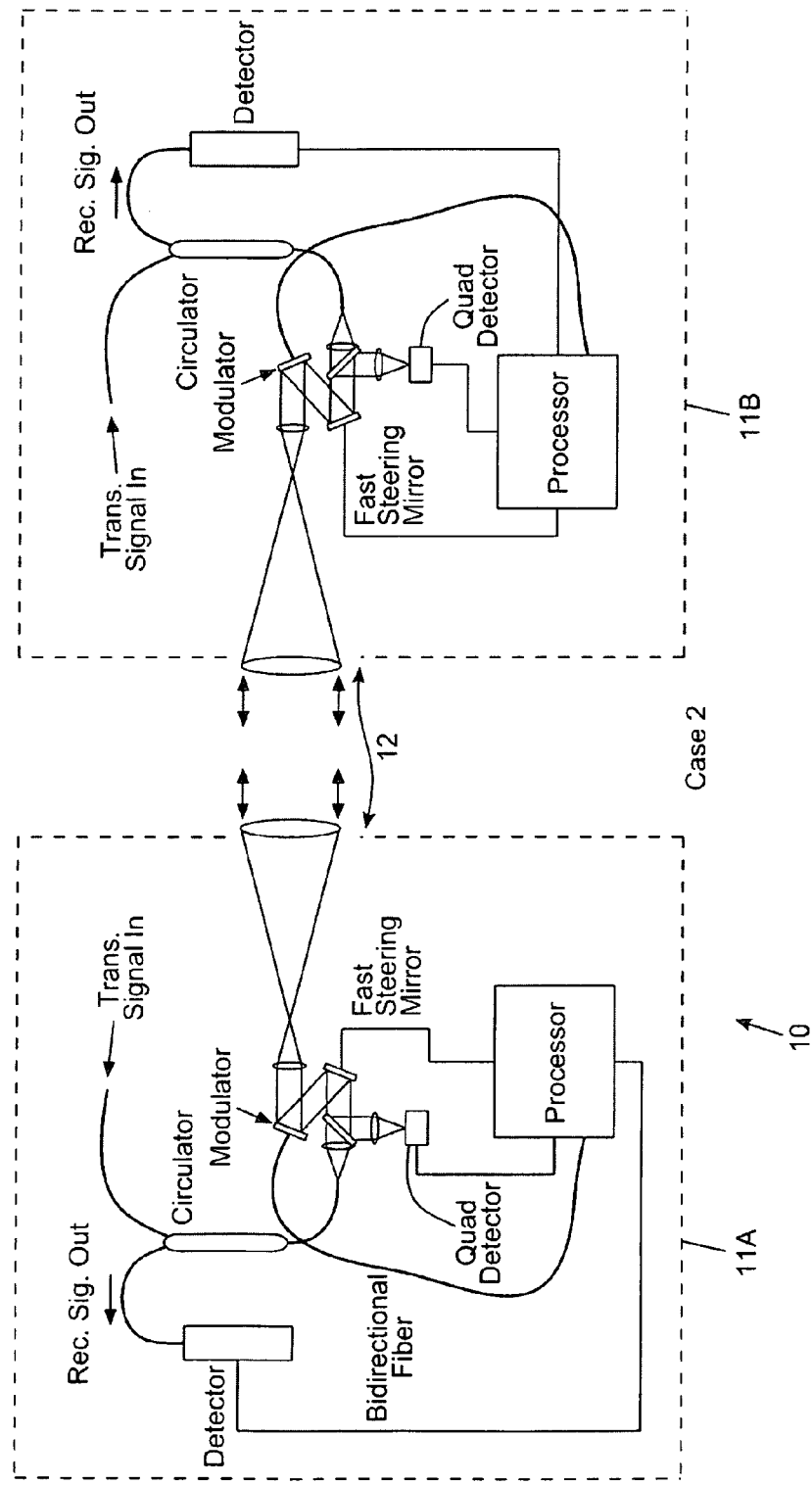
Figure 7C:
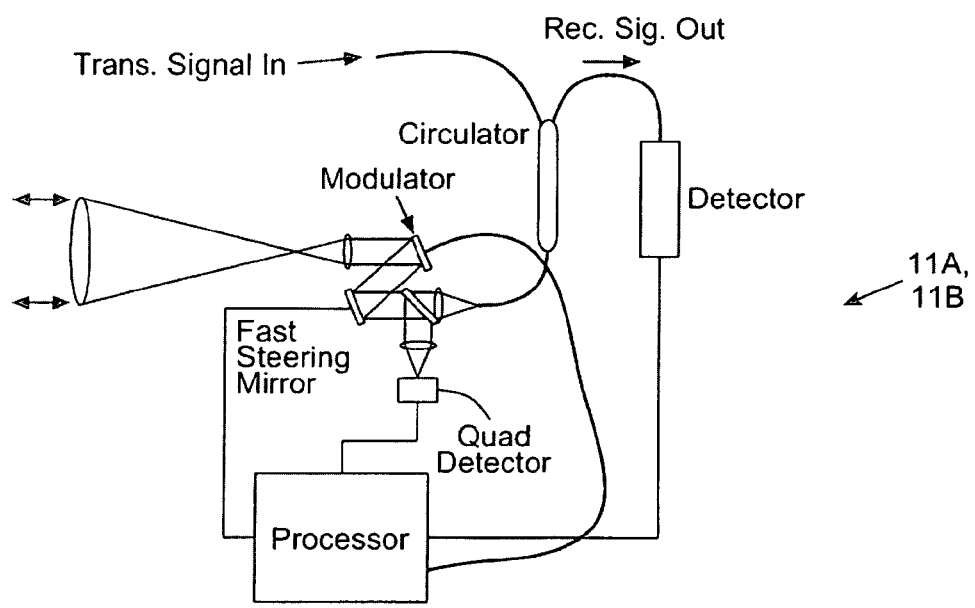
Figure 8B:
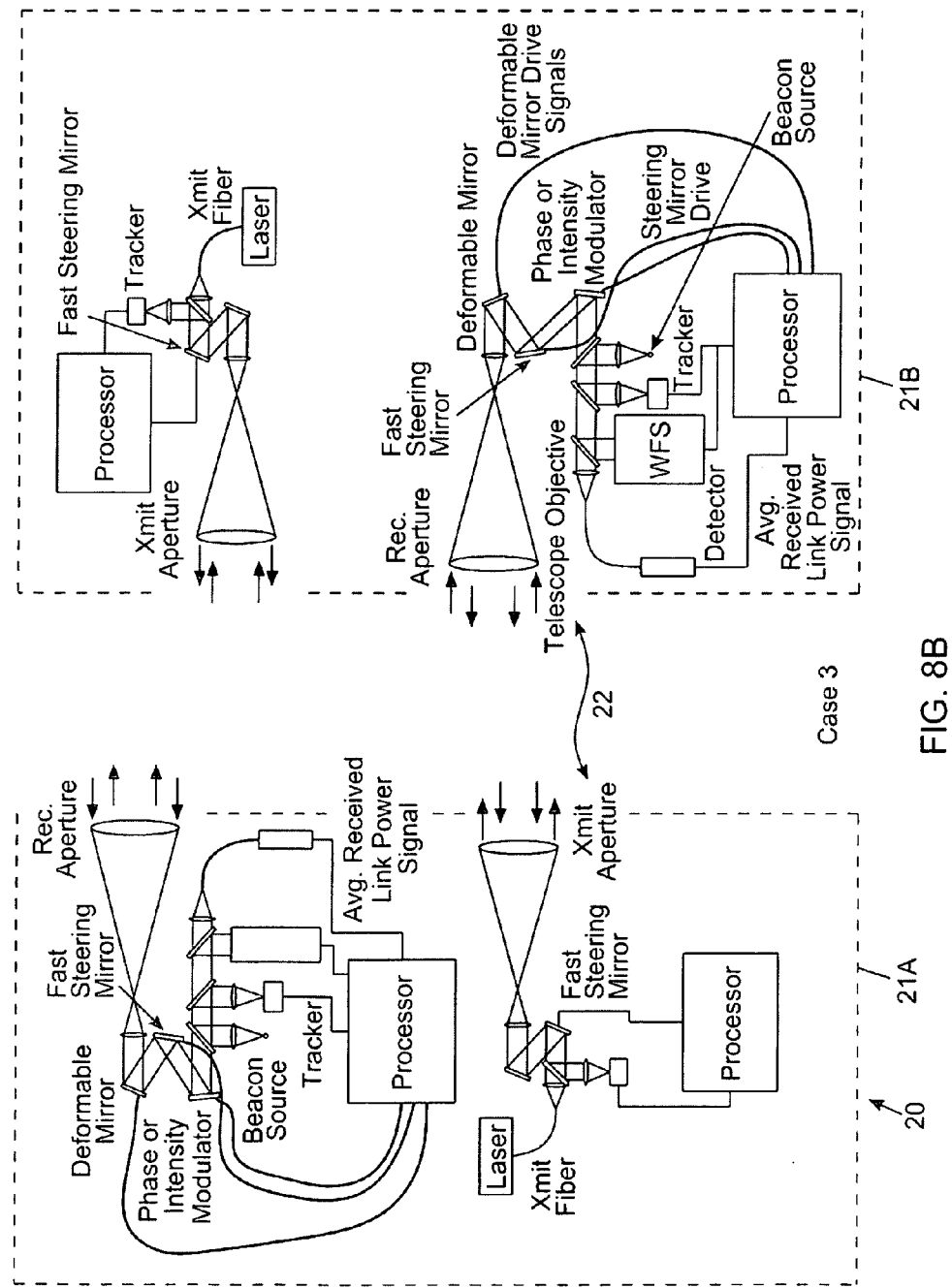
Figure 8C:
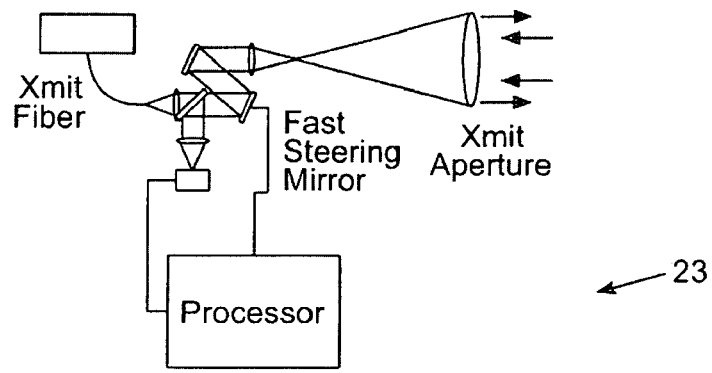
Figure 8D:
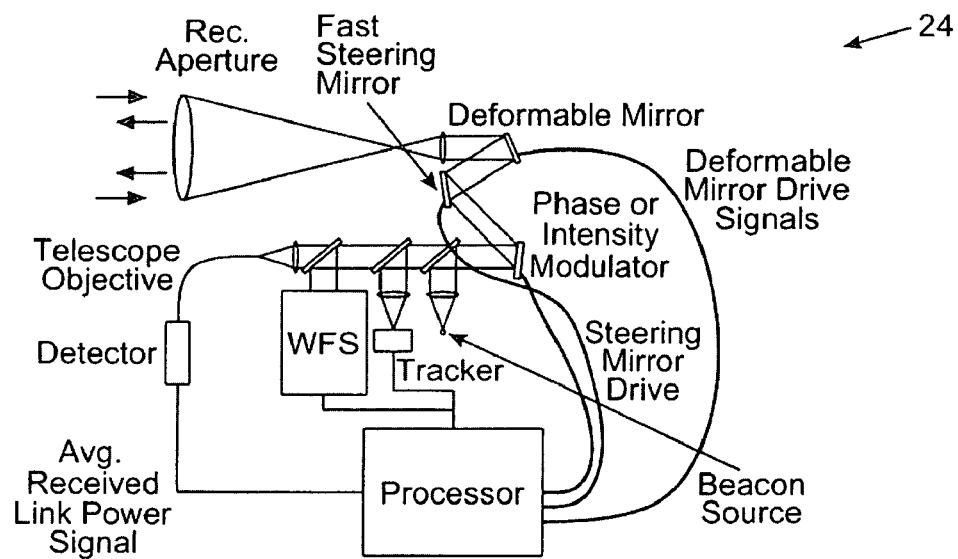
Figure 9A:
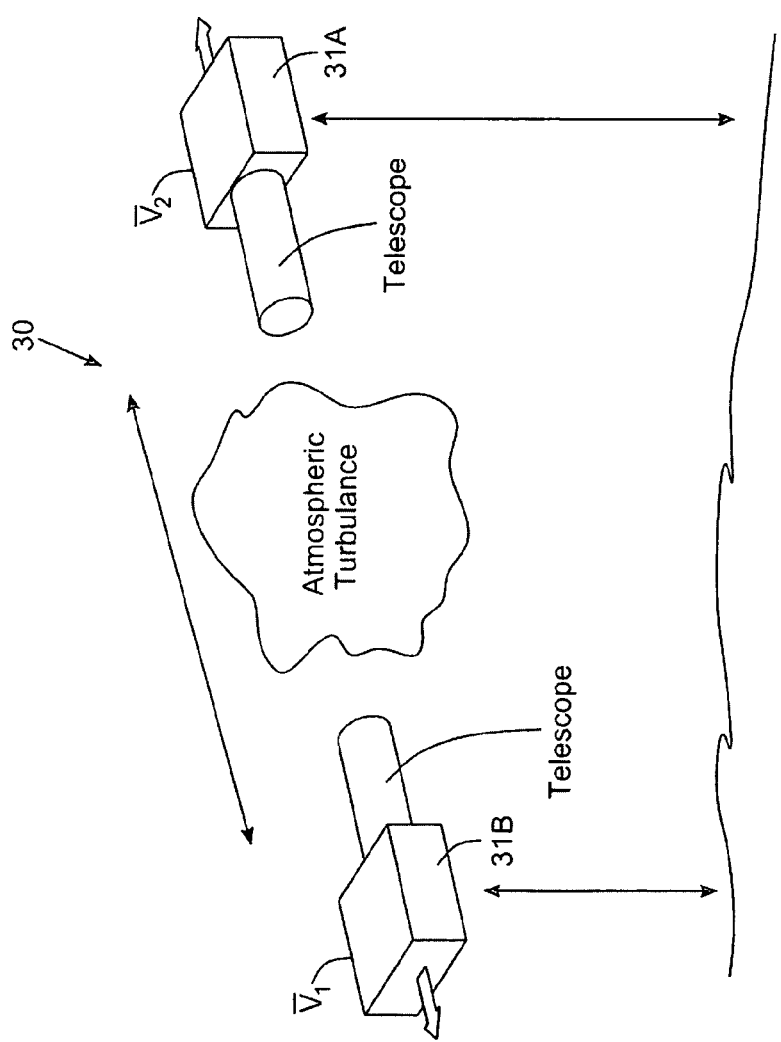
Figure 9B:
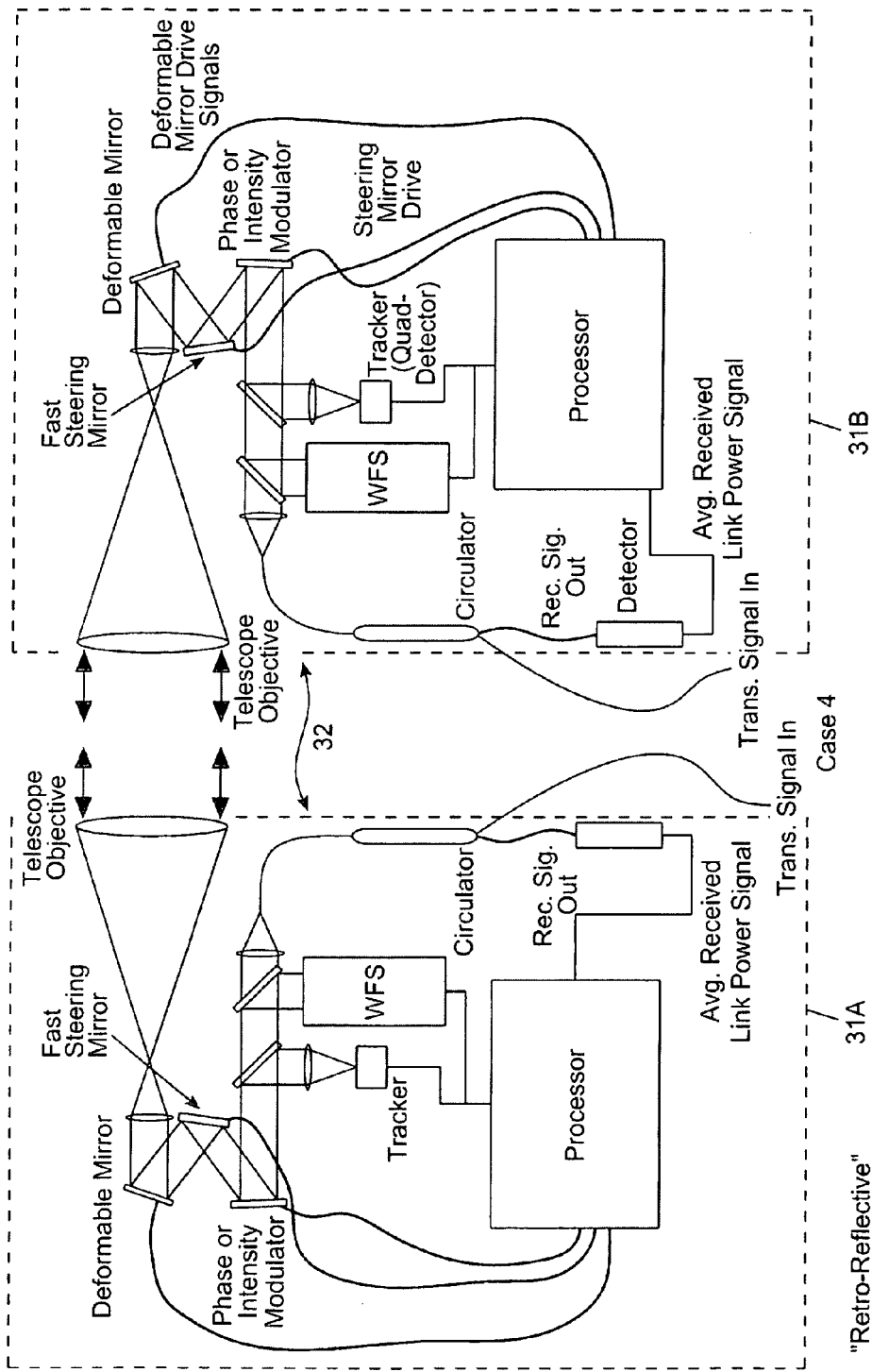
Figure 9C:
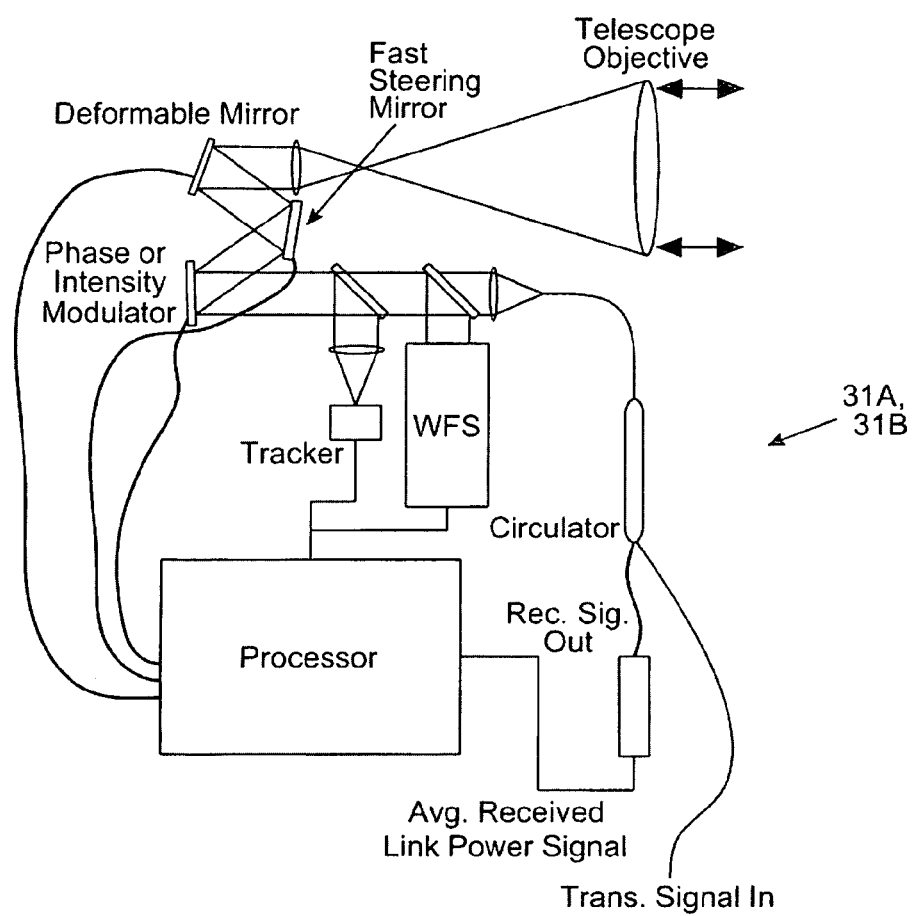
Figure 9D:
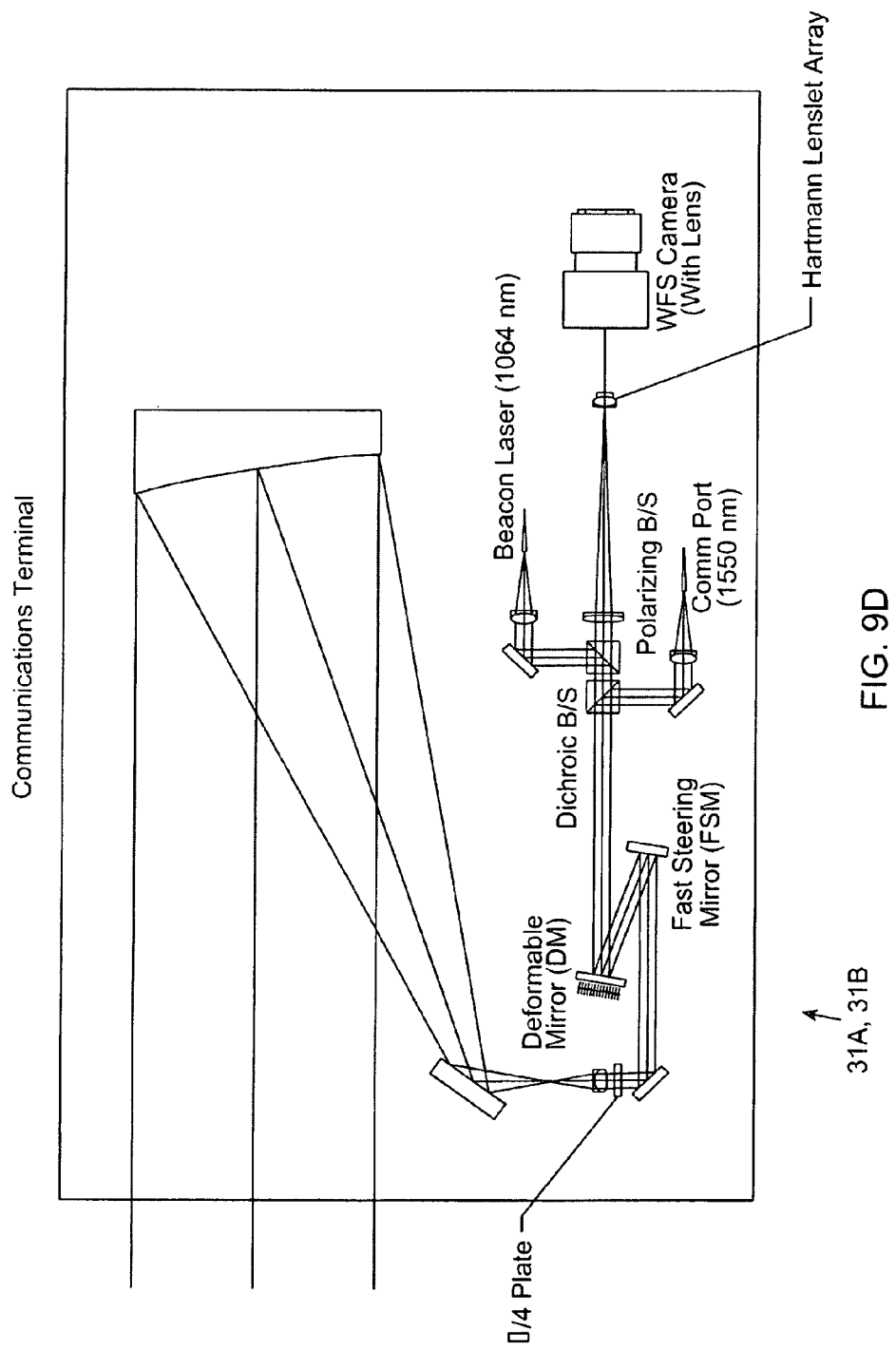
Figure 9E:
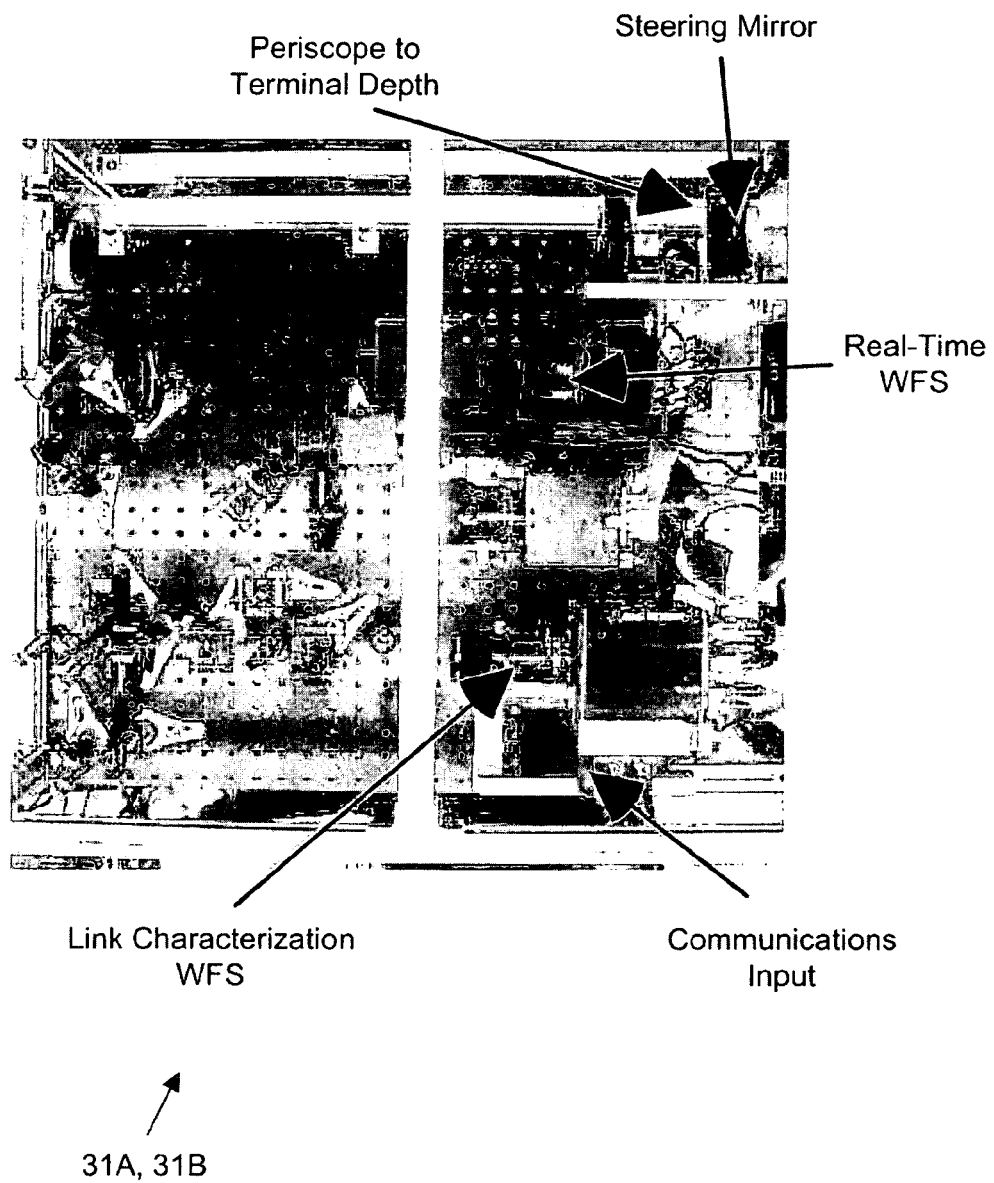
Figure 10A:
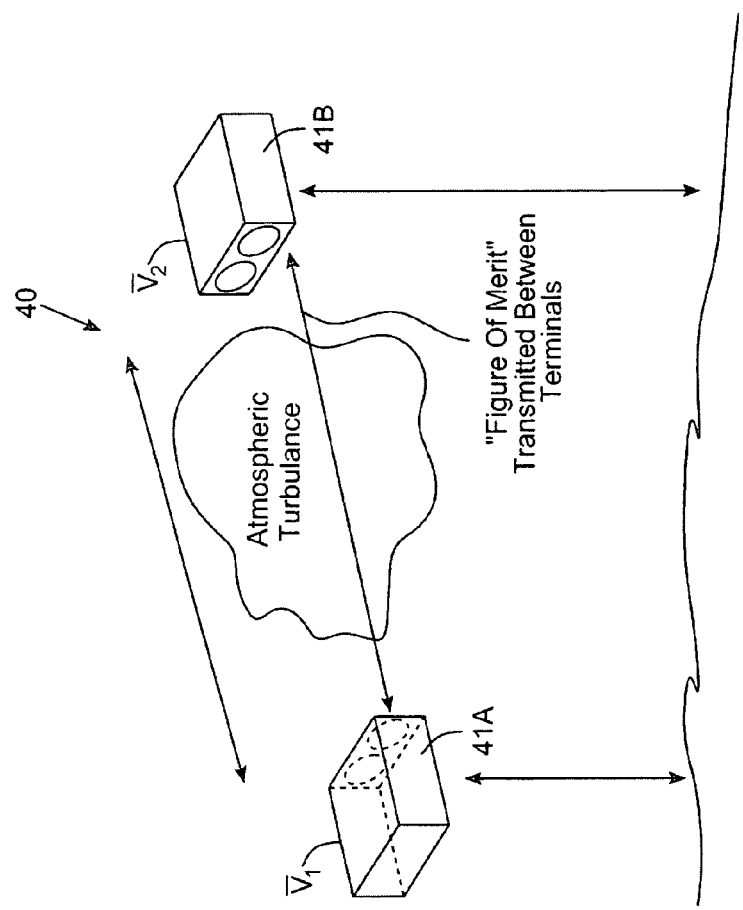
Figure 10B:
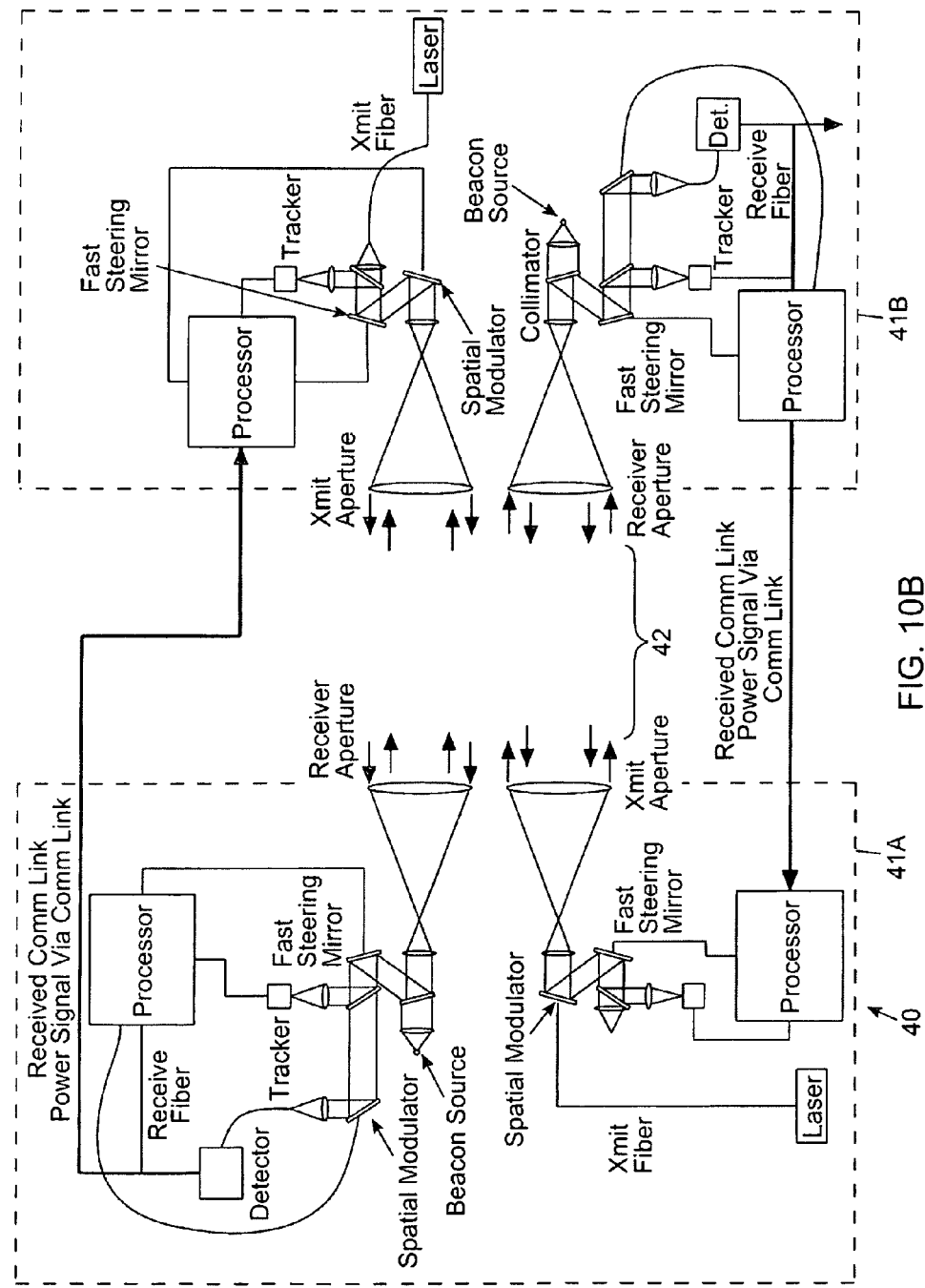

FIG. 1F1 is a plot of the atmospheric coherence length (Fried's $r_o$ parameter) versus aircraft altitude, calculated using a wavelength of 1550 nm;

FIG. 1F2 is a plot of isoplanatic angle versus aircraft altitude, calculated using a wavelength of 1550 nm;

FIG. 1G is a graphical representation of a phase screen generated for an aircraft altitude at an elevation of 35,000 feet, calculated using the integrated $C_n^2$ value of the link path;

FIG. 1H is the diffraction limited profile of the laser beam spot at the receiver of a satellite (left image) compared against a set of two examples of the laser beam spot profile at the receiver of a satellite, wherein each image covers about an area 100 m by 100 m, and wherein the laser beam profile in the center image shows that little power is lost due to wavefront aberration, while the laser beam profile in the right image shows that significant loss occurs due to dispersion of the laser beam;

FIG. 1I is a time series of laser beam power received at the receiver, calculated for a platform velocity of 200 m/s over about 0.1s of flight time, showing at time 20 msec that there is one deep fade event of about 10 db contained in this simulated data set;

FIG. 1J is a calculated Zernike Distribution for the rms variation in each of the lowest 15 Zernike terms representing a computed compensation for phase aberrations generated in the laser beam as a result of laser beam pointing errors along the laser communication link, wherein the bulk of the aberration is shown contained in the first three Zernike terms (i.e. two Zernike terms required for tilt compensation, and one Zernike term required for defocus compensation);

FIG. 1K is a simulation of a typical laser beam spot intensity distribution pattern shown varying randomly at the plane of the receiver aperture as the turbulence along a 10 km communication link path changes through an atmosphere having $C_n^2 = 1.0 \times 10^{-14}$ m$^{-2.3}$, and wherein the transmitter and receiver apertures are both 20 cm in diameter and the wavelength is 1.5 microns, and the full speckle image is 1 m×1 m;

FIG. 1L is a simulated spot of the received laser beam at the focal plane of the receiver, having the characteristics of a speckle image, wherein the scale of the (individual bright) speckle image is 1.25 μrad/pixel or 640 μrad for the full width of the image, and the diffraction limited spot size is 6 pixels, peak-to-null;

FIG. 1M is a simulated spot of the received laser beam at the focal plane of the receiver, showing a very dark portion of this speckle image falling onto the detector fiber core of the receiver, wherein the size and location of the detector or fiber core of the receiver is indicated as a small circle, and wherein (i) the fluctuations in the received intensity and (ii) the signal variations due to the moving speckle pattern at the focal plane, are not correlated;

FIG. 1N is a plot of log of the laser beam intensity (power) observed at the receiver detector versus the number of reiterations taken by the Laser Beam Speckle-Tracking algorithm hereof to find a new peak intensity to follow (at the detector), graphically illustrating that the laser beam intensity on the detector is monitored and when the intensity level falls below a predetermined threshold, then the line of sight of the laser beam is "shocked" and moved to a new location approximately a typical speckle spacing from its current location, and that this process is repeated until the detector intensity rises to an acceptable level, and thereafter the dithering of the received laser beam on the detector (i.e. fiber) is restarted, wherein one such "shocking" event is observed in FIG. 1N at about iteration number 220;

FIG. 1O is a plot of the probability density function (PDF) for the laser beam intensity data shown in FIG. 1N, clearly showing that the Laser Beam Speckle Tracking (i.e. Following) Mechanism of the present invention can effectively eliminate the long tail of low power fades observed in the raw (i.e. uncompensated) intensity data detected at the receiver, with occasional, intentional fades induced during the re-acquisition of speckle components (i.e. energy carrying beam spot components) during the Laser Beam Speckle Tracking Method of the present invention;

FIG. 1P is a set of calculated blur spots formed by introducing phase steps of 0.2, 0.5 and 1.0 waves in the entrance pupil of the communication receiver, illustrating that when a phase step is added to a random phase screen in the entrance pupil, the result is a modulation of the speckle pattern of laser beam spot detected by the fiber or detector;

FIG. 1Q is a series of speckle patterns observed within a detected laser beam spot, that are sinusoidally modulated at each location by adding phase steps of 0.2, 0.4, 0.6, 0.8 and 1.0 waves to a phase screen in the entrance pupil of the receiver, illustrating that the intensity of a given location within the speckle pattern (of the laser beam spot) can be maximized (i.e. optimized) by adjusting the size of the phase step, in accordance with the Speckle-to-Fiber/Detector Locking Method of the present invention carried out at the receiver of each terminal in the communication system;

FIG. 1R1 shows a plot of simulated log laser beam intensity (power) observed at the receiver detector versus the number of reiterations taken by the Speckle-to-Fiber/Detector Locking Mechanism of the present invention (using a 2×2 spatial phase modulation panel introduced in the entrance pupil of the receiver);

FIG. 1R2 shows a plot of simulated Log laser beam intensity (power) observed at the receiver detector versus the number of reiterations taken by the Speckle-to-Fiber/Detector Locking Mechanism of the present invention (using a 4×4 spatial phase modulation panel introduced in the entrance pupil of the receiver);

FIG. 1S is a plot of the probability density function (PDF) for the laser beam (speckle pattern) intensity data for simulations carried out using a 4×4 spatial phase modulation panel introduced in the entrance pupil of the receiver, showing that even when using a 4×4 (low spatial resolution) spatial phase modulation panel, having only sixteen (16) degrees of freedom, the Speckle-to-Fiber/Detector Locking Mechanism is capable of reducing significantly the occurrence of deep fades by virtue of its ability to lock the brightest laser beam speckle (in the laser beam spot image) onto the fiber/detector of the receiver, as turbulent atmospheric conditions move past the entrance pupil of thereof;

FIG. 2A is a schematic representation of an aircraft carrying a multi-point FSO laser communication platform in accordance with the principles of the present invention, and supporting numerous bi-directional FSO laser communication links with multi-point FSO laser communication platforms carried by other aircrafts, terrestrial vehicles and naval carriers, shown arranged in accordance with a military command, control and communications (C3) environment;

FIG. 2B is a schematic representation of a city having buildings, towers, and other civil structures, on which are supported a multi-point FSO laser communication platforms in accordance with the principles of the present invention, each supporting numerous bi-directional FSO laser communication links with others multi-point FSO laser communication platforms carried by civil structures arranged within a civilian environment;

FIG. 3A is a schematic representation of a free-space optical (FSO) laser communication system supporting optically-separated signal transmission and reception channels, and employing Laser Beam Pointing Mechanisms along the signal transmission channels thereof for automatically pointing the transmitted laser beam towards the receiver aperture of the communication system, and Laser Beam Speckle Tracking Mechanisms and Speckle-to-Fiber/Detector Mechanisms along the signal reception channels thereof for automatically stabilizing variations in the detected intensity of received laser beam carrier signals caused by atmospheric turbulence along said signal channels;

FIG. 3B is a schematic optical diagram of the free-space optical (FSO) laser communication system of FIG. 3A, showing the transmitter and receiver module of each terminal in the system being arranged along optically-separated signal transmission and reception channels, and Laser Beam Pointing Mechanisms being employed along the signal transmission channels thereof for automatically pointing the transmitted laser beam towards the receiver aperture of the communication system, Laser Beam Speckle Tracking Mechanisms being employed in both the signal reception channels of system for automatically tracking (i.e. following) maximum intensity laser beam speckle and moving away from low intensity (i.e. black) laser beam speckle so as to achieve a first level of optical signal intensity stabilization at signal detector of the receiver modules, and also Speckle-to-Fiber/Detector Mechanism in the signal reception channels of system to automatically lock a maximum intensity laser beam speckle onto a fiber/detector, and thereby achieve a second level of optical signal intensity stabilization at the signal detector in the receiver modules of the system;

FIG. 3C is a schematic optical diagram of the transmitter module in each terminal of the laser communication system of FIG. 3A;

FIG. 3D is a schematic optical diagram of the receiver module in each terminal of the laser communication system of FIG. 3A;

FIG. 3E is a schematic representation of a 4×4 spatial phase modulation panel of used in the receiver module of each terminal in the laser communication system of FIG. 3A;

FIG. 3F is a schematic representation of a 4 cell (i.e. quadrant-type) signal detector used in the laser beam spot tracking mechanism in the receiver module of each terminal in the laser communication system of FIG. 3A;

FIG. 4A is a flow chart showing the steps involved in a first method of generating a control signal for supply to the fast steering mirror (FSM) used in the Laser Beam Tracking Mechanism in the transmitter module of each the laser communication system of the present invention;

FIG. 4B is a flow chart showing the steps involved in a second method of generating a proportional control signal for supply to the FSM used in the Laser Beam Tracking Mechanism in the transmitter module of each the laser communication system of the present invention;

FIG. 4C is a flow chart showing the steps involved in a third method of generating a proportional plus integral plus derivative control signal for supply to the FSM used in the Laser Beam Tracking Mechanism in the transmitter module of each the laser communication system of the present invention;

FIG. 4D is a flow chart showing the steps involved in a first method of generating a control signal for supply to the fast steering mirror (FSM) used in the Laser Beam Speckle Tracking Mechanism in the receiver module of each the laser communication system of the present invention;

FIG. 4E is a flow chart showing the steps involved in a second method of generating a proportional control signal for supply to the FSM used in the Laser Beam Speckle Tracking Mechanism in the receiver module of each the laser communication system of the present invention;

FIG. 4F is a flow chart showing the steps involved in a third method of generating a proportional plus integral plus derivative control signal for supply to the FSM used in the Laser Beam Speckle Tracking Mechanism in the receiver module of each the laser communication system of the present invention;

FIG. 5A is a flow chart showing the steps involved in a first illustrative embodiment of the method of the present invention, for generating spatial phase modulation panel drive signals to be provided to the spatial phase modulation panel (i.e. deformable mirror) employed in Speckle-to-Fiber/Detector Locking Mechanism in the receiver module of each laser communication system of the present invention;

FIG. 5B is a flow chart showing the steps involved in a second illustrative embodiment of the method of the present invention, for generating spatial phase modulation panel drive signals to be provided to the spatial phase modulation panel (i.e. deformable mirror) employed in the Speckle-to- Fiber/Detector Locking Mechanism in the receiver module of each laser communication system of the present invention;

FIG. 5C is a flow chart showing the steps involved in a third illustrative embodiment of the method of the present invention, for generating spatial phase modulation drive signals to the supplied to the spatial phase modulation panel (i.e. deformable mirror) employed in the Speckle-To-Fiber/Detector Locking Mechanism in the receiver module of each laser communication system of present invention;

FIG. 5D is a flow chart showing the steps involved in a first illustrative embodiment of the method of the present invention, for generating speckle-to-fiber/detector locking drive signals to the spatial phase modulation panel (i.e. deformable mirror) employed in the receiver module of each laser communication system of the present invention;

FIG. 6A is a flow chart showing the steps involved in a first illustrative embodiment of the method of the present invention, for generating spatial intensity modulation drive signals to be provided to the spatial intensity modulation panel employed in the Speckle-To-Fiber/Detector Locking Mechanism in the receiver module of each laser communication system of the present invention;

FIG. 6B is a flow chart showing the steps involved in a second illustrative embodiment of the method of the present invention, for generating spatial intensity modulation drive signals in the Speckle-To-Fiber/Detector Locking Mechanism in the receiver module of each laser communication system of the present invention;

FIG. 6C is a flow chart showing the steps involved in a third illustrative embodiment of the method of the present invention, for generating spatial intensity modulation drive signals to be provided to the spatial intensity modulation panel employed in the Speckle-To-Fiber/Detector Locking Mechanism in the receiver module of each laser communication system of the present invention;

FIG. 6D is a flow chart showing the steps involved in a first illustrative embodiment of the method of the present invention, for generating spatial intensity modulation drive signals to be provided to the spatial intensity modulation panel employed in the Speckle-To-Fiber/Detector Locking Mechanism in the receiver module of each laser communication system of the present invention;

FIG. 7A is a schematic representation of a free-space optical (FSO) laser communication system supporting optically-combined signal transmission and reception channels, and employing Laser Beam Pointing Mechanisms being employed along the signal transmission channels thereof for automatically pointing the transmitted laser beam towards the receiver aperture of the communication system, and Laser Beam Speckle Tracking Mechanism and Speckle-to-Fiber/Detector Locking Mechanisms employed along the signal reception channels thereof for automatically locking a maximum intensity laser beam speckle onto a fiber/detector, and thereby stabilizing variations in the detected intensity of received laser beam carrier signals caused by atmospheric turbulence along said signal channels;

FIG. 7B is a schematic optical diagram of the free-space optical (FSO) laser communication system of FIG. 37, showing the transceiver module of each terminal in the system being arranged along optically-combined signal transmission and reception channels, and Laser Beam Pointing Mechanisms being employed along the signal transmission channels thereof for automatically pointing the transmitted laser beam towards the receiver aperture of the communication system, Laser Beam Speckle Tracking Mechanisms being employed in both the signal reception channels of system to achieve a first level of optical signal intensity stabilization at signal detector of the transceiver modules, and also a Speckle-to-Fiber/Detector Mechanisms in the signal reception channels of system to automatically lock a maximum intensity laser beam speckle onto a fiber/detector, and thereby achieve a second level of optical signal intensity stabilization at the signal detector in the transceiver modules of the system;

FIG. 7C is a schematic optical diagram of the transceiver module in each terminal of the laser communication system of FIG. 3A;

FIG. 8A is a schematic representation of a free-space adaptive optical (FS-OA) laser communication system supporting optically-separated signal transmission and reception channels and employing Laser Beam Pointing Mechanisms along the signal transmission channels thereof for automatically pointing the transmitted laser beam towards the receiver aperture of the communication system, and Laser Beam Speckle Tracking Mechanisms and Speckle-to-Fiber/Detector Locking Mechanisms along the signal reception channels thereof for automatically locking a maximum intensity laser beam speckle onto a fiber/detector, thereby stabilizing variations in the intensity of received laser beam carrier signals caused by atmospheric turbulence along said signal channels;

FIG. 8B is a schematic optical diagram of the FS-AO laser communication system of FIG. 8A, showing the transmitter and receiver module of each terminal in the system being arranged along optically-separated signal transmission and reception channels having AO-compensation mechanisms, and Laser Beam Pointing Mechanisms being employed along the signal transmission channels thereof for automatically pointing the transmitted laser beam towards the receiver aperture of the communication system, Laser Beam Speckle Tracking Mechanisms being employed in the signal reception channels of system to achieve a first level of optical signal intensity stabilization at signal detector of the receiver modules, and also Speckle-to-Fiber/Detector Locking Mechanism in the signal reception channels of system to automatically lock a maximum intensity laser beam speckle onto a fiber/detector, and thereby achieve a second level of optical signal intensity stabilization at the signal detector in the receiver modules of the system;

FIG. 8C is a schematic optical diagram of the transmitter module in each terminal of the laser communication system of FIG. 8A;

FIG. 8D is a schematic optical diagram of the receiver module in each terminal of the laser communication system of FIG. 8A;

FIG. 9A is a schematic representation of a free-space adaptive optical (FS-OA) laser communication system supporting optically-combined signal transmission and reception channels and employing Laser Beam Pointing Mechanisms along the signal transmission channels thereof for automatically pointing the transmitted laser beam towards the receiver aperture of the communication system, and Laser Beam Speckle Tracking Mechanisms and Speckle-to-Fiber/Detector Mechanisms along the signal reception channels thereof for automatically locking a maximum intensity laser beam speckle onto a fiber/detector of the receiver, thereby stabilizing variations in the intensity of received laser beam carrier signals caused by atmospheric turbulence along said signal channels;

FIG. 9B is a schematic optical diagram of the FS-AO laser communication system of FIG. 9A, showing the transceiver module of each terminal in the system being arranged along optically-combined signal transmission and reception channels having AO-compensation mechanisms, and Laser Beam Pointing Mechanisms being employed along the signal transmission channels thereof for automatically pointing the transmitted laser beam towards the receiver aperture of the communication system, Laser Beam Speckle Tracking Mechanisms being employed in the signal reception channels of system to achieve a first level of optical signal intensity stabilization at signal detector of the transceiver modules, and also Speckle-to-Fiber/Detector Locking Mechanism in the signal reception channels of system to automatically lock a maximum intensity laser beam speckle onto the fiber/detector of the receiver, and achieve a second level of optical signal intensity stabilization at the signal detector in the transceiver nodules of the system;

FIG. 9C is a schematic optical diagram of the transceiver module in each terminal of the laser communication system of FIG. 9A;

FIG. 9D is a schematic diagram of the FS-OA laser communication terminal used in the laser communication system of FIG. 9A;

FIG. 9E is a photograph of a tripod-mounted FS-OA laser communication terminal constructed in accordance with the architecture of FIG. 9B, wherein the transceiver telescope has a 20 cm aperture and is mounted beneath the optical bench of the terminal, and a high-spatial resolution AO (WFS/WFC) compensation subsystem is provided for communication link characterization/compensation, and a real-time subsystem is provided for stabilizing the intensity of laser beam carrier signals detected at the transceiver of the system;

FIG. 9F is a photograph of a compact FS-OA laser communication terminal also constructed in accordance with the architecture of FIG. 9B, wherein the transceiver telescope has a 15 cm aperture and is mounted beneath the optical bench of the terminal, and a high-spatial resolution AO (WFS/WFC) compensation subsystem is provided for communication link characterization/compensation, and a real-time subsystem having a Laser Beam Speckle Tracking Mechanism (including a fast steering mirror FSM)) and a Speckle-to-Fiber/Detector Locking Mechanism (including a deformable mirror as a spatial phase modulation panel) are provided for automatically locking a maximum intensity laser beam speckle onto a fiber/detector of the receive, thereby stabilizing the intensity of laser beam carrier signals detected at the transceiver of the system, in response to atmospheric turbulence;

FIG. 10A is a schematic representation of a free-space adaptive optical (FS-OA) laser communication system supporting optically-combined signal transmission and reception channels and employing Laser Beam Pointing Mechanisms along the signal transmission channels thereof for automatically pointing the centroid of the transmitted laser beam towards the receiver aperture of the communication system, Speckle-To-Receiver-Aperture Locking Mechanisms along the transmission channels for locking laser beam speckle in the transmitted laser beam onto the receiver aperture of the receiver module in the system, and Laser Beam Speckle Tracking Mechanisms and Speckle-to-Fiber/Detector Locking Mechanisms along the signal reception channels thereof for locking a maximum intensity laser beam speckle onto the fiber or detector of the receiver, thereby automatically stabilizing variations in the intensity of received laser beam carrier signals caused by atmospheric turbulence along said signal channels; and FIG. 10B is a schematic optical diagram of the FS-AO laser communication system of FIG. 10A, showing the transceiver module of each terminal in the system being arranged along optically-separated signal transmission and reception channels having AO-compensation mechanisms, and Laser Beam Pointing Mechanisms being employed along the signal transmission channels thereof for automatically pointing the centroid of the transmitted laser beam towards the receiver aperture of the communication system, Speckle-to-Receiver-Aperture Locking Mechanisms being employed in the signal transmission channels of the system, and Laser Beam Speckle Tracking Mechanisms being employed in the signal reception channels of system to achieve a first level of optical signal intensity stabilization at signal detector of the transceiver modules, and also Speckle-To-Fiber/Detector Locking Mechanisms in the signal reception channels of system to lock a maximum intensity laser beam speckle onto the fiber or detector of the receiver, and thereby achieve a second level of optical signal intensity stabilization at the signal detector in the transceiver modules of the system.

DETAILED DESCRIPTION OF THE PREFERRED EMBODIMENTS OF THE PRESENT INVENTION

Referring to the figures in the accompanying Drawings, the various illustrative embodiments of the hand-supportable imaging-based bar code symbol reading system of the present invention will be described in great detail, wherein like elements will be indicated using like reference numerals.

General Description of Laser Communications Link Fade Prevention Techniques of the Present Invention Through research, Applicants have discovered that the spatial intensity variations in the received laser beam signal at the input plane of the receiver lead to temporal fluctuations in the total power received. FIG. 1K shows a simulation of a typical intensity distribution at the plane of the receiver aperture. This case is for a 10 km path through an atmosphere with $C_n^2=1.0\times10^{-14}$ $m^{-2.3}$. The transmitter and receiver apertures are both 20 cm in diameter and the wavelength is 1.5 microns. The full image shown is 1 m×1 m. This intensity pattern varies randomly as the turbulence along the path changes.

Clearly, unless the receiver is made very large, there will be significant variations in the received power. The receiver acts to focus the received laser beam spot onto a detector, either directly or via a fiber optic. In either case, the focal spot (of the laser beam) must be very small to match the size of the detector or fiber core. Because of the phase aberrations in the input signal to the receiver, the focal spot is aberrated and will always be larger than the diffraction limit.

FIG. 1L shows the simulated spot of the received laser beam at the focal plane of the receiver. This simulated spot has the characteristics of a speckle image. The scale here is 1.25 μrad/pixel or 640 μrad for the full width of the image. The diffraction limited spot size is 6 pixels, peak-to-null. For details on the nature of speckle images produced by coherent laser beams, reference is made to WIPO Publication No. WO 02/43195 A2 by Applicants, which is incorporated herein by reference in its entirety.

Occasionally, a very dark portion of this speckle image will fall onto the fiber or detector of the receiver in the communication terminal. Such a case is shown in FIG. 1M. The small circle in FIG. 1M indicates the size and location of the detector or fiber core of the receiver. The fluctuations in the received intensity and the signal variations due to the moving speckle pattern at the focal plane are not correlated.

Thus it will sometimes happen that at a time when the total received power is low a dark part of the speckle pattern will be over the detector. During such events the power reaching the detector may be reduced by a factor of more than $10^3$ relative to the average power. It is very difficult to design a communications link that can maintain a low bit error rate (BER) during these deep fade events.

A primary object of the present invention is to provide several techniques for the reducing signal fading in optical free space communication links. Fading of the signal due to the effects of atmospheric turbulence is a well_documented problem for the optical communications links, and has been studied in great detail at Adaptive Optics Associates, Inc., and described hereinabove.

In general, atmospheric turbulence induces wavefront aberrations that evolve so that both the phase and intensity distributions across the laser beam become non-uniform. This can lead to two problems for the communications link, namely: (1) the spatial intensity variations of the laser beam generated at the input plane of the receiver by channel turbulence lead to temporal fluctuations in the total power received at the detector; and (2) this spatial intensity pattern of the received laser beam varies randomly as turbulence along the laser beam path changes, producing a moving speckle image at the focal plane of the receiver, having a very dark portion which may fall upon the receiver's fiber or detector, causing the total received laser beam power to drop to extremely low levels when the dark part of the speckle pattern is passing over the detector. These problems will be described in greater detail below.

The new methods disclosed here, while somewhat related to traditional AO systems, are based on a reassessment of the basic requirements of the free-space optical (FSO) laser communications system. AO based compensation systems are designed to produce a near diffraction limited spot after passage through a turbulent atmosphere. That design is driven by the requirement either for high resolution imaging (astronomical AO), or for maximum power density in the spot (directed energy weapons). If that could be achieved for a long horizontal path, it would satisfy the requirements for a stable communications link. However, a communications link is neither an imaging system nor a weapon system. The requirement is not to minimize the spot size or maximize the power density but rather to minimize the variations in the power. In a typical communications link the average received power is more than adequate to achieve a very low BER. The power level is driven in part by the fading problem. To assure that the link will function during a fade to 5% of the average power, the average power level is set 20× the minimum needed for the required BER.

The methods described here are aimed at stabilizing the power on the detector rather than maximizing that power. The first uses adjustment of the line of sight to try to keep a bright portion of the speckle pattern on the fiber or detector. The second uses phase modulation in the pupil plane to modify the speckle pattern in ways that help to stabilize the received power.

Laser Beam Speckle Tracking (i.e. Following) Method and Mechanism of the Present Invention The characteristics of the speckle pattern at the detector plane are determined by the atmospheric aberrations and the optical system that produced the pattern. The overall width of the pattern is related to the strength of the aberrations. The typical size of the individual speckles is similar to the size of the diffraction limited spot for particular optical system. Suppose that a speckle pattern such as the one shown in FIG. 1M falls on a fiber or detector. Assume that the pattern is significantly larger than the fiber or detector. If the laser beam speckle pattern is moved to three or more positions separated by distances less than a typical speckle size and the received power recorded at each location, then it is possible to calculate the local gradient of the intensity pattern. The laser beam speckle pattern is then moved in the direction of the positive gradient by a distance less than a speckle size and the estimation of the gradient repeated. If the speckle pattern did not change, then the result of repeating this process several times would be to move the speckle pattern so that a peak of a laser beam speckle was centered on the fiber or detector. In the realistic case of an evolving speckle pattern, as long as the gradient estimation and pattern repositioning is performed several times within the timescale of speckle evolution, the result will be to keep the fiber or detector close to the peak of the laser beam speckle.

This is essentially a hill climbing algorithm that uses dithering of the position of the laser beam speckle pattern to determine the direction towards the local maximum of intensity. Simulations of this algorithm were performed to assess its performance. A single phase screen with a Kolmogorov spectrum was used. A large screen was generated and subsections extracted along a linear path to simulate turbulence moving past the input aperture. Both the strength of the phase screen and the rate at which the screen is moved are input parameters to the simulation. For each extracted phase screen, the point spread function (PSF) was calculated. Dithering of the image was simulated by looking at the intensity at four nearby locations in the PSF. A plane was then fitted to the intensities at those points. This fit was then used to calculate the local gradient of the intensity. The effective line of sight of the system was then updated based on the gradient and a new phase screen extracted. This process was repeated typically for 1000 iterations. For each iteration, the power falling on the "fiber" or "detector" was recorded. At the same time, the power falling on an uncompensated detector using the same phase screens was calculated for comparison with the compensated power. FIG. 9G shows a typical result plotting the log of the power versus iteration number for the compensated (green) and uncompensated (red) data. This simulation used a 10 cm receiver at 1.5µ wavelength and a phase screen with Fried parameter ($r_0$) of 1 cm. The phase screen is moved by 1 mm between iterations, which is roughly equivalent, at a wind speed of 10 mph, to a time step of 225 µs.

These simulations uncovered a shortcoming of the Laser Beam Speckle Tracking (i.e. Following) Method of the present invention. The hill climbing algorithm was effective in keeping the peak of a laser beam speckle centered on the fiber or detector for considerable periods of time. However, eventually a situation arises in which the laser beam speckle simply fades away without moving. The hill climbing algorithm is then cast adrift and must work its way up to the peak if a new laser beam speckles. If, in the course of following a speckle, the fiber or detector location had moved far from the average center of the PSF, then it may take a large number of iterations for the algorithm to find a new peak to follow.

A crude solution to this problem was implemented in the simulation used to generate FIG. 9G. The intensity on the detector was monitored and if it fell below some threshold, then the line of sight of the system was "shocked" and moved to a new location approximately a typical speckle spacing from its current location. This was repeated until the intensity rose to an acceptable level and then the dithering restarted. One such event is seen in FIG. 9G at about iteration 220. One further enhancement was added to the Method. If the distance of the detector from the average center of the PSF was above some value, then the fiber or detector was re-centered and the algorithm restarted. It should be noted that these "shock" events can lead to fades in the signal until a laser beam speckle is re-acquired. Fortunately, they are anticipated events and the communications link could be interrupted in an orderly fashion.

FIG. 9H shows the probability density function (PDF) for the data in FIG. 9G. This clearly shows that the Laser Beam Speckle Tracking Method can effectively eliminate the long tail of low power fades seen in the raw data. The price paid for this improvement aft is the occasional, intentional fades during speckle reacquisition.

The Laser Beam Speckle Tracking Method of the present invention is practiced in all the FSO laser communication systems shown in FIGS. 3A through 10B.

Speckle-to-Fiber/Detector Locking Method of the Present Invention

While the Laser Beam Speckle Tracking (i.e. Following) Method of the present invention showed clear improvement in the stability of the received power, it was not entirely free of fading problems. An alternative approach was then examined using the same simulation tools, as described below.

It is well known that application of a phase step in the entrance pupil of an imaging system alters the diffraction limited image in a very particular way. FIG. 9L shows the PSFs resulting from the application of phase steps 0.2, 0.5 and 1.0 waves in the entrance pupil. If a phase step is added to a random phase screen in the pupil, the result is modulation of the speckle pattern. FIG. 9I shows the result of adding phase steps of 0.2, 0.4, 0.6, 0.8 and 1.0 waves to a phase screen that produces a speckle pattern. The result is that the intensity is modulated sinusoidally at each location. This phenomenon leads to the concept of the second approach to intensity stabilization. As shown in FIG. 9J, the size of the phase step can be adjusted to maximize the intensity at a given location within a speckle pattern. As the speckle pattern evolves, the optimum phase step can be discovered using the same dithering and hill climbing technique used in the speckle tracking/following method described above. Here, however, it is the size of the phase step that is dithered while monitoring the intensity on the detector. This very simple arrangement was simulated and was found to have the same problem that the speckle following technique exhibited. While it can maximize the brightness of a speckle on the detector, if that speckle fades away, then even its maximum brightness falls below acceptable levels.

The single variable phase step may be thought of as an adaptive optics (AO) system of sorts, having a single degree of freedom, but without the use of wavefront sensing. It is known that an AO system with a number of degrees of freedom larger than the number of coherence cells in the pupil can, in principle, compensate the image so that it is close to diffraction limit. A question that can be asked is: Is there a system with a number of degrees of freedom between these limits that can stabilize the intensity of the laser beam sufficiently to be useful in a laser communications system?

To answer that question, a simulation was constructed that used phase screens with 4, 9 and 16 degrees of freedom arranged as square arrays of 2×2, 3×3, and 4×4 independent piston levels in the pupil of the imaging system, respectively. The piston values of each element were dithered while the laser beam speckle intensity on the fiber or detector was monitored. Each element was then displaced in the direction that led to the highest power on the fiber or detector. The results of these simulations show that even with as few as four degrees of freedom it is possible to very significantly reduce the occurrence of deep fades. FIGS. 9K1 and 9K2 shows the log intensity plots for simulations of 2×2 and 4×4 phase modulators, respectively. The simulation parameters are the same as those for FIG. 9G. Thus, this Speckle-to-Fiber/Detector Locking Method described above appears to have great promise as an approach to the elimination of deep fades in a FSO laser communications link. Based on preliminary analysis of system performance, a 4×4 spatial phase modulator can keep the received power stabilized within a 10 db band under conditions that produce fades deeper that 30 db for an uncompensated system.

The Speckle-to-Fiber/Detector Locking Method described above is comparatively easy to implement using either spatial phase or intensity modulation at the entrance pupil of the receiver. The key element is the spatial phase or intensity modulator itself. There are several well known methods for introducing spatial phase or intensity modulation on a laser beam at the entrance pupil of the receiver. The most common are deformable mirrors (DMs) for spatial phase modulators, and liquid crystal modulators for spatial intensity modulators. Within the DM category, there are traditional piezoelectric driven mirrors and the more recently developed micro-machined (MEMS) versions. To determine which is best suited to this technique, a set of baseline requirements has been developed.

Employing Spatial Phase Modulation at the Entrance Pupil of the Receiver to Implement the Speckle-to-Fiber/Detector Locking Method of the Present Invention Measurements of the temporal power spectrum of turbulence along horizontal paths often show significant power at frequencies above 1 kHz. To compensate for such turbulence, the correction system of the present invention (i.e. Speckle-to-Fiber/Detector Locking Mechanism) must have a response time at least ten times faster than the fluctuations in the atmosphere, or at most 100 μs. During one response time interval, it is necessary to perform all the dithering of the various degrees of freedom and the associated data processing.

For the case of the 4×4 spatial phase modulator this means that 16 cycles of the dither motion must occur in that interval. This implies a minimum frequency response of the spatial phase modulator of 160 kHz. Fortunately, the spatial phase modulator can be made quite small by positioning it at a relayed pupil image plane. Since the system is monochromatic, the phase modulator only needs a dynamic range of +−½ wave (the simulations described here limit the spatial phase modulator to this range).

There are currently available piezo-type actuators in sizes of several millimeters on a side that have resonant frequencies of 300 kHz and greater than 2 μm throw. By bonding thin, flat mirrors onto an array of these actuators, a suitable phase modulator can be fabricated. FIG. 3E shows a schematic view of a spatial phase modulator constructed using such components. The bonding of the mirrors may be done with the mirrors in contact with an optical flat to assure alignment.

Alternatively, there are developmental MEMS spatial phase modulators that approach 100 kHz resonant frequencies with a cell size of 0.3 mm. If such modulators prove practical, then they offer advantages in power consumption and cost.

Intensity data is required at rates similar to the dither frequency of the spatial phase modulator, but can easily be supplied by the communications link detector itself since it must be capable of operation at frequencies in the GHz range.

FIGS. 3D and 3E show an illustrative embodiment for implementing the Speckle-To-Fiber/Detector Locking Method of the present invention. As shown in FIG. 3D, it is optically similar to a traditional AO compensation system using a deformable mirror (DM) in a relayed pupil plane. It also includes a fast steering mirror (FSM) to remove the full aperture tilt component of the aberrations. This FSM control loop does not have to operate at the very high frequencies of the spatial phase modulator (DM), but it does need a control bandwidth approaching 1 kHz for operation under conditions of strong turbulence.

The data processing requirements for implementing the Speckle-to-Fiber/Detector Locking Method are modest. The intensity data steam does not need to be faster than about 1 MHz. During each dither cycle of the spatial phase modulator, the processor must test to see what direction of modulator motion produces a higher signal and apply an offset in that direction to the appropriate actuator. It also must assure that the offset signals to the phase modulator are kept within the ±½ wave region. This can be achieved by either a look-up table or a mathematical function that calculates the drive signal equivalent to one wave. Since modern processors can perform more than 1000 operations in the time for a single signal update, this is not seen as a problem.

Employing Spatial Intensity Modulation at the Entrance Pupil of the Receiver to Implement the Speckle-to-Fiber/Detector Locking Method of the Present Invention Another way of improving the information content of the laser beam speckle image received at the entrance pupil of an FSO laser communication receiver involves active masking of the entrance pupil of the receiver using spatial intensity modulation techniques.

A typical atmospherically induced wavefront has about 5 waves of aberration, peak-to-valley. During simulations, this wavefront can be generated in such a way that it has a Kolmogorov distribution. Examination of this wavefront reveals that there are regions within the wavefront that are relatively flat. These regions may, however, be tilted fairly significantly. If that region is extracted from the wavefront and its tilt removed, the residual wavefront error is found to be less than _wave. If the aperture of the imaging system were masked down to allow only this portion of the wavefront to enter the receiver's pupil aperture, then a much improved image would result.

It has been discovered that the masking of the pupil results in a marked improvement in laser beam image quality. However, it must be realized that the location and size of such masks depends on the instantaneous atmospheric wavefront in the pupil. For this technique to be practical, there must be a way to actively select the region to be allowed to form the image. One approach is to look for flat parts of the wavefront. Unfortunately, this would require knowledge of the shape of the wavefront, and there are difficulties associated with using wavefront sensing for this purpose. An alternative method is to use a mask that is dithered while the laser beam image quality is monitored at the entrance pupil. In accordance with the present invention, the entrance pupil can be broken up into many smaller regions and each of these alternately masked and unmasked. The laser beam spot image quality for each state of the mask is recorded and the mask for that region is set to the state that results in the higher image information content. This process is repeated for each of the sub-regions until the whole entrance pupil is covered. This process can be carried out using essentially a hill climbing algorithm with the goal of maximizing the laser beam spot image information.

To assess the performance of such a hill climbing algorithm, a computer simulation was constructed. The simulation models a 10 cm receiver aperture operating at a wavelength of 0.9 µm. Phase aberrations are introduced into the pupil of the receiver. These aberrations are generated by extracting parts of a large phase screen that has Kolmogorov distributed aberrations. Four separate regions are extracted and added to produce the pupil wavefront. The extraction points are moved across the large phase screen to simulate the effect of wind. Each of the four extraction regions moves in a different direction. Both the strength of the phase screen and the effective wind speed can be varied. The simulated pupil wavefront is then used to calculate the laser beam blur spot formed by the receiver telescope. This blur spot is then convolved with a high resolution image of the scene to simulate the effect of the aberration on laser beam spot image quality.

In this simulation, image contrast is used as a measure of laser beam image quality. A small (64×64 pixels) region of the laser beam image is extracted and the spatial gradient of the intensity is calculated. The metric of laser beam image quality is the ratio of the rms of the magnitude of the gradient divided by the average image intensity.

The intensity function in the receiver pupil is assumed uniform. The spatial light modulator (SLM) is simulated as an N×N array of square subapertures whose transmission can be set to 1.0 (open) or to some other value (closed). The closed value can be 0.0 to simulate a high contrast modulator or to larger values to simulate lower contrast modulators such as quantum-well devices.

The simulation begins with all subapertures in the open state. One at a time, each subaperture is closed and the change in image quality metric is recorded. If the metric drops, the subaperture is opened again, if the metric increases, then the subaperture is kept closed. After all the subapertures have been tested in this way, a new pupil wavefront is extracted from the large phase screen. The process is repeated. However for subsequent iterations, the state of each subperture is inverted from its current state and the effect on the metric is noted. Those changes that lead to increased metric are retained, all other subapertures are returned to their initial state.

Simulations have been run using modulators with resolutions from 5×5 to 20×20 with phase screens simulating turbulence with $C_n^2$ in the range of $10^{-15}$ to $10^{-14}$ m$^{-2/3}$. The simulation used a 7×7 element SLM and an atmospheric path with $r_o$=1.5 cm. The effective wind speed was such that the phase screens moved about 2.5 mm per iteration. For a wind speed of 10 mph, this is equivalent to an iteration rate of 2 kHz. To simulate the laser beam spot image seen by a video rate sensor, the laser beam image data was averaged into bins of about 16 ms (60 Hz frame rate). The images are a time sequence of raw (bottom) and corrected (top) simulated video output. The image contrast metric for all 1000 iterations of this simulation is measured. It has been found that the image contrast metric is improved by an average factor of 2.44 with peak improvement of a factor of 4.6. If the image contrast is taken to be inversely proportional to the smallest image feature resolved, then an increase in contrast by a factor of 2.44 represents an increase in laser beam image information by a factor of 6.

Alternative pupil masking techniques and image quality metrics may be used. One approach that has been tested in the simulation is to use a pupil mask of fixed size whose position is dithered. Again, a hill climbing algorithm is used to determine the mask position that results in the best image quality. The performance of this technique appears to be similar to that of the subaperture mask. Several different image quality metrics have been tested in the simulation. These include the normalized rms amplitude of the gradient of the intensity, the maximum intensity gradient, and intensity gradient histogram based metrics.

The Speckle-to-Fiber/Detector Locking Method described above using spatial intensity modulation techniques at the entrance pupil of the receiver is comparatively easy to implement. The key element is the modulator itself. There are several well known methods for introducing intensity modulation on a beam. The most common are liquid crystal modulators and deformable mirrors (DMs). More recently, quantum well modulators have been developed that offer higher speed operation but with lower on-off contrast ratio. To determine which is best suited to this technique, a set of baseline requirements has been developed.

Measurements of the temporal power spectrum of turbulence along horizontal paths often show significant power out to frequencies well of 100 Hz. To compensate for such turbulence the correction system must have a response time at least ten times faster than the fluctuations in the atmosphere, or at most 1000 μs. During one response time interval it is necessary to perform all the dithering of the various degrees of freedom and the associated data processing. For the case of the 5×5 intensity modulator this means that 25 cycles of the dither motion must occur in that interval. This implies a minimum frequency response of the phase modulator of 25 kHz. Fortunately, the modulator can be made quite small by positioning it at a relayed pupil image plane.

There are currently available DM-based spatial light modulators that are capable of switching at the rates required by this Speckle-to-Fiber/Detector Locking Technique. One example is the Texas Instruments DLP chip. This device uses micro-machining techniques to produce an array of small tilting mirrors. These mirrors may be flipped between the on state, in which they reflect the light into the remainder of the optical system, and the off state, in which the light is directed to an optical stop.

It has been found that, at this time, conventional liquid crystal modulators are too slow to be applied to this technique, being limited to speeds below 1 kHz. Quantum well modulators are capable of speeds well above 1 MHz, but provide contrast ratios of only 2:1 or 3:1 between states. However, initial simulation results indicate that the performance of this technique is only moderately degraded by using a 3:1 contrast ratio modulator.

The data processing requirements for using spatial intensity modulation techniques at the entrance pupil of the receiver to realize the Speckle-to-Fiber/Detector Locking Method of the present invention, are considerable, but within the capabilities of present PC processors. A 40×40 pixel high speed image sensor would have a data rate of 40 MHz. For each frame of data a image quality metric must be calculated. A 1 GHz processor can perform 25 operations on each pixel of the data. The algorithm used in the simulations performs about 5 operations per pixel. During each dither cycle of the modulator, the processor must test to see what state of the modulator produces a higher image metric and, on the basis of the signal change, set the state of the appropriate actuator. This part of the algorithm needs only to operate at the 25 kHz update rate and is not a problem.

The Speckle-to-Fiber/Detector Locking of the present invention is practiced in all FSO laser communication systems shown in FIGS. 3A through 10B.

Speckle-to-Receiver-Aperture Locking Method of the Present Invention

Over long paths with significant turbulence, the laser beam spot pattern from a laser communication terminal may evolve into a speckle pattern. These spatial intensity variations at the input plane of the receiver lead to temporal fluctuations of the total power received. Applicants have constructed simulations of a typical intensity distribution at the plane of the receiver aperture (e.g. for a 10 km path through an atmosphere with $C_n^2=1.0\times10^{-14}$ $m^{2/3}$). In the simulation, the transmitter and receiver apertures are both 20 cm in diameter and the wavelength is 1.5 microns. The full image shown is 1 m×1 m.

The size of the individual speckles in the laser beam spot is about the diffraction limit of the full transmitter aperture, and the overall pattern size is set by the diffraction limit of the atmospheric coherence length. In general, an atmospheric compensation system with a single plane of correction (single DM) cannot correct both the phase and intensity in a beam that has passed through a long path with distributed turbulence. Therefore, even with compensation, it has been discovered that there will be intensity variations in the receiver input plane.

Under some circumstances, the laser beam speckle size will exceed the receiver aperture size. When this occurs, there is the possibility for significant signal fade events as a dark speckle covers the aperture. These deep fades adversely affect the communications link performance, because if no light enters the aperture, then no light will reach the fiber or detector at the receiver.

In situations where the laser beam has become a speckle pattern at the receiver, it is also true that the receiver is in the far-field of the transmitter aperture. This means that the transmitter appears as a point source to the receiver and that phase aberrations introduced close to the transmitter (including those of the transmitter AO system) have diffracted into a spherical wavefront with spatial intensity variations. Aberrations introduced onto the beam close to the receiver will still be observed as phase variations across the laser beam, but since they have not evolved significantly they do not produce large intensity variations.

While the transmitter cannot affect the wavefront at the receiver, it can alter the speckle pattern at the receiver. That pattern is the result of the propagation of the wavefront from the transmitter aperture to the receiver. The phase of that wavefront is the addition of the atmospherically induced phase variations near the transmitter aperture and the wavefront generated by the transmitter. As has been demonstrated for the case of fade prevention at the receiver, it is possible to alter the speckle pattern considerably by changing the wavefront phase by less than a fraction of the wave. Thus another aspect of the present invention involves the communication of a figure of merit (typically the received power) from the receiver to the transmitter so that the transmitter can dynamically point and lock a maximum intensity speckle in the transmitted laser beam onto the receiver aperture of receiver on the other side of the laser communication link, to optimize the transmission of laser beam power into the entrance pupil of the communication receiver. This method can be carried out by dithering the transmitted wavefront and monitoring a figure of merit used in the receiver to achieve fade prevention. Preferably, the figure of merit used by the algorithm is the received power at the other end of the laser communication link. This data may be sent to the transmitter via the optical communications link or by other communications means.

The situation is slightly more complicated if the transmitter is also operating as a receiver with its own fade prevention and/or AO system. If it is using just a fade prevention system, the algorithm will need to use both its local figure of merit and that sent from the receiver. Since there will typically be many degrees of freedom available in the spatial phase or intensity modulator, it will, in general, be possible to optimize the received power at both ends of the laser communication link.

If the transmitter is operating an adaptive optical correction system as part of its receiver, then the control algorithm will have to compromise between optimal local received power and fade elimination at the distant receiver. The phase modulation is required to effectively prevent fades at the far receiver as typically small enough that they will not reduce the local received power by a large factor. The algorithm can be tailored to achieve the lowest two-way BER for the full duplex link.

One issue to be considered is the latency associated with the transmission of the figure of merit data across the link. For a link length of 300 km the time from when the light leaves the transmitter and acquires its aberrations and when it reached the receiver is 1 ms. It will take another 1 ms for the data to return. To this must be added the latency of the figure of merit detection and calculation. This accumulated latency will limit the bandwidth of the fade prevention system.

This Speckle-to-Receiver-Aperture Locking Method of the present invention is practiced in the FSO laser communication system shown in FIGS. 10A and 10B.

Brief Summary of Speckle-Control Based Methods of Present Invention for Reducing Fading in FSO Laser Communication Systems In summary, three generalized methods and apparatus have been described above for reducing fading of laser beam signal intensity in FSO laser communication systems, namely: (1) automatically tracking laser beam speckle at the receiver of any terminal in a FSO laser communication system so to avoid dark speckle spots from dwelling on the fiber or detector thereof and causing deep fades in the communication link; (2) automatically locking maximum intensity laser beam speckles onto the fiber or detector thereof so as to stabilize fluctuations in the intensity of a laser bean carrier detected at the receiver of the communication terminal of the present invention; and (3) automatically locking a maximum intensity laser beam speckle onto the receiver aperture of the laser communication system by measuring a figure of merit (e.g. signal intensity strength) at the receiver and communicating this information to the laser beam transmitter, so the transmitter can point a maximum intensity laser beam speckle onto the receiver aperture of the laser communication system and lock the same in a closed loop system.

It is appropriate at this juncture to now describe five generalized embodiments of FSO laser communication systems shown in figures in which such inventions can be embodied to provide remarkable levels of fade mitigation. Notably, each of these generalized system embodiments can be practiced in either military or civilian kinds of communication environments shown in FIGS. 2A and 2B, respectively.

Free-Space Optical (FSO) Laser Communication System Supporting Optically-Separated Signal Transmission and Reception Channels, and Employing Laser Beam Speckle Tracking Mechanisms and Speckle-To-Fiber/Detector Mechanisms Along the Signal Reception Channels thereof for Automatically Stabilizing Variations in the Detected Intensity of Received Laser Beam Carrier Signals Caused by Atmospheric Turbulence Along said Signal Channels In FIG. 3A, there is shown a first illustrative embodiment of a free-space optical (FSO) laser communication system 1 in accordance with the principles of the present invention, wherein first and second communication terminals 2A and 2B are in communication by way of a super broad-band FSO laser beam communication link 3 having optically-separated signal transmission and reception channels, and wherein Laser Beam Speckle Tracking Mechanisms and Speckle-to-Fiber/Detector Mechanisms are employed along the signal reception channels of each communication terminal, for automatically stabilizing variations in the detected intensity of received laser beam carrier signals caused by atmospheric turbulence along said signal channels. As shown in FIG. 3A, each communication terminal has a transmitter (module) 4 and a receiver (module) 5, each of which will be described in detail below.

The transmitter in each terminal includes a telescopic transmitting aperture, and an optical train embedded with the components of a Laser Beam Pointing Mechanism realized by a fast steering mirror and a quad-cell detector of the kind shown in FIG. 3F, supporting optics, and a processor for carrying out one of the tracking algorithms shown in FIGS. 4A through 4C.

The receiver in each terminal includes a telescopic receiving aperture, and an optical train embedded with the components of two fade mitigation mechanisms of the present invention, namely: the Laser Beam Speckle Tracking Mechanism hereof realized using a FSM, a quad-cell detector shown in FIG. 3F, supporting optics, and a processor carrying out the tracking algorithms shown in FIGS. 4D through 4F; and the Speckle-To-Fiber/Detector Locking Mechanism hereof realized using spatial phase or intensity phase modulator shown in FIG. 3E, a receiving fiber, a single cell detector, and the processor carrying out (i) one of the spatial phase modulation (SPM) control signal generation algorithms shown in FIGS. 5A through 5D when using spatial phase modulation (SPM) techniques, or (ii) one of the spatial intensity modulation (SIM) control signal generation algorithms shown in FIGS. 6A through 6D when using spatial phase modulation (SPM) techniques.

The object of the Laser Beam Speckle Tracking Mechanism employed in both the signal reception channels of system is to automatically track or follow a maximum intensity laser beam speckle and move away from low intensity (i.e. black) laser beam speckles (that might fall onto the receiving fiber) so as to achieve a first level of optical signal intensity stabilization at signal detector of the receiver modules. The object of the Speckle-to-Fiber/Detector Mechanism in the signal reception channels of system is to lock a maximum intensity speckle in the received laser beam onto the receiving fiber, so as achieve a second level of optical signal intensity stabilization at the signal detector in the receiver modules of the system.

Notably, the purpose of the tracker/FSM control loop is different in the receiver and transmitter.

In the receiver, the tracker/FSM control loop is used to realized the Laser Beam Speckle Tracking Mechanism of the present invention which, when using the control algorithm of FIG. 4D, produces a signal that is proportional to the displacement of the received focal spot from the location of the receiver fiber or detector. This signal is typically generated by forming an image with a portion of the received light on a quad-cell or other position sensitive imaging device. The tracker (quad-cell detector) is calibrated so that its null position is optically identical to the position of the receiver fiber. The displacement signal is the input to a control loop algorithm that drives the steering mirror to keep the received focal spot on the fiber. Any of the standard control algorithms shown in FIGS. 4D through 4F may be used.

In the transmitter, the tracker/FSM control loop is used to realize the Laser Beam Pointing Mechanism. Here, the goal of the transmitter tracking control loop is to keep the transmitted beam on the receiver aperture. This is accomplished by having the tracker (quad cell detector) measure the displacement between the bore-sight direction of the transmitter and some optical signal received from the receiver. Any of the standard control algorithms shown in FIGS. 4A through 4C may be used. This optical signal can be a separate beacon, as shown in FIG. 3C, or it may be a portion of the light from the transmitter associated with the receiver. The hardware implementation of either tracker subsystem is the same, the only differences are the source of the light used by the tracker and the definition of the null position of the tracker.

Methods of Generating a Control Signal for Supply to the Fast Steering Mirror (FSM) Used in the Laser Beam Tracking/Pointing Mechanism in the Transmitter Module of Each the Laser Communication System of the Present Invention In this simple form of a laser beam pointing/tracking system, a lens is used to form an image of the target (the beacon source or a portion of the communication link light) on a detector divided into four quadrants, as shown in FIG. 3F. Each quadrant produces a signal proportional to the intensity of light reaching the quadrant. The four resulting signals can be combined to produce two composite signals that are estimates of the position of the focal spot relative to the junction between the quadrants:

Horizontal Position Estimator=(S1−S2)+(S4−S3)/(S1+S2+S3+S4)+$K_H$

Vertical Position Estimator=(S1−S4)+(S2−S3)/(S1+S2+S3+S4)+$K_V$

Where $K_H$ and $K_V$ are positional offsets used to remove optical and mechanical alignment errors between the quad cell and the desired spot location.

If the light entering the tracking system has passed through a tilt control device, such as a steering mirror driven by piezoelectric actuators, these position estimators can be used as the error input signals to a control algorithm. Typical control system algorithms apply drive signals to the steering mirror that are proportional to a combination of the current error signal and the integral of previous error signals. The tilting action of the mirror provides optical feedback to the control system by altering the position of the image on the quadrant detector. Thus the system will tend to drive the focal spot to a location that equalizes the four signals, S1, S2, S3, S4, making the position estimator values close to zero. An offset may be applied to the signals to cause the control loop to drive the spot to other locations. This allows the system to compensate for alignment differences between the tracker optical axis and the axis of the other portion of the optical system.

More complex arrangements are possible. A larger array of detector pixels may be used and their signals combined to form an estimate of the centroid of the intensity pattern of the focal spot. Alternatively, the signals may be used in a least-squares fitting algorithm or matched filter algorithm to provide estimates of the spot position.

If the focal spot has significant intensity structure (e.g. is a resolved image of the target) the signals from the detector may be used in a correlation algorithm. This algorithm performs a correlation of the instantaneous intensity distribution with an average or predefined target intensity distribution to form the estimate of target image location.

FIG. 4A describes the steps involved in a first method of generating a "proportional control" signal for supply to the fast steering mirror (FSM) used in the Laser Beam Tracking Mechanism in the transmitter module of each the laser communication system of the present invention. The control drive signal is simply proportional to the error signal. This is the simplest of the three algorithms. For stability reasons, the proportion or fraction of the error signal (k in the flow chart) must be less than one. For this reason, proportional control always has an offset error, that is, the control signal always is offset from the correct position.

In digital control systems such as those in the tracking loop, these are all implemented by applying a set of weights to the last N error measurements and summing the result with the current control drive signal (that is the integral part of the control). For example, if the weight of the current error measurement is $k_p$, and all others are zero, then the algorithm is P plus I as shown in FIG. 4B. To add derivative control as shown in FIG. 4C, the weights for the last two error measurements would be $(k_p+k_d)$ for the current time step and $-k_d$ for the error measurement form the last time step.

This digital algorithm is very flexible and can implement many other forms of control and filtering of the error signal. Mathematically, it can be represented as $$D(t)=D(t_1)+G^*(w_0^*E(t_0)+w_{-1}^*E(t_1)+w_{-2}^*E(t_2)+\ldots)$$

Where D is the control loop drive signal, G is the overall loop gain, $w_n$ is the weight associated with time step $t_n$, and $E(t_n)$ is the error signal from time step $t_n$.

FIG. 4B describes the steps involved in second method of generating a "proportional plus integral" control signal for supply to the FSM used in the Laser Beam Tracking Mechanism in the transmitter module of each the laser communication system of the present invention. Here, in addition to the proportional control signal, a term that is a fraction ($k_p$) of the integral of the past error signals is added. This has the effect of removing the offset error of proportional control alone.

FIG. 4C describes the steps involved in third method of generating a "proportional plus integral plus derivative" control signal for supply to the FSM used in the Laser Beam Tracking Mechanism in the transmitter module of each the laser communication system of the present invention. Here, another term may be added that is proportional to the time derivative of the error signal (multiplied by fraction $k_d$ in the flow chart). The effect of this term is to provide anticipatory control, that is, the loop uses the current derivative to predict the error in the next time step. This can give higher loop bandwidth by reducing the latency, but increases the noise in the loop.

In the transmitter, the goal is to keep the transmitted laser beam on the receiver aperture. So, the null or reference point in each of the above-described control algorithms, and the control loops which they maintain within the transmitter, is set such that the transmitted beam is collinear with the beacon laser beam sent from the receiver to enable laser beam pointing/tracking operations in the laser communication system.

Methods of Generating a Control Signal for Supply to the Fast Steering Mirror (FSM) used in the Laser Beam Speckle Tracking Mechanism in the Receiver Module of Each the Laser Communication System of the Present Invention The basic control algorithms for the transmitter described in FIGS. 4A through 4C are similar to the control algorithms for the receiver shown in FIGS. 4D through 4F, respectively, except for the "null point" (i.e. reference point) of the control system.

In the transmitter, the goal is to keep the transmitted laser beam on the receiver aperture. So the null or reference point in each of the above-described control algorithms, and the control loops which they maintain within the transmitter, is set such that the transmitted beam is collinear with the beacon laser beam sent from the receiver to enable laser beam pointing/tracking operations in the laser communication system.

Methods for Generating Spatial Phase Modulation Panel Drive Signals to be Provided to the Spatial Phase Modulation Panel (I.E. Deformable Mirror) Employed in Speckle-to-Fiber/Detector Locking Mechanism in the Receiver Module of Each Laser Communication System of the Present Invention The goal of the algorithms driving the Speckle-To-Fiber/Detector Locking Mechanism of the present invention is to find phase and/or intensity modulation pattern that, when added to the electric field at the entrance pupil of an optical system maximizes some metric function. For the case of optical communications, that metric is the time average communications signal level. In general, this is an optimization problem and many of the known optimization algorithms may be applied.

Define The Problem Variables:
E(x,y); The complex e-field at the entrance pupil
M(x,y); Phase and/or intensity modulation applied to pupil
S; Time averaged signal level For the purposes of algorithm description, it will first be assumed that E is constant in time. Issues related to real-time application of the algorithms will be addressed later.

In the real system, S is "calculated" by allowing the collection optics to focus the electro-magnetic field onto the collection aperture. This may be simulated computationally by using standard point spread function (PSF) calculation methods to generate the spatial intensity pattern at the focal plane. This intensity distribution may then be integrated over the collection aperture. Typically, the PSF is calculated by taking the Fourier transform of the complex e-field at the aperture (E+M). The square of the amplitude of this transform then represents the intensity distribution.

In any realization of this system, M will be in the form an N×N array of subregions or subapertures within the full aperture. Each of these subregions represents a single element or pixel of the modulation device. Over each subregion the value of M is constant. For such an arrangement we then have $N^2$ independent degrees of freedom for the modulator and we must find the set of $N^2$ values (Mij) that maximize S.

First Illustrative Embodiment of the Method of Present Invention, for Generating Spatial Phase Modulation Panel Drive Signals to be Provided to the Spatial Phase Modulation Panel (I.E. Deformable Mirror) Employed in Speckle-to-Fiber/Detector Locking Mechanism in the Receiver Module of Each Laser Communication System of the Present Invention.

FIG. 5A describes the steps involved in a first illustrative embodiment of the method of present invention, for generating spatial phase modulation panel drive signals to be provided to the spatial phase modulation panel (i.e. deformable mirror) employed in Speckle-to-Fiber/Detector Locking Mechanism in the receiver module of each laser communication system of the present invention. In this method, the hill climbing algorithm provides a simple approach to the above described optimization problem, wherein each degree of freedom is changed by a small amount in sequence and the resulting effect on S is measured. In this way the gradient of S with respect to the $N^2$ independent variables Mij is estimated. The values of Mij are then updated to move in the direction of the maximum upward gradient. This process is repeated until a set of Mij is arrived at, any change from which leads to a reduction in S. The algorithm has then found at least a local maximum of S.

Second Illustrative Embodiment of the Method of Present Invention, for Generating Spatial Phase Modulation Panel Drive Signals to be Provided to the Spatial Phase Modulation Panel (I.E. Deformable Mirror) Employed in the Speckle-to-Fiber/Detector Locking Mechanism in the Receiver Module of Each Laser Communication System of the Present Invention FIG. 5 describes the steps involved in a second illustrative embodiment of the method of present invention, for generating spatial phase modulation panel drive signals to be provided to the spatial phase modulation panel (i.e. deformable mirror) employed in Speckle-to-Fiber/Detector Locking Mechanism in the receiver module of each laser communication system of the present invention. In this method, an alternative form of hill climbing algorithm may be used as well. In this case, rather than testing the response of S to each $M_{ij}$ and then calculating its updated values, the value of each $M_{ij}$ may be updated as soon as the response of S to that variable is determined.

Third Illustrative Embodiment of the Method of Present Invention, for Generating Spatial Phase Modulation Drive Signals to the Supplied to the Spatial Phase Modulation Panel (I.E. Deformable Mirror) Employed in the Speckle-To-Fiber/Detector Locking Mechanism in the Receiver Module of Each Laser Communication System of Present Invention FIG. 5C describes the steps involved in a third illustrative embodiment of the method of present invention, for generating spatial phase modulation drive signals to the supplied to the spatial phase modulation panel (i.e. deformable mirror) employed in the Speckle-To-Fiber/Detector Locking Mechanism in the receiver module of each laser communication system of present invention. In this method, a more sophisticated optimization algorithm, sometimes referred to as "stochastic parallel perturbative gradient ascent", is used. The algorithm estimates the gradient of S with respect to $M_{ij}$ in a somewhat different way. At each iteration, all of the values of $M_{ij}$ are altered in a random way and the change in S is noted. If that change is represented by $\Delta S$ and the perturbation applied to M by $\Delta M_{ij}$, it follows that $$\Delta S = S(M_{ij} + \Delta M_{ij}) - S(M_{ij}). \quad (1)$$

To find the gradient of S with respect to each element of M ($M_{mn}$), a Taylor series expansion of Equation 1 gives $$\Delta S/\Delta M_{mn} \approx \partial S/\partial M_{mn} + \Sigma \partial S/\partial M_{ij} * \Delta M_{ij}/\Delta M_{mn}, \ \{i \neq m, j \neq n\}. \quad (2)$$

If the perturbations are truly stochastic and random, the second term in Equation 2 averages to zero and thus $\Delta S/\Delta M_{mn} \approx \partial S/\partial M_{mn}$. Once the gradient of S is estimated, the values of $M_{ij}$ may be updated to move in the direction of maximum upward gradient.

Fourth Illustrative Embodiment of the Method Of Present Invention. For Generating Speckle-To-Fiber/Detector Locking Drive Signals to the Spatial Phase Modulation Panel (i.e. Deformable Mirror) Employed in the Receiver Module of Each Laser Communication System of the Present Invention FIG. 5D describes the steps involved in a fourth illustrative embodiment of the method of present invention, for generating speckle-to-fiber/detector locking drive signals to the spatial phase modulation panel (i.e. deformable mirror) employed in the receiver module of each laser communication system of the present invention. This alternative method addresses a major limitation of simple gradient climbing algorithms, namely the potential for them to locate a local maximum of S, not the true global maximum. There are several ways to reduce the likelihood of the algorithm being trapped at a local maximum. One example is the simulated annealing algorithm. This algorithm is based on the process that occurs when a crystalline substance is slowly cooled through its freezing point, hence the name "simulated annealing".

The flow of the "simulated annealing" algorithm is very similar to those described above. A random perturbation of the modulator values, $M_{ij}$, is applied and the resulting change in S is noted. If S is increased, the perturbation is accepted unconditionally. However, if S is decreased, the perturbation may also be accepted, but with a probability given by $$P = \mathrm{Exp}(\Delta S/T), \quad (3)$$

where T is a parameter of the algorithm. Because of the original relation of this algorithm to annealing, T is known as the temperature parameter. As the algorithm searches for the maximum and the value of S increases, the T parameter is slowly reduced. This lowers the probability of accepting downward changes in S. The effect of this finite probability of accepting negative changes in S is to provide occasional "shocks" to the system that act to throw the search point out of local maxima. At the beginning of the process, the search point may be far from the maximum and there may be many local maxima that could trap the algorithm. With a large T parameter, the probability of a shock is high, helping to prevent trapping. As the algorithm approaches the true maximum, the possibility of trapping is reduced, so the T parameter may be lowered.

The key to this process is the "annealing schedule", the plan or algorithm used to determine when and by how much to reduce T. This depends intimately on the functional relation between S and $M_{ij}$, which cannot easily be calculated since it also depends on the unknown, atmospherically affected $E(x,y)$. Optimal annealing schedules must be developed via simulation or experiment.

First Illustrative Embodiment of the Method of Present Invention, for Generating Spatial Intensity Modulation Drive Signals to be Provided to the Spatial Intensity Modulation Panel Employed in the Speckle-To-Fiber/Detector Locking Mechanism in the Receiver Module of Each Laser Communication System of the Present Invention The basic Spatial Intensity Modulation (SIM) Control Signal Generation algorithms described in FIGS. 6A through 6D are similar to the SPM Control Signal Generation algorithms shown in FIGS. 5A through 5D and described above, respectively, except that these signals are calibrated for and supplied to spatially intensity modulation elements, rather than spatial phase modulation elements.

Free-Space Optical (FSO) Laser Communication System Supporting Optically-Combined Signal Transmission and Reception Channels, and Employing Laser Beam Speckle Tracking Mechanism and Speckle-To-Fiber/Detector Locking Mechanisms Along the Signal Reception Channels thereof for Automatically Stabilizing Variations in the Detected Intensity of Received Laser Beam Carrier Signals Caused by Atmospheric Turbulence Along said Signal Channels In FIG. 7A, there is shown a second illustrative embodiment of a free-space optical (FSO) laser communication system in accordance with the principles of the present invention, wherein first and second communication terminals 11A and 11B are in communication by way of a super broad-band FSO laser beam communication link 12 having optically-combined signal transmission and reception channels, and wherein Laser Beam Speckle Tracking Mechanisms and Speckle-to-Fiber/Detector Mechanisms are employed along the signal reception channels of each communication terminal, for automatically stabilizing variations in the detected intensity of received laser beam carrier signals caused by atmospheric turbulence along said signal channels. As shown in FIG. 7A, each communication terminal has a transceiver (module) which will be described in detail below.

The transceiver in each terminal includes a telescopic transmitting/receiving aperture, and an optical train embedded with the components of a Laser Beam Pointing Mechanism realized by a fast steering mirror and a quad-cell detector of the kind shown in FIG. 3F, supporting optics, and a processor for carrying out one of the tracking algorithms shown in FIGS. 4A through 4C. The transceiver further includes an optical train embedded with the components of two fade mitigation mechanisms of the present invention, namely: the Laser Beam Speckle Tracking Mechanism hereof realized using a FSM, a quad-cell detector shown in FIG. 3F, supporting optics, and a processor carrying out the tracking algorithms shown in FIGS. 4D through 4F; and the Speckle-To-Fiber/Detector Locking Mechanism hereof realized using spatial phase or intensity phase modulator shown in FIG. 3E, a receiving fiber, a single cell detector, and the processor carrying out one of the spatial phase modulation (SPM) control signal generation algorithms shown in FIGS. 5A through 5D.

The object of the Laser Beam Speckle Tracking Mechanism employed in both the signal reception channels of system is to automatically track or follow a maximum intensity laser beam speckle and move away from low intensity (i.e. black) laser beam speckles (that might fall onto the receiving fiber) so as to achieve a first level of optical signal intensity stabilization at signal detector of the receiver modules. The object of the Speckle-to-Fiber/Detector Mechanism in the signal reception channels of system is to lock a maximum intensity speckle in the received laser beam onto the receiving fiber, so as achieve a second level of optical signal intensity stabilization at the signal detector in the receiver modules of the system.

In this particular illustrative embodiment of the FSO communication system of the present invention, the function of the tracker is now the same on each side. This is possible because the transmitter boresight and receiver boresight are the same (defined by the single fiber location). If the FSM keeps the received spot on the fiber, the transmitted beam will retrace the path of the received beam and reach the aperture on the other side.

Free-Space Adaptive Optical (FS-OA) Laser Communication System Supporting Optically-Separated Signal Transmission and Reception Channels and Employing Laser Beam Speckle Tracking Mechanisms and Speckle-To-Fiber/Detector Locking Mechanisms Along the Signal Reception Channels thereof for Automatically Stabilizing Variations in the Intensity of Received Laser Beam Carrier Signals Caused by Atmospheric Turbulence Along Said Signal Channels A laser communications terminal with an adaptive optic compensation system operating should act to maximize the power collected by the communications fiber. However, there may be occasions when the turbulence conditions are such that the compensation system performance degrades. This may occur when the correlation length in the atmosphere becomes less than the actuator spacing of the deformable device, meaning that the system does not have the spatial resolution to fully correct the wavefront, or when the strength of the aberrations exceed the dynamic range of the corrector. Whatever the cause, if the compensation system is operating with degraded performance it will no longer provide optimum communications signal power. The potential exists for very significant variations in the received signal (fades) because the focal spot will become aberrated.

In FIGS. 8A and 8B, there is shown a third illustrative embodiment of a free-space adaptive optical (FS-AO) laser communication system 20 in accordance with the principles of the present invention, wherein first and second communication terminals 21A and 21B are in communication by way of a super broad-band FSO laser beam communication link having optically-separated signal transmission and reception channels, and wherein a standard Adaptive Optics Subsystem and the Laser Beam Speckle Tracking Mechanism and Speckle-to-Fiber/Detector Mechanism of the present invention are employed along the signal reception channels of each communication terminal, for automatically stabilizing variations in the detected intensity of received laser beam carrier signals caused by atmospheric turbulence along said signal channels. As shown in FIG. 8A, each communication terminal 21A, 21B has a transmitter (module) 23 and a receiver (module) 24, each of which will be described in detail below.

The transmitter in each terminal includes a telescopic transmitting aperture, and an optical train embedded with the components of a standard Adaptive Optics Subsystem and the Laser Beam Pointing Mechanism realized by a fast steering mirror and a quad-cell detector of the kind shown in FIG. 3F, supporting optics, and a processor for carrying out one of the tracking algorithms shown in FIGS. 4A through 4C.

The receiver in each terminal includes a telescopic receiving aperture, and an optical train embedded with the components of a standard Adaptive Optics Subsystem, and the two fade mitigation mechanisms of the present invention, namely: the Laser Beam Speckle Tracking Mechanism hereof realized using a FSM, a quad-cell detector shown in FIG. 3F, supporting optics, and a processor carrying out the tracking algorithms shown in FIGS. 4D through 4F; and the Speckle-To-Fiber/Detector Locking Mechanism hereof realized using spatial phase or intensity phase modulator shown in FIG. 3E, a receiving fiber, a single cell detector, and the processor carrying out (i) one of the spatial phase modulation (SPM) control signal generation algorithms shown in FIGS. 5A through 5D when using spatial phase modulation (SPM) techniques, or (ii) one of the spatial intensity modulation (SIM) control signal generation algorithms shown in FIGS. 6A through 6D when using spatial phase modulation (SPM) techniques.

The object of the standard Adaptive Optics Subsystem is to remove phase aberrations in the wavefront of the transmitted and received laser beam to that it is focused to its diffraction limit at the entrance pupil of the receiver of the communication terminal.

The object of the Laser Beam Speckle Tracking Mechanism employed in both the signal reception channels of system is to automatically track or follow a maximum intensity laser beam speckle and move away from low intensity (i.e. black) laser beam speckles (that might fall onto the receiving fiber) so as to achieve a first level of optical signal intensity stabilization at signal detector of the receiver modules.

The object of the Speckle-to-Fiber/Detector Mechanism in the signal reception channels of system is to lock a maximum intensity speckle in the received laser beam onto the receiving fiber, so as achieve a second level of optical signal intensity stabilization at the signal detector in the receiver modules of the system.

Free-Space Adaptive Optical (FS-OA) Laser Communication System Supporting Optically-Combined Signal Transmission and Reception Channels and Employing Laser Beam Speckle Tracking Mechanisms and Speckle-To-Fiber/Detector Mechanisms Along the Signal Reception Channels thereof for Automatically Stabilizing Variations in the Intensity of Received Laser Beam Carrier Signals Caused by Atmospheric Turbulence Along Said Signal Channels In FIGS. 9A and 9B, there is shown a fourth illustrative embodiment of a free-space adaptive optical (FS-AO) laser communication system 30 in accordance with the principles of the present invention, wherein first and second communication terminals 31A and 31B are in communication by way of a super broad-band FSO laser beam communication link 32 having optically-combined signal transmission and reception channels, and wherein a standard Adaptive Optics Subsystem and the Laser Beam Speckle Tracking Mechanism and Speckle-to-Fiber/Detector Mechanism of the present invention are employed along the signal reception channels of each communication terminal, for automatically stabilizing variations in the detected intensity of received laser beam carrier signals caused by atmospheric turbulence along said signal channels. As shown in FIGS. 9A and 9B, each communication terminal has a transceiver (module) 31A which will be described in detail below.

The transceiver in each terminal includes a telescopic transmitting/receiving aperture, and an optical train embedded with the components of a standard Adaptive Optics Subsystem and the Laser Beam Pointing Mechanism realized by a fast steering mirror and a quad-cell detector of the kind shown in FIG. 3F, supporting optics, and a processor for carrying out one of the tracking algorithms shown in FIGS. 4A through 4C. The optical train of the transceiver further includes the components of the two fade mitigation mechanisms of the present invention, namely: the Laser Beam Speckle Tracking Mechanism hereof realized using a FSM, a quad-cell detector shown in FIG. 3F, supporting optics, and a processor carrying out the tracking algorithms shown in FIGS. 4D through 4F; and the Speckle-To-Fiber/Detector Locking Mechanism hereof realized using spatial phase or intensity phase modulator shown in FIG. 3E, a receiving fiber, a single cell detector, and the processor carrying out (i) one of the spatial phase modulation (SPM) control signal generation algorithms shown in FIGS. 5A through 5D when using spatial phase modulation (SPM) techniques, or (ii) one of the spatial intensity modulation (SIM) control signal generation algorithms shown in FIGS. 6A through 6D when using spatial phase modulation (SPM) techniques.

The object of the standard Adaptive Optics Subsystem is to remove phase aberrations in the wavefront of the transmitted and received laser beam so that it is focused to its diffraction limit at the entrance pupil of the receiver of the communication terminal.

The object of the Laser Beam Speckle Tracking Mechanism employed in both the signal reception channels of system is to automatically track or follow a maximum intensity laser beam speckle and move away from low intensity (i.e. black) laser beam speckles (that might fall onto the receiving fiber) so as to achieve a first level of optical signal intensity stabilization at signal detector of the receiver modules.

The object of the Speckle-to-Fiber/Detector Mechanism in the signal reception channels of system is to lock a maximum intensity speckle in the received laser beam onto the receiving fiber, so as achieve a second level of optical signal intensity stabilization at the signal detector in the receiver modules of the system.

FIG. 9E shows a tripod-mounted FS-OA laser communication terminal constructed in accordance with the architecture of FIG. 9B, wherein the transceiver telescope has a 20 cm aperture and is mounted beneath the optical bench of the terminal, and a high-spatial resolution AO (WFS/WFC) compensation subsystem is provided for communication link characterization/compensation, and a real-time subsystem is provided for stabilizing the intensity of laser beam carrier signals detected at the transceiver of the system.

FIG. 9F shows a compact FS-OA laser communication terminal also constructed in accordance with the architecture of FIG. 9B, comprising: a transceiver telescope having a 15 cm aperture and mounted beneath the optical bench of the terminal; a high-spatial resolution AO (WFS/WFC) compensation subsystem with communication link characterization/compensation; a real-time subsystem having a Laser Beam Speckle Tracking Mechanism (including a fast steering mirror FSM)); and a Speckle-to-Fiber/Detector Locking Mechanism (including a deformable mirror as a spatial phase modulation panel) for stabilizing the intensity of laser beam carrier signals detected at the transceiver of the system, in response to atmospheric turbulence.

Free-Space Adaptive Optical (FS-OA) Laser Communication System Supporting Optically-Combined Signal Transmission and Reception Channels and Employing Speckle-To-Receiver-Aperture Locking Mechanism Requiring Receiver-To-Transmitter "Figure of Merit" Communication Feedback, and Laser Beam Speckle Tracking Mechanisms and Speckle-To-Fiber/Detector Locking Mechanisms Along the Signal Reception Channels thereof for Automatically Stabilizing Variations in the Intensity of Received Laser Beam Carrier Signals Caused by Atmospheric Turbulence Along Said Signal Channels.

In FIGS. 10A and 10B, there is shown a fifth illustrative embodiment of a free-space optical (FSO) laser communication system 40 in accordance with the principles of the present invention, wherein first and second communication terminals 41A and 41B are in communication by way of a super broad-band FSO laser beam communication link 42 having optically-separated signal transmission and reception channels, and wherein the Speckle-To-Receiver-Aperture Locking Mechanism (requiring receiver-to-transmitter "figure of merit" communication feedback) of the present invention is employed along the transmission channels of each communication terminal, and the Laser Beam Speckle Tracking Mechanism and Speckle-to-Fiber/Detector Mechanism of the present invention are employed along the signal reception channels of each communication terminal, for automatically stabilizing variations in the detected intensity of received laser beam carrier signals caused by atmospheric turbulence along said signal channels. As shown in FIG. 10B, each communication terminal has a transmitter (module) 41A and a receiver (module) 41B, each of which will be described in detail below.

The transmitter in each terminal includes a telescopic transmitting aperture, and an optical train embedded with the components of the Speckle-to-Receiver-Aperture Locking Mechanism realized by a fast steering mirror and a quad-cell detector of the kind shown in FIG. 3F, supporting optics, and a processor for carrying out one of the tracking algorithms shown in FIGS. 4A through 4C using the received communication link power signal (sent via the laser communication link), as shown in FIG. 10B and described in detail hereinabove with reference to the description of the corresponding Speckle-to-Receiver-Aperture Locking Method.

The receiver in each terminal includes a telescopic receiving aperture, and an optical train embedded with the components of the two fade mitigation mechanisms of the present invention, namely: the Laser Beam Speckle Tracking Mechanism hereof realized using a FSM, a quad-cell detector shown in FIG. 3F, supporting optics, and a processor carrying out the tracking algorithms shown in FIGS. 4D through 4F; and the Speckle-To-Fiber/Detector Locking Mechanism hereof realized using spatial phase or intensity phase modulator shown in FIG. 3E, a receiving fiber, a single cell detector, and the processor carrying out (i) one of the spatial phase modulation (SPM) control signal generation algorithms shown in FIGS. 5A through 5D when using spatial phase modulation (SPM) techniques, or (ii) one of the spatial intensity modulation (SIM) control signal generation algorithms shown in FIGS. 6A through 6D when using spatial phase modulation (SPM) techniques.

The object of the Laser Beam Speckle Tracking Mechanism employed in both the signal reception channels of system is to automatically track or follow a maximum intensity laser beam speckle and move away from low intensity (i.e. black) laser beam speckles (that might fall onto the receiving fiber) so as to achieve a first level of optical signal intensity stabilization at signal detector of the receiver modules.

The object of the Speckle-to-Fiber/Detector Mechanism in the signal reception channels of system is to lock a maximum intensity speckle in the received laser beam onto the receiving fiber, so as achieve a second level of optical signal intensity stabilization at the signal detector in the receiver modules of the system.

This FSO laser communication system shown in FIGS. 10A and 10B is similar to the laser communication system shown in FIGS. 3A and 3B, with the addition of Speckle-To-Receiver-Aperture Locking Mechanism. As described hereinabove, this is essentially the same basic technique as the Speckle-To-Fiber/Detector Locking Method of the present invention. In this case, however, a spatial phase or intensity modulator is used in the transmitter to optimize the laser beam signal passed into the receiver aperture on the other side of the communication link. To achieve this, it is necessary for the receiver to send the communication link power signal that it is using to perform the Speckle-to-Fiber/Detector Locking Method back to the transmitter via the optical or other communications link. The transmitter uses this signal as the figure of merit in the algorithm that drives its spatial phase or intensity modulator. This control loop acts to maintain (i.e. lock) a bright speckle in the transmitted laser beam onto the receiver aperture, while the receiver loop maintains a bright speckle in the received laser beam in its onto the receiver fiber (or detector).

It is understood that the image processing technology employed in systems of the illustrative embodiments may be modified in a variety of ways which will become readily apparent to those skilled in the art and having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A free-space optical (FSO) laser communication system automatically stabilizing variations in the detected intensity of laser beam carrier signals, caused by atmospheric turbulence along signal reception channels supported within said FSO laser communication system, said FSO laser communication system comprising:

at least first and second communication terminals in optical communication by way of a broad-band FSO laser beam communication link supporting signal transmission and reception channels;

wherein each said communication terminal has a transmitter module and a receiver module; and wherein each said receiver module includes a receiving aperture for receiving a FSO laser beam carrier signal transmitted from said transmitter module of another one of said communication terminals;

a fast steering mirror (FSM) for steering said FSO laser beam carrier signal along an optical pathway having downstream direction;

a beam splitter, disposed downstream from said FSM, for splitting said FSO laser beam carrier signal into a first signal component and a second signal component;

a receiving optical fiber, disposed at the end of said optical pathway, for receiving the second component of said FSO laser beam carrier signal after transmission along said optical pathway;

a single-cell signal detector in optical communication with said receiving optical fiber, for detecting the intensity of said second component of said FSO laser beam carrier signal and generating an electrical signal corresponding thereto;

a multi-segment signal detector, disposed downstream from said beam splitter, for detecting the intensity of said first signal component of said FSO laser beam carrier signal, and generating electrical signals corresponding thereto;

a processor for automatically analyzing signals generated from said multi-segment signal detector, controlling said FSM, and automatically tracking or following a maximum intensity laser beam speckle in said FSO laser beam carrier signal, and moving low intensity laser beam speckles appearing in said FSO laser beam carrier signal away from said receiving optical fiber, and thereby achieving a first level of optical signal intensity stabilization at said single-cell signal detector in said receiver module;

a spatial modulator for spatially modulating said second component of said FSO laser beam carrier signal;

said processor further analyzing electrical signals produced by said single-cell signal detector, controlling said spatial modulator, and spatially modulating said second component of said FSO laser beam carrier signal so as to lock a maximum intensity speckle appearing in the received second component of said FSO laser beam carrier signal, onto said receiving optical fiber, and thereby achieving a second level of optical signal intensity stabilization at said single-cell signal detector in said receiver module.

2. The FSO laser communication system of claim 1, wherein said signal transmission and reception channels are optically-separated.

3. The FSO laser communication system of claim 1, wherein said signal transmission and reception channels are optically-combined.

4. The FSO laser communication system of claim 1, wherein said receiving aperture comprises a telescopic receiving aperture.

5. The FSO laser communication system of claim 1, wherein said transmitter module and said receiver module are realized as separate modules.

6. The FSO laser communication system of claim 1, wherein said transmitter module and said receiver module are realized as a single transceiver module.

7. The FSO laser communication system of claim 1, wherein said spatial modulator is a spatial phase modulator.

8. The FSO laser communication system of claim 7, wherein said spatial phase modulator is realized as a spatial phase modulation panel having a plurality spatial phase modulation elements.

9. The FSO laser communication system of claim 8, wherein said spatial phase modulation panel comprises a deformable mirror.

10. The FSO laser communication system of claim 1, wherein said spatial modulator is a spatial intensity modulator.

11. The FSO laser communication system of claim 10, wherein said spatial intensity modulator is realized as a spatial intensity modulation panel having a plurality spatial intensity modulation elements.

12. The FSO laser communication system of claim 1, wherein said multi-segment detector is a quad-cell detector.

13. The FSO laser communication system of claim 8, wherein said processor generates spatial phase modulation (SPM) control signals for controlling said spatial phase modulation panel, so as to lock said maximum intensity speckle in the received laser beam carrier signal onto said receiving optical fiber, and achieve said second level of optical signal intensity stabilization at said single-cell signal detector in said receiver module.

14. The FSO laser communication system of claim 11, wherein said processor generates spatial intensity modulation (SIM) control signals for controlling said spatial intensity modulation panel, so as to lock said maximum intensity speckle in the received laser beam carrier signal onto said receiving optical fiber, and achieve said second level of optical signal intensity stabilization at said single-cell signal detector in said receiver module.

15. A method of automatically stabilizing variations in the detected intensity of free-space optical (FSO) laser beam carrier signals caused by atmospheric turbulence in a free-space optical (FSO) laser communication system having at least first and second communication terminals in optical communication by way of a broad-band FSO laser beam communication link supporting signal transmission and reception channels, wherein each said transmission and reception channel has a transmitter module and a receiver module, and wherein each said receiver module includes (i) a receiving aperture for receiving a FSO laser beam carrier signal transmitted from said transmitter module of another one of said communication terminals, along a optical pathway having downstream direction, (ii) a receiving optical fiber, disposed at the end of said optical pathway, for receiving said FSO laser beam carrier signal after transmission along said optical pathway, and (iii) a single-cell signal detector in optical communication with said receiving optical fiber, for detecting the intensity of said FSO laser beam carrier signal and generating an electrical signal corresponding thereto, said method comprising the steps of:

(a) providing within each said receiver module, a fast steering mirror (FSM), disposed upstream from said receiving optical fibers, for steering said FSO laser beam carrier signal along an optical pathway having a downstream direction;

(b) providing a beam splitter, disposed downstream from said FSM, and splitting said FSO laser beam carrier signal into a first signal component and a second signal component;

(c) providing a multi-segment signal detector, disposed downstream from said beam splitter, and detecting the intensity of said first signal component of said FSO laser beam carrier signal, and generating electrical signals corresponding thereto;

(d) processing signals generated from said multi-segment signal detector, controlling said FSM, and automatically tracking or following a maximum intensity laser beam speckle in said FSO laser beam carrier signal, and moving low intensity laser beam speckles appearing in said FSO laser beam carrier signal away from said receiving optical fiber, and thereby achieving a first level of optical signal intensity stabilization at said single-cell signal detector in said receiver module;

(e) providing a spatial modulator, disposed downstream from said beam splitter, and spatially modulating said second component of said FSO laser beam carrier signal; and (f) further processing electrical signals produced by said single-cell signal detector, controlling said spatial modulator, and spatially modulating said second component of said FSO laser beam carrier signal so as to lock a maximum intensity speckle appearing in the received second component of said FSO laser beam carrier signal, onto said receiving optical fiber, and thereby achieving a second level of optical signal intensity stabilization at said single-cell signal detector in said receiver module.

16. The method of claim 15, wherein said signal transmission and reception channels are optically-separated.

17. The method of claim 15, wherein said signal transmission and reception channels are optically-combined.

18. The method of claim 15, wherein said receiving aperture comprises a telescopic receiving aperture.

19. The method of claim 15, wherein said transmitter module and said receiver module are realized as separate modules.

20. The method of claim 15, wherein said transmitter module and said receiver module are realized as a single transceiver module.

21. The method of claim 15, wherein in step (e), said spatial modulator is a spatial phase modulator.

22. The method of claim 21, wherein in step (e), said spatial phase modulator is realized as a spatial phase modulation panel having a plurality spatial phase modulation elements.

23. The method of claim 8, wherein in step (e), said spatial phase modulation panel comprises a deformable mirror.

24. The method of claim 1, wherein in step (e), said spatial modulator is a spatial intensity modulator.

25. The method of claim 24, wherein in step (e), said spatial intensity modulator is realized as a spatial intensity modulation panel having a plurality spatial intensity modulation elements.

26. The method of claim 15, wherein in step (c), said multi-segment detector is a quad-cell detector.

27. The method of claim 22, wherein in step (e), said processor generates spatial phase modulation (SPM) control signals for controlling said spatial phase modulation panel, so as to lock said maximum intensity speckle in the received laser beam carrier signal onto said receiving optical fiber, and achieve said second level of optical signal intensity stabilization at said single-cell signal detector in said receiver module.

28. The method of claim 25, wherein in step (e), said processor generates spatial intensity modulation (SIM) control signals for controlling said spatial intensity modulation panel, so as to lock said maximum intensity speckle in the received laser beam carrier signal onto said receiving optical fiber, and achieve said second level of optical signal intensity stabilization at said single-cell signal detector in said receiver module.

* * * * *